(12) United States Patent
Hoffend, III

(10) Patent No.: US 8,317,159 B2
(45) Date of Patent: Nov. 27, 2012

(54) LIFT ASSEMBLY SYSTEMS AND METHODS

(75) Inventor: Donald A. Hoffend, III, Winston-Salem, NC (US)

(73) Assignee: Electronic Theatre Controls, Inc., Middleton, WI (US)

( * ) Notice: Subject to any disclaimer, the term of this patent is extended or adjusted under 35 U.S.C. 154(b) by 1032 days.

(21) Appl. No.: 12/268,097

(22) Filed: Nov. 10, 2008

(65) Prior Publication Data

US 2009/0127527 A1    May 21, 2009

Related U.S. Application Data

(60) Provisional application No. 60/986,499, filed on Nov. 8, 2007, provisional application No. 61/023,562, filed on Jan. 25, 2008, provisional application No. 61/029,060, filed on Feb. 15, 2008.

(51) Int. Cl.
    *B66D 1/36* (2006.01)
(52) U.S. Cl. ......... 254/286; 254/394; 160/143; 160/331
(58) Field of Classification Search .................. 254/278, 254/279, 286, 287, 294, 306, 338, 394; 160/143, 160/331, 344
    See application file for complete search history.

(56) References Cited

U.S. PATENT DOCUMENTS

| | | | |
|---|---|---|---|
| 1,002,839 A | 9/1911 | Hagen |
| 1,435,390 A | 11/1922 | Hasait |
| 1,822,422 A | 9/1929 | Richardson |
| 1,982,281 A | 11/1934 | Birkenmaier |
| 2,649,279 A | 8/1953 | Jones et al. |
| 2,892,598 A | 6/1959 | Dudley |
| 3,136,358 A | 6/1964 | Madsen |
| 3,345,066 A | 10/1967 | Izenour |
| 4,058,186 A | 11/1977 | Mullis |
| 4,062,519 A | 12/1977 | Jacobs |
| 4,071,205 A | 1/1978 | Wieschel |
| 4,269,380 A | 5/1981 | Shima et al. |
| 4,303,237 A | 12/1981 | Hoffend, Jr. et al. |

(Continued)

FOREIGN PATENT DOCUMENTS

DE             10 14 725 B       8/1957

(Continued)

OTHER PUBLICATIONS

International Search Report, PCT/US2007/010377, dated Oct. 22, 2007.

(Continued)

*Primary Examiner* — Emmanuel M Marcelo
(74) *Attorney, Agent, or Firm* — Michael Best & Friedrich LLP

(57) ABSTRACT

A lift assembly system and method can include: a funnel-shaped drum having a constant diameter portion and a gradually increasing diameter portion; a cable management system adapted to position a cable in a single layer in a tray; a beam clamp tube receiver adapted to allow a tube to slide relative to a beam and be secured to the beam; a cable keeper and a slack line detector adapted to maintain cables in position about a drum upon loss of cable tension; a horizontally oriented low profile cable adjuster adapted to adjust the length of a cable; an overspeed braking mechanism; a fleet pivot arm pivotable on the end of a tube so as to guide cables along a desired fleet angle; and/or a pull-type load sensor connected between a tube and a drum adapted to sense changes in a load force and adjust movement of a load.

32 Claims, 37 Drawing Sheets

U.S. PATENT DOCUMENTS

| | | | |
|---|---|---|---|
| 4,512,117 | A | 4/1985 | Lange |
| 4,575,050 | A | 3/1986 | Bechmann |
| 4,606,527 | A | 8/1986 | Ziller et al. |
| 4,767,073 | A | 8/1988 | Malzacher |
| 5,021,954 | A | 6/1991 | Fox et al. |
| 5,106,057 | A | 4/1992 | Feller et al. |
| 5,161,104 | A | 11/1992 | Fox et al. |
| 5,280,880 | A | 1/1994 | Ewing et al. |
| 5,758,867 | A | 6/1998 | Arnesson |
| 5,829,736 | A | 11/1998 | Harken |
| 5,829,737 | A | 11/1998 | Gersemsky |
| 5,920,476 | A | 7/1999 | Hennessey et al. |
| 5,947,451 | A | 9/1999 | Cavanagh |
| 5,950,953 | A | 9/1999 | Baugh et al. |
| 6,019,353 | A | 2/2000 | Atfield |
| 6,085,826 | A | 7/2000 | Maesaki |
| 6,209,852 | B1 | 4/2001 | George et al. |
| 6,385,493 | B1 | 5/2002 | Hennessey et al. |
| 6,443,431 | B1 | 9/2002 | Stasny et al. |
| 6,520,485 | B1 | 2/2003 | Soot |
| 6,619,624 | B2 | 9/2003 | Lamphen |
| 6,634,622 | B1 | 10/2003 | Hoffend, Jr. |
| 6,691,986 | B2 | 2/2004 | Hoffend, Jr. |
| 6,827,121 | B2 | 12/2004 | Park |
| 6,889,958 | B2 | 5/2005 | Hoffend, Jr. |
| 6,988,716 | B2 | 1/2006 | Hoffend, Jr. |
| 6,997,442 | B2 | 2/2006 | Hoffend, Jr. |
| 7,185,774 | B2 | 3/2007 | Colgate et al. |
| 7,234,685 | B2 | 6/2007 | Britten |
| 7,311,297 | B1 | 12/2007 | Bradshaw et al. |
| 7,360,576 | B2 | 4/2008 | Lin |
| 7,364,136 | B2 | 4/2008 | Hossler |
| 2003/0030045 | A1 | 2/2003 | Hoffend, Jr. |
| 2004/0098944 | A1 | 5/2004 | Hoffend, Jr. |
| 2004/0099852 | A1 | 5/2004 | Hoffend, Jr. et al. |
| 2004/0183060 | A1 | 9/2004 | Hoffend, Jr. |
| 2005/0247919 | A1 | 11/2005 | Hoffend, Jr. |
| 2006/0163548 | A1 | 7/2006 | Kochan et al. |
| 2006/0169662 | A1 | 8/2006 | Hoffend, Jr. |
| 2006/0284151 | A1 | 12/2006 | Hossler |
| 2007/0001158 | A1 | 1/2007 | Hoffend, Jr. |
| 2007/0181862 | A1 | 8/2007 | Hossler |
| 2007/0278046 | A1 | 12/2007 | Hoffend, III |
| 2009/0140221 | A1 | 6/2009 | Kochan et al. |
| 2010/0301292 | A1 | 12/2010 | Hoffend, III |

FOREIGN PATENT DOCUMENTS

| | | |
|---|---|---|
| DE | 27 10 145 A1 | 9/1978 |
| DE | 94 15 808.8 | 2/1995 |
| EP | 0 009 058 A1 | 4/1980 |
| EP | 0 457 436 A1 | 11/1991 |
| EP | 0 504 867 B1 | 9/1992 |
| FR | 640143 | 10/1926 |
| FR | 2 798 597 | 3/2001 |
| GB | 178580 | 4/1922 |
| WO | WO 2006/031245 A2 | 3/2006 |
| WO | 2007127453 | 11/2007 |

OTHER PUBLICATIONS

Written Opinion of the International Searching Authority, PCT/US2007/010377, dated Oct. 22, 2007.

International Search Report, PCT/US2008/083012, dated Nov. 10, 2008.

Written Opinion of the International Searching Authority, PCT/US2008/083012, dated Nov. 10, 2008.

Response to Communication Under Rules 161 and 162 EPC, EP 07776449.6, dated Dec. 17, 2008.

U.S. Appl. No. 11/796,781, Official Action, mailed Sep. 29, 2009, confirmation No. 6532.

U.S. Appl. No. 11/796,781, Amendment and Response Pursuant to 37 CFR § 1.111, filed Jan. 29, 2010, confirmation No. 6532.

European Patent Application No. 07776449.6, Communication Pursuant to Article 94(3) EPC (Examination), Ref. No. FP-10-0510, mailed Nov. 25, 2009.

LIFT ASSEMBLY SYSTEMS AND METHODS

CROSS-REFERENCE TO RELATED APPLICATIONS

This application claims benefit of U.S. Provisional Patent App. No. 60/986,499, filed Nov. 8, 2007, U.S. Provisional Patent App. No. 61/023,562, filed Jan. 25, 2008, and U.S. Provisional Patent App. No. 61/029,060, filed Feb. 15, 2008, each of which is incorporated by reference herein in its entirety.

FIELD OF THE INVENTION

The present invention relates to lift assembly systems and methods. Embodiments of the present invention may be useful for raising and lowering a load in theatrical and staging environments.

BACKGROUND OF THE INVENTION

Performance venues such as theaters, arenas, concert halls, auditoriums, schools, clubs, convention centers, and television studios can employ battens or trusses to suspend, elevate, and/or lower lighting, scenery, draperies, and other equipment that can be moved relative to a stage or floor. Such battens can include pipe or joined pipe sections that form a desired length of the batten. Battens can be 50 feet or more in length. To support heavy loads or suspension points are that spaced apart, for example, 15-30 feet apart, the battens may be fabricated in various configurations, such as ladder, triangular, or box truss configurations. A number of elevating or hoisting systems are available for supporting, raising, and lowering battens and/or articles used in such venues.

Battens can be counterweighted in order to reduce the effective weight of the battens and any associated loads. As a result, the power necessary to raise and lower battens can be reduced. However, conventional counterweight systems can represent a significant cost, with respect to both equipment required and time involved to install such equipment.

Some conventional elevating or hoisting systems can employ a winch to raise and/or lower battens and other articles. Such winches can be hand-operated, motorized, and/or electrically powered. Other conventional elevating or hoisting systems can utilize a hydraulic or pneumatic device to raise and/or lower battens.

Conventional elevating or hoisting systems can include a locking device and an overload limiting device. In a sandbag counterweight system, for example, the locking device may be merely a rope tied off to a stage-mounted pin rail. The overload limit can be regulated by the size of the sandbag. In such a rigging design, however, a number of additional bags can be added to the set of rope lines, and thereby exceed the safe limit of suspension ropes and defeat the overload-limiting feature.

Elevating or hoisting systems that utilize winches can employ a locking mechanism, such as a ratchet lock mechanism. When such winches are heavily loaded, the locking capacity of the ratchet lock, or other locking mechanism, can be overcome, resulting in the suspended load being dangerously dropped. As a result, conventional lift systems can have less than effective safety mechanisms.

In addition, conventional lift systems may be configured such that a pulley, or loft block, mechanism is attached directly to an overhead building support. As a result, an undesired amount of horizontal stress can be placed on the overhead building supports to which the system and associated load are attached.

Ropes or cables utilized to raise and/or lower a batten or other load may be wound about and unwound from a drum connected to a lift system motor. In conventional lift systems, the cables may rub unevenly against adjacent cables as they are being wound about and unwound from the drum. Such uneven rubbing can cause friction that may increase the rate at which the cables, drum, and other components need to be serviced and/or replaced. In addition, such friction can cause increased noise that may be undesirable in certain performance environments.

Some conventional drums can have a size and/or coil cables about the drums such that a large space is needed in which to locate the drum in or about the lift system. In "yo-yo" type drums and "pile" type drums, cables coil about the drum vertically on top of themselves. For example, in a "pile" type drum, after the cable has wound completely across the face of the drum, it is forced up to a second layer at a flange on the side of the drum. The cable then winds back across the drum in the opposite direction. In order to advance across the drum, the cable must cross over two cable "notches" of the previous coil. Such "cross-over" subjects a cable to abrasion, crushing, and pinching as it is pushed over the two cable notches across the crown of the first cable layer. Such stress can cause erratic motion of the cables as they are wound up onto the drum and/or unwound from the drum. Such vertically stacked coils of cables in conventional drums contribute to the need for increased torque to wind and unwind cables on those drums.

Conventional lift systems can include a cable management system in which electrical wires in a cable are stacked in layers back and forth on top of each other. Such cable management systems risk pinching and/or binding of the cable (and wires).

Thus, there is a need for a lift assembly drum that can wind and unwind cables in a smooth and controlled manner so as to minimize friction and noise. There is a need for a lift assembly drum that can occupy a relatively small space. There is a need for a lift assembly drum that has a decreased need for torque and is thus more energy-efficient. There is a need for a lift assembly system that includes a cable management system that avoids unnecessary pinching or binding of electrical and/or other wires or cables as a load is raised and lowered.

SUMMARY

Some embodiments of the present invention can include a lift system and/or method comprising a substantially rectangular tube having an opening in a bottom along at least a portion of a length of the tube, and connectable to an overhead structure; a drive mechanism connected externally on one end of the tube; a funnel-shaped drum operably connected to the drive mechanism and adapted to wind and unwind a plurality of cables about the drum to raise and lower an article attached to the cables; and a plurality of loft blocks connected to the tube internally so as to redirect the cables from a generally horizontal path from the drum to a generally vertical path through the bottom opening in the tube to the attached article.

In some embodiments, the drum can further comprise an apex having a first diameter and a base having a second diameter larger than the first diameter; a constant diameter portion having the first diameter and extending from the apex; a gradually increasing diameter portion extending from the constant diameter portion to the base; a plurality of discrete circumferential channels in the constant diameter portion, each channel adapted to route and maintain one of the cables in a predetermined position about the drum; and a first one of the channels adjacent the gradually increasing diameter portion extending in a circumferential pattern about the gradually increasing diameter portion. A first one of the cables can be windable in the first channel about the constant diameter portion and the gradually increasing diameter portion to the base. Some such embodiments can further comprise a cable guide assembly comprising a movable guide block having a guide hole for each of the cables and operably connected to the drum such that the guide block can move at substantially the same angle as the drum to guide the cables as they are wound onto and unwound from the drum.

Some embodiments of the present invention can include a lift system and/or method comprising a cable management system in which one end of at least one of a plurality of wires is connectable to an input source associated with the drive mechanism and the opposite end of the at least one of the wires is connectable to an output object movable with the article; a wire containment cable for containing the plurality of wires; and a tray connected along a length of the article and having dimensions for containing the wire containment cable. The wire containment cable can be movable between a first, substantially vertical position when the article is fully lowered and a second, substantially horizontal position in the tray when the article is fully raised. In some embodiments, when the article is fully raised, the wire containment cable comprises a double or single layer in the tray. In certain embodiments, the tray can be connected to the tube.

Some embodiments of the present invention can include a lift system and/or method comprising a plurality of lengthwise portions of the tube connectable to each other end to end; and a splicing clamp comprising an upper plate and a lower plate adapted to receive and tighten about two abutting ends of the tube portions.

Some embodiments of the present invention can include a lift system and/or method comprising a beam clamp tube receiver having a pair of opposing hooks adapted to be tightened together securely onto opposite sides of the overhead structure, and at least two opposing inserts movable vertically inside each hook and spreadable so as to receive the tube and lock together after the tube is received. The tube can include an upward extension comprising a tapered tip having a flange adapted to securely engage the beam clamp tube receiver. Each hook can further include a pair of opposing clamps movable vertically inside the hook such that when the upward extension is inserted into the hook, the clamps are moved up and forced open by the tapered end of the tip and the tip flange rests on top of the clamps to lock the tube into the beam clamp tube receiver. In some embodiments, the tube can be slid in the beam clamp tube receiver in a direction perpendicular to the overhead structure to which the beam clamp tube receiver is attached.

Some embodiments of the present invention can include a lift system and/or method comprising a self-locking loft block that can be tilted out of locked position so that the loft block can be repositioned along the length of the tube and then tilted back into locked position. In some embodiments, the tube can further include a slotted rail on the inside of either or both the front and back of the tube adapted to guide a loft block.

Some embodiments of the present invention can include a lift system and/or method comprising a cable keeper comprising an arm extending across the constant diameter portion and the increasing diameter portion of the drum along an axis of the cables and biased against the drum so as to maintain the cables in position about the constant diameter portion in the event of loss of tension in one or more of the cables. In some embodiments, an end of the cable keeper can be attached to a guide mechanism movable across the constant diameter portion of the drum at the same rate as the cables wind onto and unwind from the drum. In some embodiments, the guide mechanism can further include a low limit switch adapted to sense a degree of unwinding of the cables as an indicator of when the article has been fully lowered; and an upper limit switch adapted to sense a degree of winding of the cables as an indicator of when the article has been fully raised.

Some embodiments of the present invention can include a lift system and/or method comprising a slack line detector comprising a slack line sensor arm biased against one of the cables and movable in response to a loss of tension on the cable; and a switch responsive to movement of the sensor arm and adapted to adjust movement of the cables.

Some embodiments of the present invention can include a lift system and/or method comprising a low profile cable adjuster comprising a first cable guide attached to a first plate and having a 90 degree angle cable path; a second cable guide attached to a second plate horizontally spaced from the first cable guide and having a 180 degree angle cable path; and a horizontal adjustment mechanism attached to the first and second plates configured to maintain an adjustable distance between the first and second plates. The cable can be routed vertically from the loft block into the first cable guide, out of the first cable guide in a first horizontal direction into one end of the second cable guide, and out of the second cable guide in a second, opposite horizontal direction to an attachment point on the first plate. The horizontal adjustment mechanism can be adjusted to change a length of the cable between the loft block and the article.

Some embodiments of the present invention can include a lift system and/or method comprising an overspeed braking mechanism having a brake disk attached to the drive shaft rotatingly positioned between a moveable brake pad moveable toward a fixed brake pad. A brake shoe can be attached to the moveable brake pad and configured to move up on a ramp when the article is being lowered to compress against and stop rotation of the brake disk and drive shaft and to move down on the ramp when the article is being raised to allow rotation of the brake disk and drive shaft.

Some embodiments of the present invention can include a lift system and/or method comprising a fleet pivot arm pivotably attached to an end of the tube above the drive mechanism having an upper block adjacent the tube and a lower block adjacent the drive mechanism such that the lower block can pivot in a direction substantially perpendicular to a longitudinal axis of the tube. The fleet pivot arm can be pivoted so as to guide the cables along a desired fleet angle as the cables are unwound from and wound onto the drum.

Some embodiments of the present invention can include a lift system and/or method comprising a load sensor connected between the drive mechanism and a drive mechanism housing and comprising a first portion and a second portion, each portion adapted to be pulled against the other, thereby sensing changes in a load force on the article attempting to pull the drive mechanism away from the drive mechanism housing. The sensor can be adapted to adjust movement of the article when changes in the load force are sensed.

Features of lift assembly systems and methods may be accomplished singularly, or in combination, in one or more of the embodiments of the present invention. As will be realized by those of skill in the art, many different embodiments of lift assembly systems and methods are possible. Additional uses, advantages, and features of aspects of the present invention are set forth in the illustrative embodiments discussed in the

DETAILED DESCRIPTION

Figure 1:
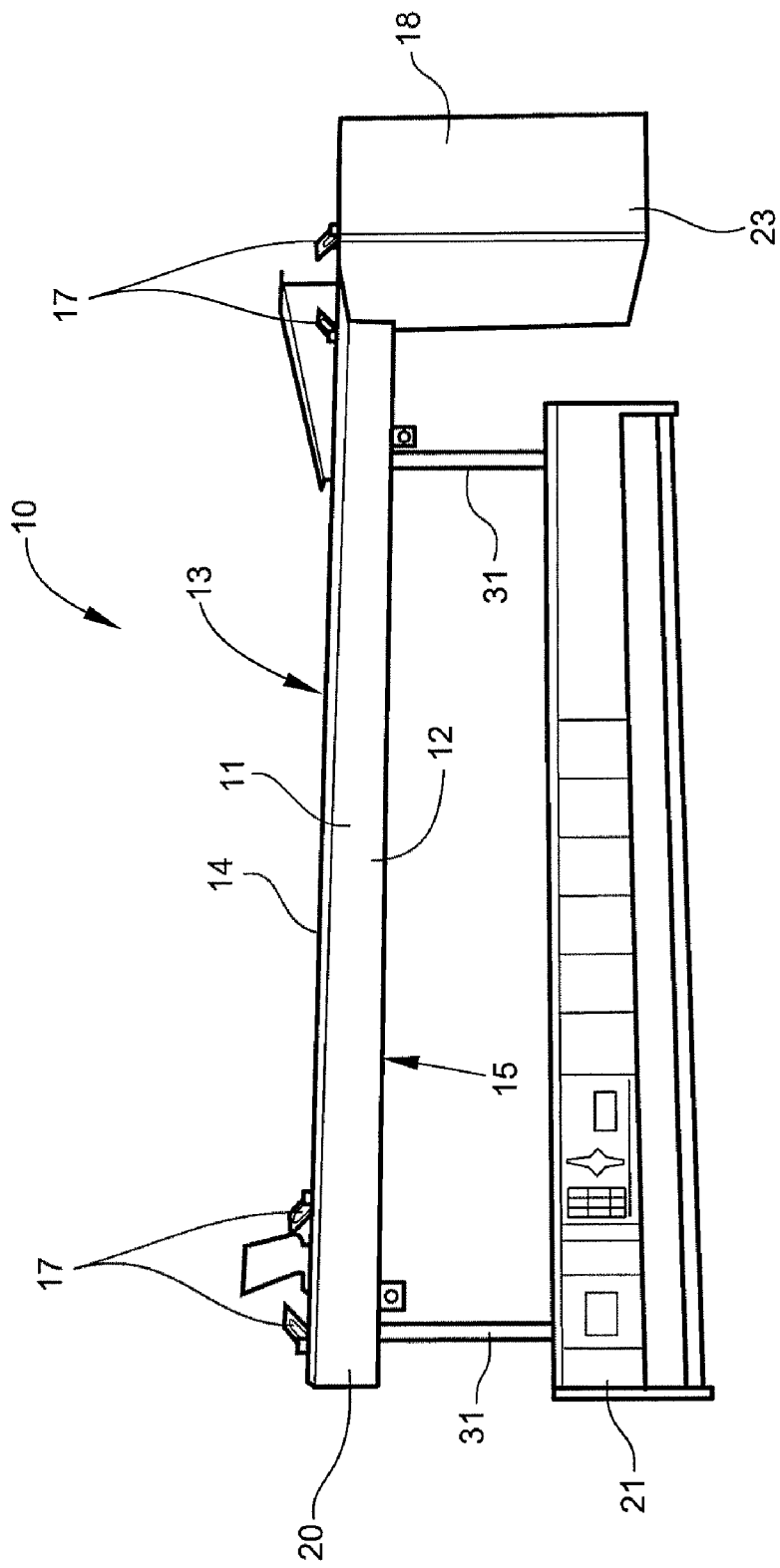
FIG. 1 is a view of a lift assembly system in an embodiment of the present invention.

For the purposes of this application, unless otherwise indicated, all numbers expressing quantities, conditions, and so forth used in the specification are to be understood as being modified in all instances by the term "about." Accordingly, unless indicated to the contrary, the numerical parameters set forth in the specification are approximations that can vary depending upon the desired properties sought to be obtained by the embodiments described herein. At the very least, each numerical parameter should at least be construed in light of the number of reported significant digits and by applying ordinary rounding techniques.

Notwithstanding that the numerical ranges and parameters setting forth the broad scope of the described embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10—that is, all subranges beginning with a minimum value of 1 or more, for example, 1 to 6.1, and ending with a maximum value of 10 or less, for example, 5.5 to 10.

As used in this specification, the singular forms "a," "an," and "the" include plural referents unless the context clearly dictates otherwise. Thus, for example, the term "a loft block" is intended to mean a single loft block or more than one loft block.

Some embodiments of a lift assembly system 10 and method of the present invention can include a compression tube 11, a drum 24, an elongate member, or cable 31, a drive mechanism 22, a head block 38, and a loft block 32. The tube 11 can be a substantially rectangular tube having an opening in a bottom 15 along at least a portion of the length 16 of the tube 11. The tube 11 can be connectable to an overhead structure 57. The drum 24 can be located external to the tube 11 and adapted to wind and unwind the elongate member 31 to raise and lower an article 21 attached to the elongate member 31. The drive mechanism 22 can be structurally connected to one end of the tube 11 externally. The drive mechanism 22 can include a motor 27 rotatingly connected to the drum 24, such that the elongate member 31 extends along a first generally horizontal path from the drum 24 to the tube 11. The head block 38 can be fixedly connected to an opposite end of the tube 11 and located to redirect the elongate member 31 from the first generally horizontal path to a second generally horizontal path back toward the drive mechanism 22. The loft block 32 can be connected to the tube 11 internally, spaced from the head block 38, and located to redirect the elongate member 31 from the second generally horizontal path to a generally vertical path through the bottom 15 opening in the tube 11 to the attached article 21.

Some embodiments of such a lift assembly system 10 can include a plurality of the loft blocks 32. Each loft block 32 can be positionable and securable in place at an infinite number of locations along the length 16 of the tube 11. In some embodiments, the lift assembly system 10 can include a braking mechanism 36 connected to the elongate member 31 and movable within the tube 11. Certain embodiments of the lift assembly system 10 can include a plurality of the tube 11 modules arranged in an end-to-end configuration.

Exemplary embodiments of aspects of such a lift assembly system 10 are shown in FIGS. 1-6. Such embodiments are described in co-pending, co-owned U.S. patent application Ser. No. 11/796,781, filed Apr. 30, 2007, which is incorporated herein by reference in its entirety. An illustrative embodiment of a lift assembly system 10 can include the coiling apparatus, or drum 24, a first traction drive 25 operably connected to the drive mechanism 22, a second traction drive 26, the tube 11 containing one or more pulleys, for example, the head block 38 and the loft blocks 32, and one or more elongate members 31, such as cables. The cables 31 can be attached to the drum 24 and configured to travel in a generally horizontal path from the drum 24 around the second traction drive 26 to and around the first traction drive 25 to the head block 38 and the loft blocks 32 inside the tube 11. From the loft blocks 32, the cables 31 can travel in a generally vertical path, that is, upward and downward between the loft blocks 32 and a surface below. An article 21, or load, can be attached to the cables 31 such that when the cables 31 are moved in the generally vertical path, the attached article 21 can be raised and/or lowered relative to the surface.

Such embodiments of the lift assembly system 10 may be useful for raising and/or lowering articles 21, such as theatrical stage equipment, relative to a stage floor. Theatrical stage equipment can include equipment which is to be raised and/or lowered prior to and/or during a performance, in order to provide a desired scene effect. This equipment can include, for example, various rigging sets such as curtains, borders, screens, scene displays, props, lighting fixtures, and other equipment. The rigging sets, some of which can be generally coextensive in length with the opening of a theater stage, can have substantial mass and weight. Some embodiments of the lift assembly system 10 may be used for raising and/or lowering articles 21 and loads other than theatrical stage equipment.

In certain instances, the articles 21 to be raised and lowered can be stage equipment supported by one or more battens. A "batten" can comprise an elongated pipe, rod, or rigid strip of material. Each batten can be supported along its length by a plurality of flexible cables. Although the term "batten" is used in connection with theatrical and staging environment, including scenery, staging, lighting and sound equipment, etc., the term can encompass any load connectable to an elongate member 31, such as a windable cable.

Some embodiments of the lift assembly system 10 can be utilized in connection with buildings in various settings. The term "building" as used herein can encompass a structure or facility to which the lift assembly 10 is connected, such as, but not limited to, performance venues, theaters, arenas, concert halls, auditoriums, schools, clubs, educational institutions, stages, convention centers, television studios, showrooms, places of religious gathering, cruise ships, etc.

Figure 2:
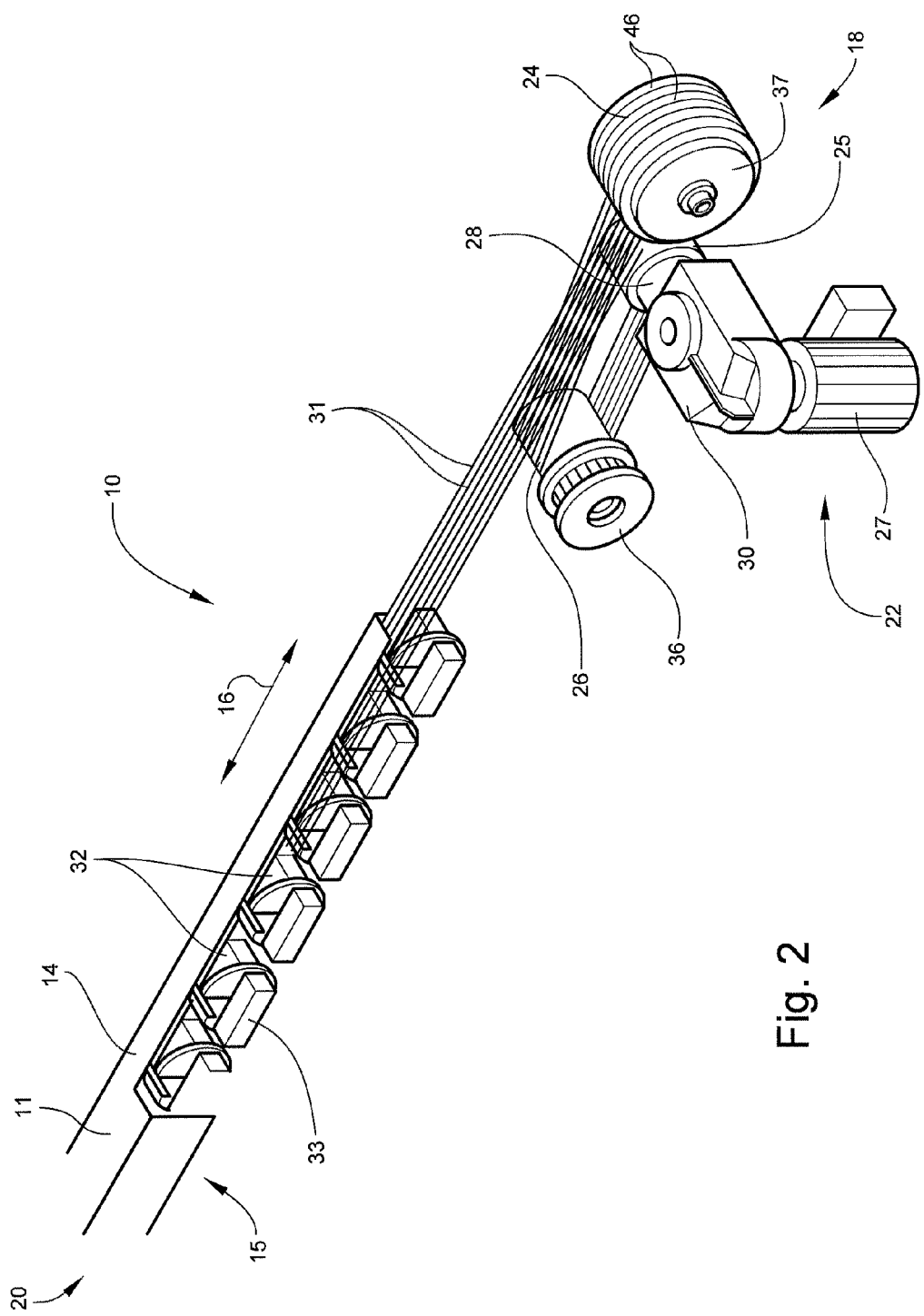
FIG. 2 is a view of a lift assembly system showing a drive mechanism and a partially cut-away view of a portion of a compression tube and the components inside the tube in an embodiment of the present invention.
Figure 3:
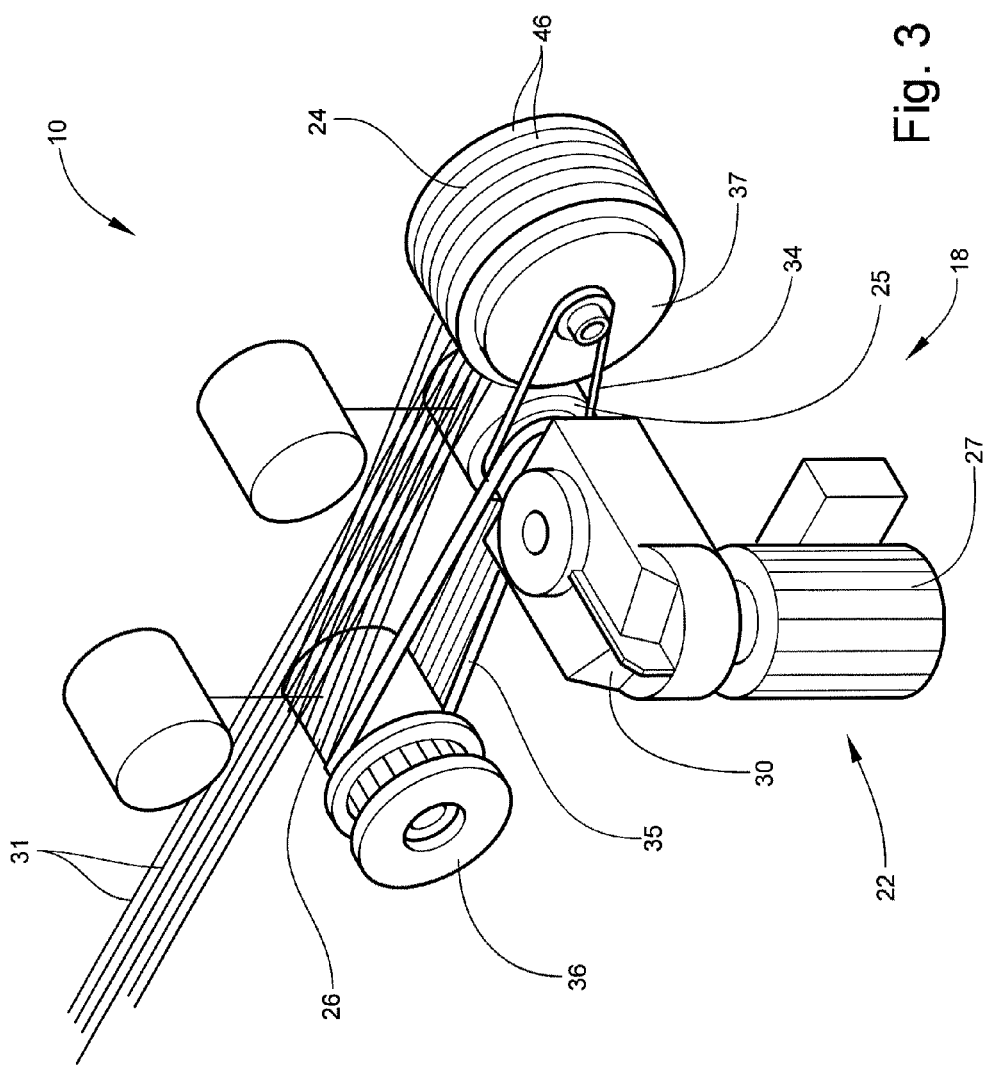
FIG. 3 is a close-up view of the drive mechanism shown in the lift assembly system in FIG. 2.
Figure 4:
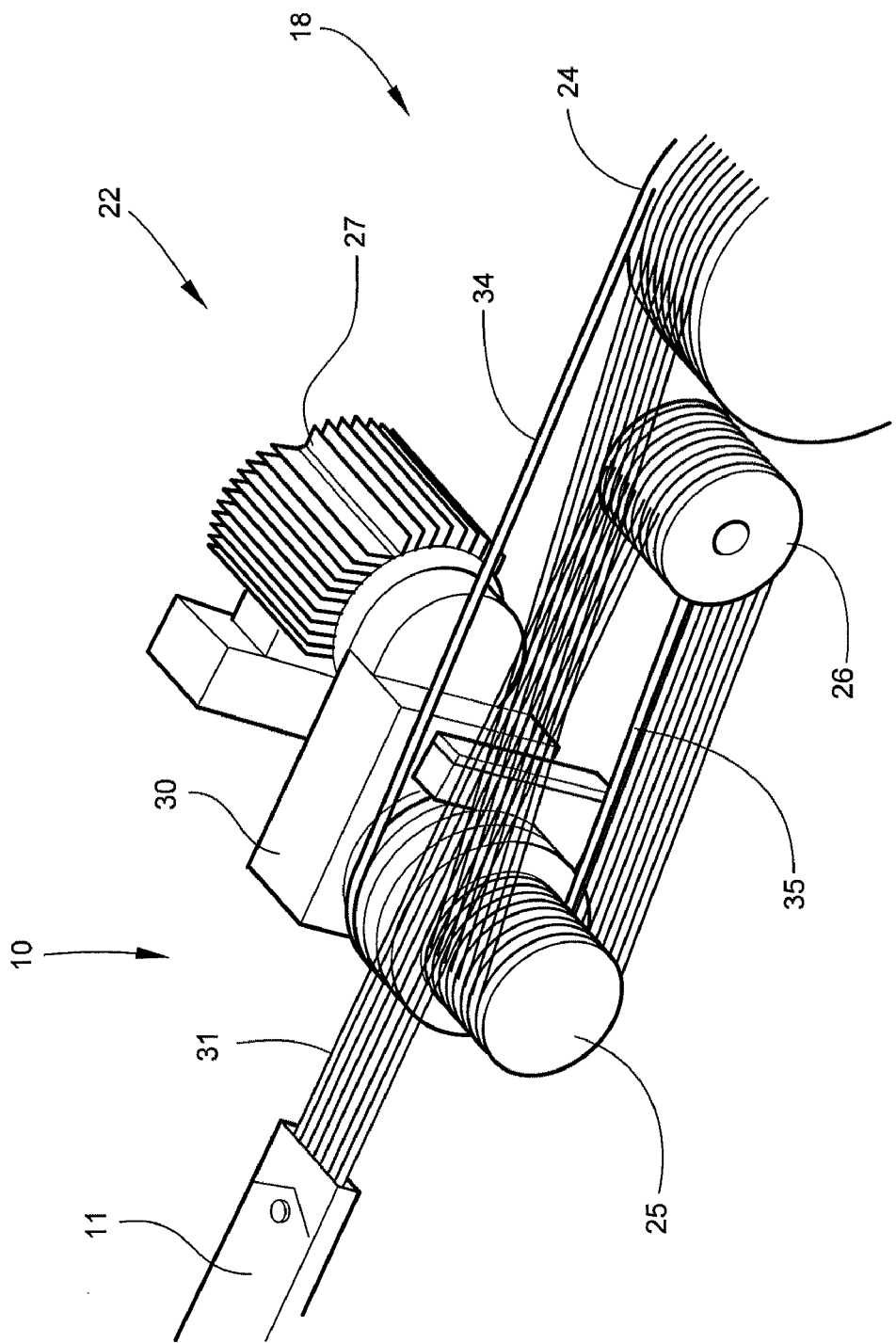
FIG. 4 is another close-up view of the drive mechanism shown in the lift assembly system in FIG. 2.

In some embodiments of the present invention, the lift assembly system 10 can include the coiling apparatus, or drum 24, as shown in FIGS. 2-4. One end of the cables 31, can be securely attached to the drum 24. The drum 24 can include a series of channels 46 or contoured surface areas about which the cables 31 can be coiled, or wound, and from which the cables 31 can be uncoiled, or unwound. In some embodiments, the drum 24 can include a channel 46 or contoured surface area for each cable 31 to be wound and unwound. For example, as shown in the particular embodiments in FIGS. 3 and 5, the drum 24 can include eight cable-receiving channels 46. Each channel 46 or contoured surface area can be sized to retain a length of cable 31 sufficient to dispose the article 21 connected to the cable 31 between a fully lowered position and a fully raised position. Alternatively, the drum 24 can have a smooth surface about which the cables 31 can be wound and from which the cables 31 can be unwound in a side-by-side manner.

The drum 24 may be rotatably connected to the tube 11 and operably connected to the motor driveshaft 28 with a linking element, such as a belt, chain, or other linking mechanism. As shown in FIG. 3, for example, the drum 24 can be operably connected to the first traction drive 25 with a drum drive belt 34.

In some embodiments, the lift assembly system 10 may include one or more traction drives 25, 26. The traction drives 25, 26 can be rotatable such that cables 31 can move about the rotating surfaces of the traction drives 25, 26. The traction drives 25, 26 can include a series of channels 46 or contoured surface areas, similar to the channels 46 or contoured surface areas in the drum 24, about which the cables 31 can travel. The traction drives 25, 26 can be referred to as "sheaves." A sheave is defined for purposes herein as a wheel or disc with a grooved rim, especially one used as a pulley.

In some embodiments, the lift assembly system 10 can include a drive mechanism 22. The drive mechanism 22 may include a motor 27, for example, an electric motor 27. The drive mechanism 22 may further include a set of gears (not shown), which may be housed in a gear box 30, for transferring rotational motion of the motor 27 to the drive shaft 28 and in turn to the first traction drive 25. The drive mechanism 22 can be housed in a drive mechanism housing 23, as shown in FIG. 1. The motor 27 can cause rotation of the first traction drive 25 about its rotational axis. In embodiments in which the second traction drive 26 and the drum 24 are operably linked to the first traction drive 25, the motor 27 and gears can likewise cause rotation of the second traction drive 26 and the drum 24. The gears (not shown) in the gear box 30 can rotate the drive shaft 28, and the traction drives 25, 26 and drum 24, in a winding (raising) rotation and an unwinding (lowering) rotation.

The first traction drive 25 and the drum 24 can be operably connected with the drum drive belt 34, as described. In some embodiments, the first traction drive 25 and the drum 24 can rotate at predetermined relative speeds, or rates.

In some embodiments, the drive mechanism 22 can include a tension clutch 37, as shown in FIG. 3. The tension clutch 37 can allow the drum 24 to rotate at a different speed relative to the rotational speed of the first traction drive 25 so as to accommodate the variable drum-cable circumference related to the amount of cable 31 wound about the drum 24 at particular times during winding and unwinding of the cables 31.

In some embodiments, the drive mechanism 22 can be located completely external to the tube 11 containing the loft blocks 32. Some embodiments of the lift assembly system 10 can be equipped with different sizes and capacities of motors 27.

Some embodiments of the lift assembly system 10 can be constructed to cooperate with at least one elongate member 31, such as a cable, or other length of material, connected at one end to the drum 24 and at the other end to the article 21 or load to be moved. In some embodiments, the number of cables 31 can be at as many as eight or more cables 31. As used herein, "cable" is defined as a steel cable, steel tape (for example, a one inch wide steel band), wire, metal, natural or synthetic rope, or other any other generally inelastic windable material suitable for raising and lowering a load.

A length of cable 31 can be disposed about the drum 24 sufficient to wind about the first and second traction drives, 25, 26, respectively, to extend horizontally to the head block 38 and to the loft block 32 around which it moves, and then downward to the point at which it is connected to the article 21 or load. The cable 31 can have a length sufficient to fully lower a desired article 21 or load.

In another aspect, some embodiments of the lift assembly system 10 can include the compression tube 11 as shown in FIGS. 1, 2, 4, and 5. The compression tube 11 can comprise a length of substantially rigid material that can be connected to an overhead building structure 57. As shown in FIG. 2, the compression tube 11 can include a plurality of loft blocks 32, or pulleys, disposed at intervals along the inside length 16 of the tube 11. Each loft block 32 can rotatingly engage one or more cables 31. The loft blocks 32 can re-direct the generally horizontal path of the cables 31 from the drum 24 and traction drives 25, 26 to a generally vertical path to the attached article(s) below the compression tube 11.

Depending upon several factors, including, for example, the dimensions and weight of the article 21 to be raised and/or lowered, the number of loft blocks 32 utilized in an embodiment of the present invention can vary. In some embodiments, for example, the lift assembly system 10 can include eight loft blocks 32 and thus eight cable drop points, as compared to some conventional lift assemblies which provide seven or fewer loft blocks 32. In this manner, the lift assembly system 10 can provide greater support to the article 21 and greater flexibility as to locations on the article 21 to which the cables 31 can be attached.

In certain embodiments, the compression tube 11 can include a means for engaging the loft blocks 32. For example, the means for engaging the loft blocks 32 can include a rail 44 extending outwardly into the interior of the tube 11. Each of the loft block sliders 33 can have a groove 50 along its length adopted to slidingly engage the tube rail 44. Alternatively, the means for engaging the loft blocks 32 can include a channel in the length 16 of the opposing walls of the tube 11. Each of the loft block sliders 33 can have an arm extending outwardly from each side of the loft block sliders 33 that can slidingly engage the channels along the tube 11. Once the loft block 32 is in a desired position along the length 16 of the tube 11, the locking mechanism 52 can be actuated to secure the loft block 32 in that position.

Figure 5:
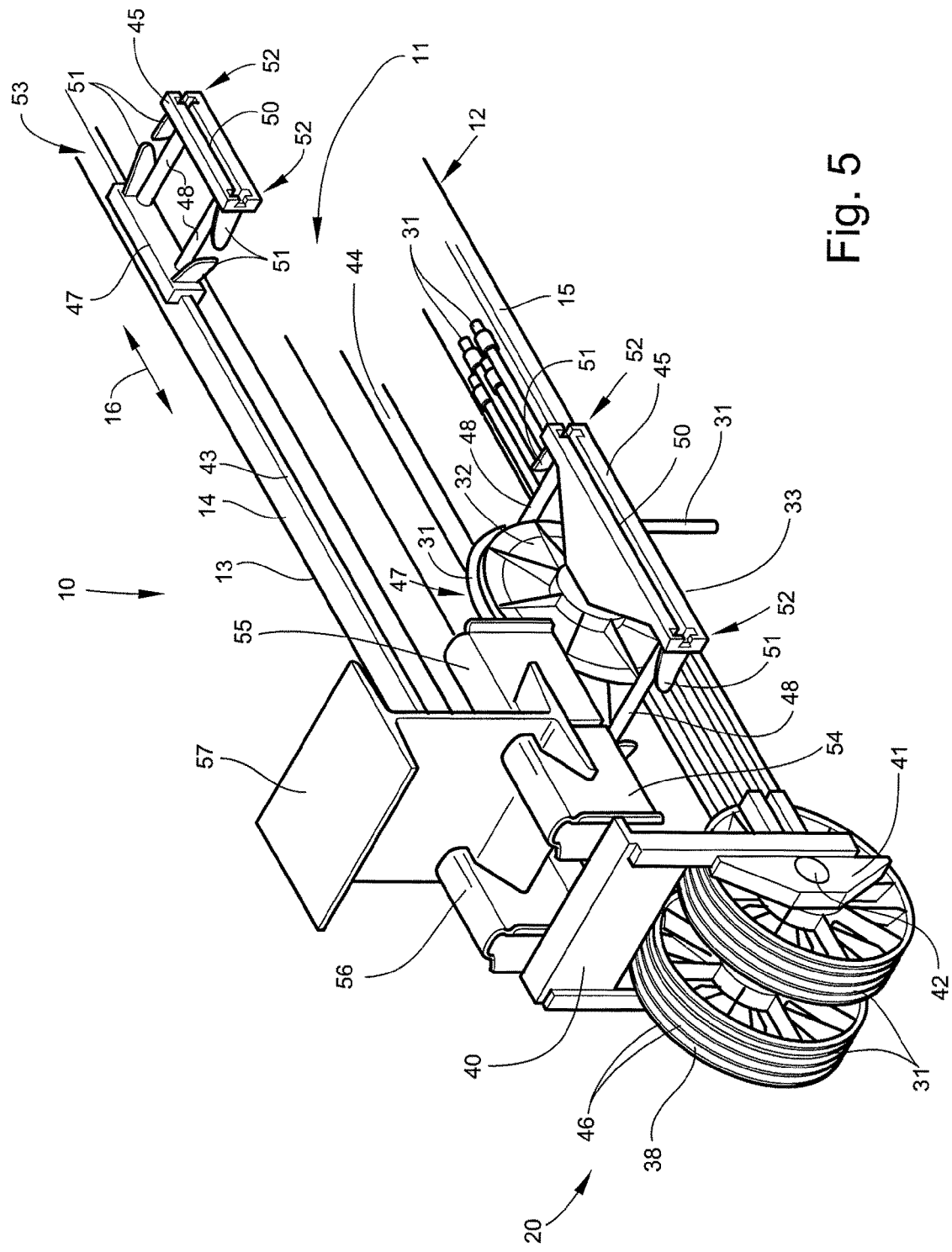
FIG. 5 is a perspective view of the head block end of a lift assembly system having the front half of the compression tube removed to show the internal components in an embodiment of the present invention.

The head block 38 can be located to redirect the elongate member 31, or cable, from a first generally horizontal path from the drive mechanism 22 to a second generally horizontal path to the loft blocks 32 back in the direction of the drive mechanism 22. The head block 38 can include channels 46 for aligning and directing each of a plurality of the cables 31. As shown in FIG. 5, certain embodiments of the head block 38 can include a bifurcated rotating surface such that the cables 31 can be spaced apart into two groups so as to provide a space in the center along the length 16 of the tube 11 for locating the loft blocks 32.

The compression tube 11 can include an opening in the bottom 15 of the tube 11 along at least a portion of the length 16 of the tube 11. The cables 31 that are routed about the loft blocks 32 can be routed downward through the opening for movement upward and downward to raise and lower the attached article 21.

In some embodiments, for example, as shown in FIGS. 1 and 5, the compression tube 11 can include a connecting mechanism disposed on the top 14 of the tube 11 for connecting the tube 11 to an overhead structure 57, such as a building support beam. The connecting mechanism can comprise connector arms 17 that can be movable toward and away from each other. The connecting mechanism can include a tightening mechanism, such as a biasing mechanism, for releasably securing the connecting mechanism about the structure 57.

Some embodiments of the lift assembly system 10 can include a single primary compression tube 11 unit having a predetermined length. In other embodiments, the lift assembly system 10 can include a primary compression tube 11 unit and one or more extension units of the compression tube 11. In such embodiments, the extension tube 11 unit(s) can include a desired number of loft blocks 32, and can be installed end-to-end with the primary tube 11 unit to provide a length of compression tube 11 having various desired lengths. In this arrangement, the lift assembly system 10 can include a single drive mechanism 22 at one end of the primary tube 11 unit. The cables 31 to be routed through the bottom 15 of the extension tube 11 unit can be routed from the single drive mechanism 22 on the drive end 18 of the primary tube 11 through the opposite end of the primary tube 11, to the head block 38, if included, and to the loft blocks 32 in the extension tube 11. In this manner, the lift assembly system 10 can include various lengths of the compression tube 11 and various numbers of the loft blocks 32 for routing a corresponding number of the cables 31 to the article 21 to be moved. Alternatively, compression tubes 11 and/or extensions can be manufactured in customized lengths.

In another aspect of the present invention, some embodiments of the lift assembly system 10 may include a braking mechanism 36. The braking mechanism 36 can be an overspeed braking system. As shown in FIGS. 2 and 3, the brake 36 can be a "load-side" overspeed brake. That is, the brake 36 can be attached to a lift assembly 10 component other than the motor 27. In this configuration, should the motor 27 and/or gears controlling speed of cable movement fail, the lift assembly system 10 can provide a braking mechanism 36 separate from operation of the drive mechanism 23 for preventing free fall of a load attached to the cables 31. In this manner, the load-side brake 36 can provide redundancy relative to the power-train components for controlling downward movement, for example, slowing or stopping, of a load attached to the cables 31.

FIG. 5 shows another illustrative embodiment of a lift assembly system. In some embodiments, the lift assembly system 10 can include a substantially rectangular tube 11 having a front and a rear C-shaped portion connected together to form a front 12, rear 13, top 14, and bottom 15 of the tube 11. In FIG. 5, the top 14 and front 12 portions of the tube 11 have been removed to show the arrangement of components inside the tube 11. The C-shaped portions of the tube 11 can be configured such that when the portions are connected together, the bottom 15 edges of the front and rear portions 12, 13, respectively, remain spaced apart, thereby providing the opening in the bottom 15 along at least a portion of the length 16 of the tube 11. The tube 11 can be connectable to the overhead structure 57, such as a building support beam.

The lift system 10 can include the drum 24 positioned externally to the tube 11, as shown in FIGS. 2-5. The drum 24 can be adapted to wind and unwind one or more elongate members 31, such as cables, to raise and lower the article 21 attached to the elongate members 31. The lift system 10 can further include the drive mechanism 22, as shown in FIGS. 2-5, structurally connected to the drive end 18 of the tube 11 externally. The drive mechanism 22 can comprise the motor 27 rotatingly connected to the first traction drive 25 and operably connected to the drum 24 and to the second traction drive 26. In such a configuration, the elongate member 31 can extend along a first generally horizontal path from the drum 24 about the first and second traction drives 25, 26, respectively, to the tube 11.

The head block 38 can be fixedly connected to the head block end 20 of the tube 11 opposite the drive end 18. As shown in FIG. 5, the head block 38 can rotate about a head block axle 42, which is supported on either side of the head block 38 in a head block axle support 41. A head block mount 40 can be attached to and extend from the axle support 41 on each side of the head block 38. The head block mount 40 can be rotated into alignment with a surface of the tube 11 and be fastened to the tube 11 so as to secure the head block 38 to the tube 11. The head block 38 can be located to redirect the elongate member 31 from the first generally horizontal path to a second generally horizontal path from the head block 38 back toward the drive mechanism 22.

The loft block 32 can be spaced from the head block 38 and connected to an internal portion of the tube 11. The loft block 32 can be located to redirect the elongate member 31 from the second generally horizontal path to a generally vertical path through the bottom opening in the tube 11 to the attached article 21. In some embodiments, the lift system 10 can include a plurality of the loft blocks 32. Each loft block 32 can be positioned at an infinite number of locations on the continuum along the length 16 of the tube 11.

The loft block 32 can further include the loft block slider 33 adapted to position and/or reposition the loft block 32 at a desired location along the length 16 of the tube 11. The loft block slider 33 can comprise a front slider arm 45 spaced apart from a rear slider arm 47, and a support bar 48 on each end of the loft block slider 33 connecting the front and rear slider arms 45, 47, respectively. A loft block axle (not shown) can be supported on one end by the front slider arm 45 and on the opposite end by the rear slider arm 47. The loft block 32 can be rotatingly attached about the loft block axle. Each of the front and rear loft block slider arms 45, 47, respectively, can include the groove 50 along the length 16 of the slider arm 45, 47. The groove 50 an be adapted to slidingly engage a respective lower front rail or lower rear rail 44 along the length 16 of the tube 11. By sliding the loft block slider groove 50 along the lower tube rails 44, the loft block 32 can be positioned at a desired location along the length 16 of the tube 11.

The loft block slider 33 can further include a locking mechanism 52 disposed on each of the front and rear slider arms 45, 47, respectively, for locking the loft block 32 in a desired position along the length 16 of the tube 11. In the embodiment shown in FIG. 5, the loft block slider locking mechanism 52 can include a tab 51 located on each end of the front and rear slider arms 45, 47, respectively, and a biasing mechanism attached to each tab 51. When the tabs 51 are depressed, the biasing mechanism is released and the loft block slider 33 can be slid along the front and rear tube rails 44. When the tabs 51 are released, the biasing mechanism is actuated so as to lock the loft block 32 onto the front and rear tube rails 44.

In some embodiments, the lift system 10 can include a tube support slider 53, as shown in FIG. 5. The tube support slider 53 may be positioned along the length 16 of the tube 11 to provide additional front-to-rear structural support to the tube 11. For example, each of a plurality of the tube support sliders 53 may be positioned in between locations of the loft blocks 32. The tube support slider 53 can be similar to the loft block slider 33 in design and operation. The tube support slider 53 can comprise the front slider arm 45 spaced apart from the rear slider arm 47, and the support bar 48 on each end of the tube support slider 53 connecting the front and rear slider arms 45, 47, respectively. Each of the front and rear tube support slider arms 45, 47, respectively, can include the groove 50 along the length of the slider arms 45, 47. The groove 50 can be adapted to slidingly engage a respective upper front rail or upper rear rail 43 along the length 16 of the tube 11. By sliding the tube support slider groove 50 along the upper tube rails 43, the tube support slider 53 can be positioned at a desired location along the length 16 of the tube 11.

The tube support slider 53 can further include the locking mechanism 52 disposed on each of the front and rear slider arms 45, 47, respectively, for locking the tube support slider 53 in a desired position along the length 16 of the tube 11. The tube support slider locking mechanism 52 can include the tab 51 located on each end of the front and rear slider arms 45, 47, respectively, and a biasing mechanism attached to each tab 51. When the tabs 51 are depressed, the biasing mechanism is released and the tube support slider 53 can be slid along the front and rear tube rails 44. When the tabs 51 are released, the biasing mechanism is actuated so as to lock the tube support slider 53 onto the front and rear tube rails 44.

In certain embodiments, the loft block sliders 33 and the tube support sliders 53 can provide structural support to the compression tube 11 so as to help prevent the tube 11 from bowing outwardly in a perpendicular direction relative to the length 16 of the tube 11. As horizontal stress is placed on the lift system 10 between the drive mechanism 22 and the loft blocks 32 by a load attached to the cables, the tube 11 may have a tendency to bow outwardly from front 12 to back 13. Thus, the loft block sliders 33 and the tube support sliders 53 can help prevent the tube 11 from bowing outwardly in a perpendicular direction relative to the length 16 of the tube 11.

As shown in the embodiment in FIG. 5, the lift assembly system 10 can further include a tube overhead connector 54, also known as a beam clamp tube receiver 118, having a front connector sleeve 55 and rear connector sleeve 56, also known as hooks 122. The beam clamp tube receiver 118 and hooks 122 are described later with reference to FIGS. 17-20.

As described herein, the lift assembly drive mechanism, or power head 22, can include the motor 27. In some embodiments, the power head 22 can further include the gear box 30 attached to the motor 27. The drive shaft 28 can extend outwardly from the gear box 30 and/or motor 27. The drum 24 can be fixedly attached about the end of the drive shaft 28 extending from the gear box 30 and/or motor 27 such that when the drive shaft 28 rotates, the drum 24 can be rotated in the same direction as the drive shaft 28. The drive shaft 28 and drum 24 can be rotated in opposite directions, for example, forward and backward.

Figure 23:
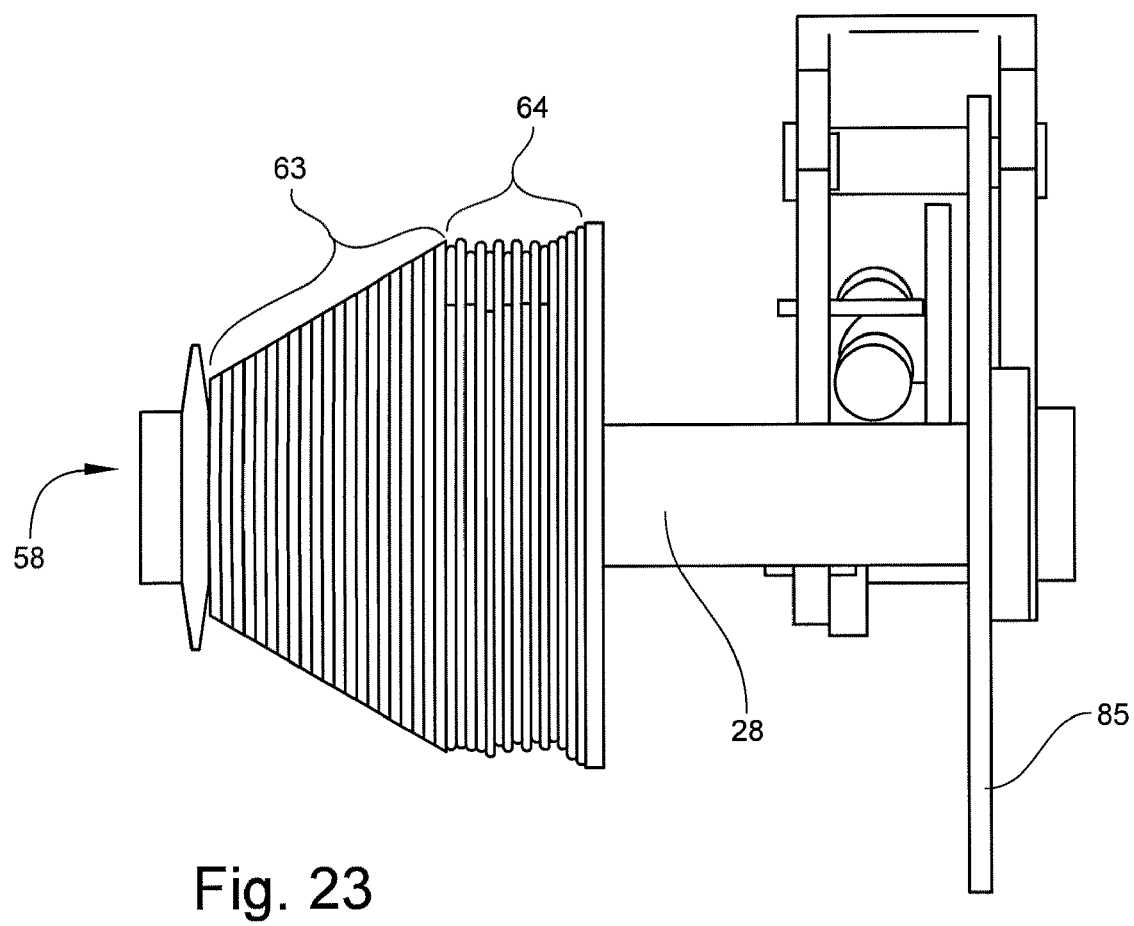
FIG. 23 is a view of a progressively sloped drum in an embodiment of a lift assembly of the present invention.

The drum 24 can have a particular shape capable of accommodating winding and unwinding of the cables 31 about the external surface of the drum 24. In some embodiments of the lift assembly system 10, the drum 24 can comprise a hybrid drum 58 having a funnel shape, as shown in FIGS. 6-11 and 23. In some embodiments, at least a portion of the funnel-shaped, or frusto-conical shaped, drum 58 can have a progressively increasing diameter. As shown in the embodiment in FIG. 6, the drum 58 can be attached to the drive shaft 28 such that the more narrow portion, or apex 60, of the funnel, is attached to the drive shaft 28 at a point distal from the motor 27. In this configuration, the drum 58 can gradually increase in diameter along the width 62 of the drum 58 toward the motor 27 to provide an increasing diameter portion 63 of the drum 58. In other embodiments, the drum 58 can be attached to the drive shaft 27 such that the apex 60 of the drum funnel is attached to the drive shaft 28 at a point proximal to the motor 27 (as shown in FIG. 23). In this configuration, the drum 58 can gradually increase in diameter along the width 62 of the drum 58 away from the motor 27.

The drum 58 can have various diameters and widths from the most narrow apex 60 of the drum 58 to the widest part, or base 61, of the drum 58. For example, a drum 58 suitable for accommodating five cables 31, each cable 31 about ⅛ inch in diameter, can be about four inches wide. Such a drum 58 may be useful, for example, in a fixed speed lift assembly. In an illustrative embodiment of a variable speed lift assembly, the drum 58 may have eight channels 46 and eight cables 31, each cable 31 about 3/16 inch in diameter and having a length sufficient to accommodate 65 feet of travel. Such a drum 58 may be approximately 11 inches wide and have a progressively increasing diameter from about four inches to about 14 inches. The drum may have other larger diameters as needed. The drum 58 can be made of a variety of materials suitable for supporting the cables 31 and a load, such as the article 21, attached to the cables 31. For example, the drum 58 can comprise steel, aluminum, and/or plastic. In certain applications, it may be preferable to have a drum 58 that is as light weight as possible. One lightweight embodiment of the drum 58 of the present invention may be made from glass filled Nylatron. Such a drum embodiment may be injection molded.

Figure 6:
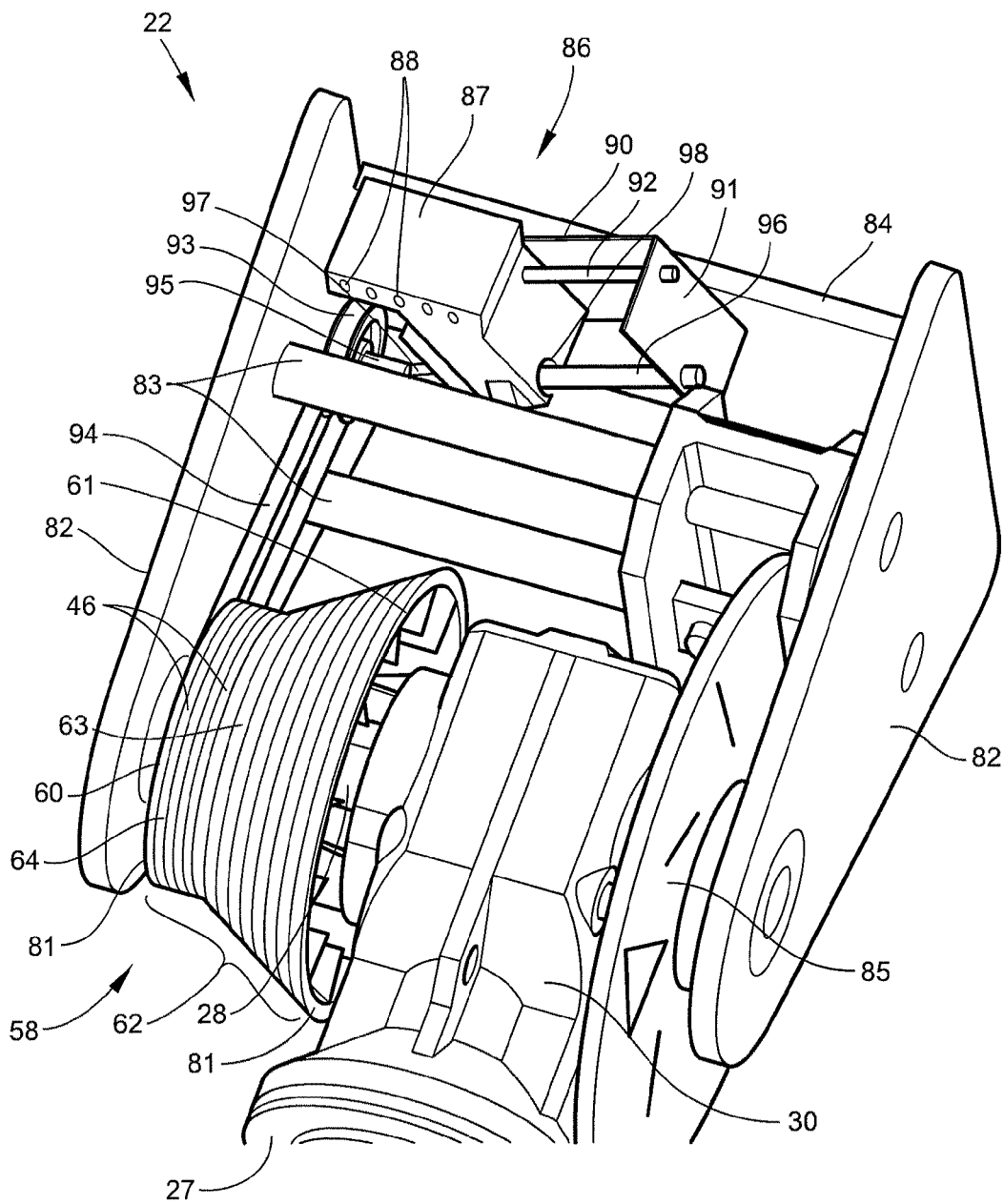
FIG. 6 is a perspective view of a drive mechanism, or power head, of a lift assembly system showing a hybrid progressive drum in an embodiment of the present invention.

In certain embodiments, the drum 58 can include a portion extending from the apex 60 a predetermined distance toward, for example, the motor 27 (as shown in FIG. 6), having the same diameter before the drum 58 begins to gradually increase in diameter. The same, or constant, diameter drum portion 64 can include grooves, or channels 46, in its external surface in which cables 31 can be routed.

The drum 58 can be rotated in one direction so that cables 31 unwind, or pay out, from the external surface of the drum 58 and rotated in the opposite direction so that the cables 31 are wound about the drum. When the drum 58 is rotated so as to wind cables 31 about the drum 58, a first cable 65 can be wound in a first channel 68 adjacent the point of the drum 58 that begins to gradually increase in diameter. As shown in FIG. 6, the first cable 65 can be wound about the drum 58 such that the first loop, or coil 74, of the first cable 65 is wound about the drum 58 in the first channel 68 about the same diameter portion 64 of the drum 58. The first cable 65 can then be wound about the drum 58 in an angled channel 73 along the external surface of the increasing diameter portion 63 of the drum 58. As the first cable 65 is further wound about the drum 58, the next, or second, coil 75 of the first cable 65 is adjacent the first coil 74 and located about the drum 58 at a point having a slightly increased diameter than the constant diameter portion 64 of the drum 58. Each subsequent coil of the first cable 65 can be wound adjacent the preceding coil about gradually increasing diameters of the drum 58. When the first cable 65 is completely wound about the drum 58, substantially the entire external surface of the drum 58 can be covered with adjacent coils of the first cable 65. Such a drum 58 having a gradually increasing diameter can be referred to as a "progressive" drum 58, as the cables 31 can be wound about a progressively larger diameter of the drum 58. Because the drum 58 has a constant diameter portion 64 and a progressively, or gradually, increasing diameter portion 63, the drum 58 can be referred to as a "hybrid" drum 58.

Figure 7:
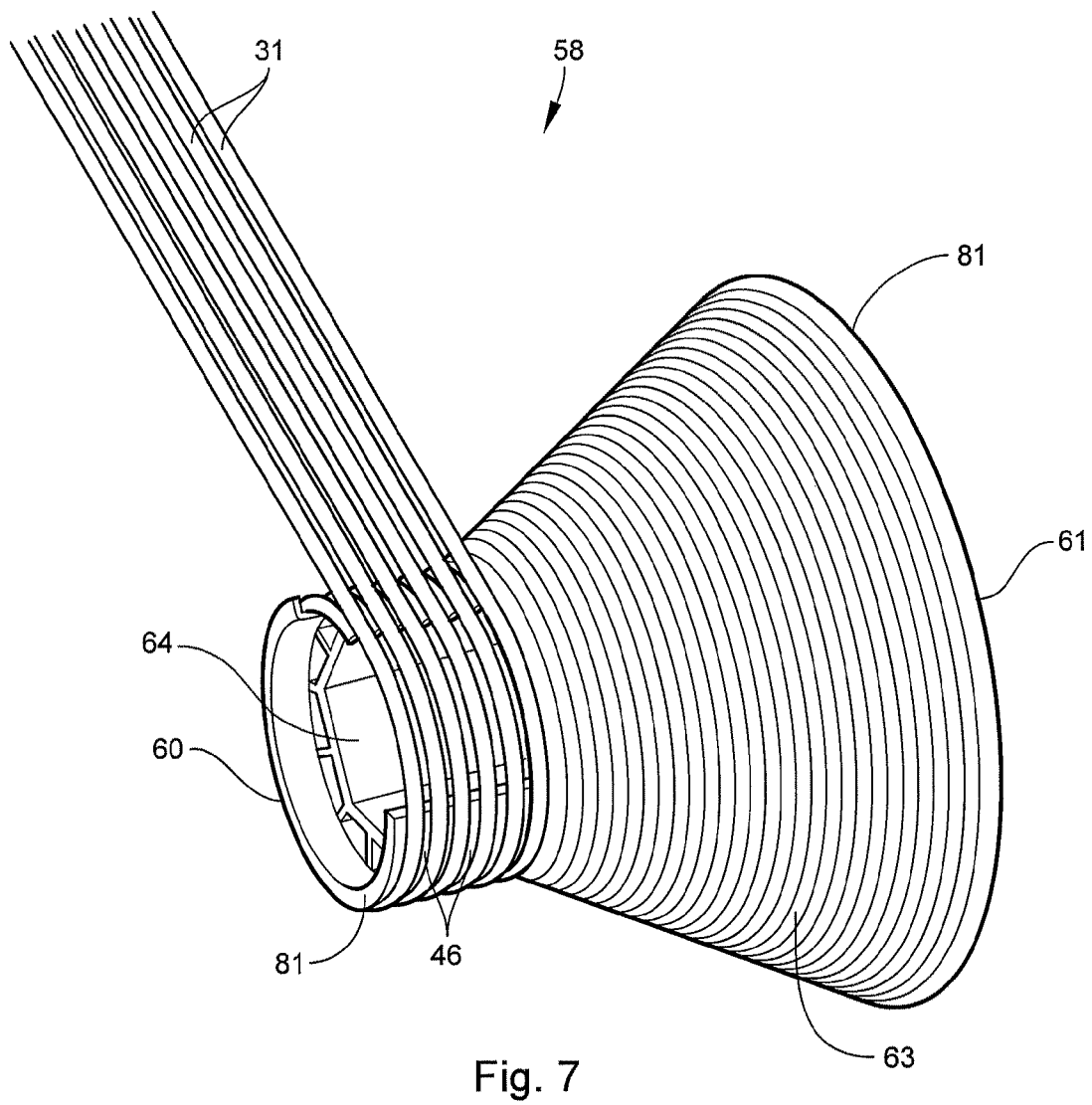
FIG. 7 is a perspective view of a hybrid drum having a constant diameter portion and a gradually increasing diameter portion useful in a power head in an embodiment of the present invention.

The drum 58 can include a second channel 70 adjacent to the first channel 68 on the opposite side of the first channel 68 from the increasing diameter portion 63 of the drum 58. As the drum 58 is rotated so as to wind the cables 31 about the drum 58, a second cable 66 can be wound in the second channel 70 and about the coils of the first cable 65. As shown in FIG. 7, the first coil 76 of the second cable 66 can be wound in the second channel 70 about the constant (smaller) diameter portion 64 of the drum 58. The second coil 77 of the second cable 66 can then be wound about the same diameter portion 64 of the drum 58 in a notch 72 between the first coil 76 of the second cable 66 and the first coil 74 of the first cable 65. The third coil 78 of the second cable 66 can then be wound about the drum 58 at a point having a slightly increased diameter between the first and second coils 74, 75, respectively, of the first cable 65. Each subsequent coil of the second cable 66 can be wound adjacent the preceding coil and about gradually increasing diameters of the drum 58. In this manner, coils of the second cable 66 can be wound about the drum 58 into the notches 72 between adjacent coils of the first cable 65 such that the second cable 66 "nests" within the coils of the first cable 65. When the second cable 66 is completely wound about the drum 58, all but the last few coils (for example, the last two coils) of the first cable 65 can be covered with adjacent coils of the second cable 66.

Figure 8:
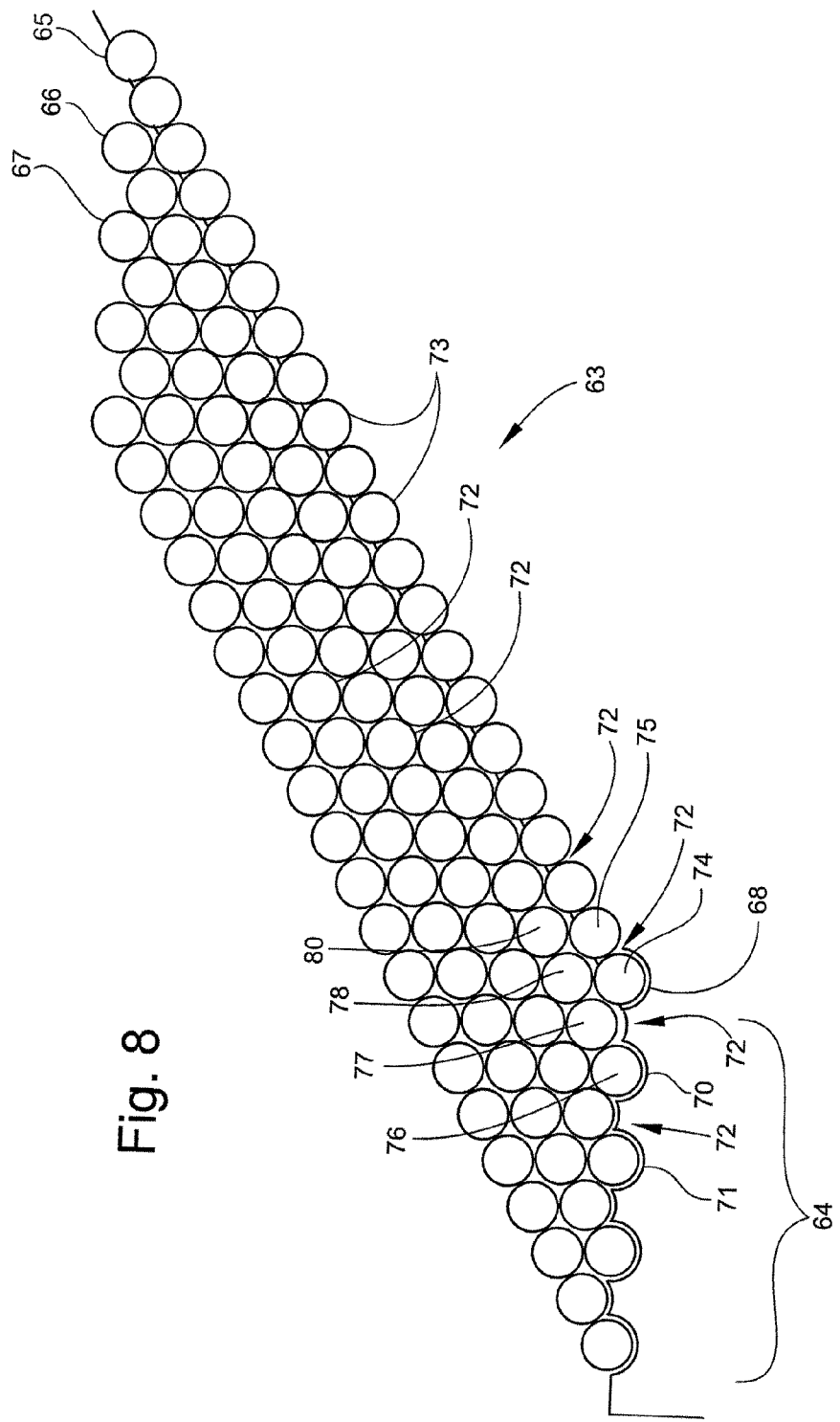
FIG. 8 is a diagrammatic, cross-sectional view of the drum in the lift assembly power head shown in the embodiment in FIG. 6, showing cables wound about the same diameter portion and the increasing diameter portion of the drum in a nested fashion.
Figure 9:
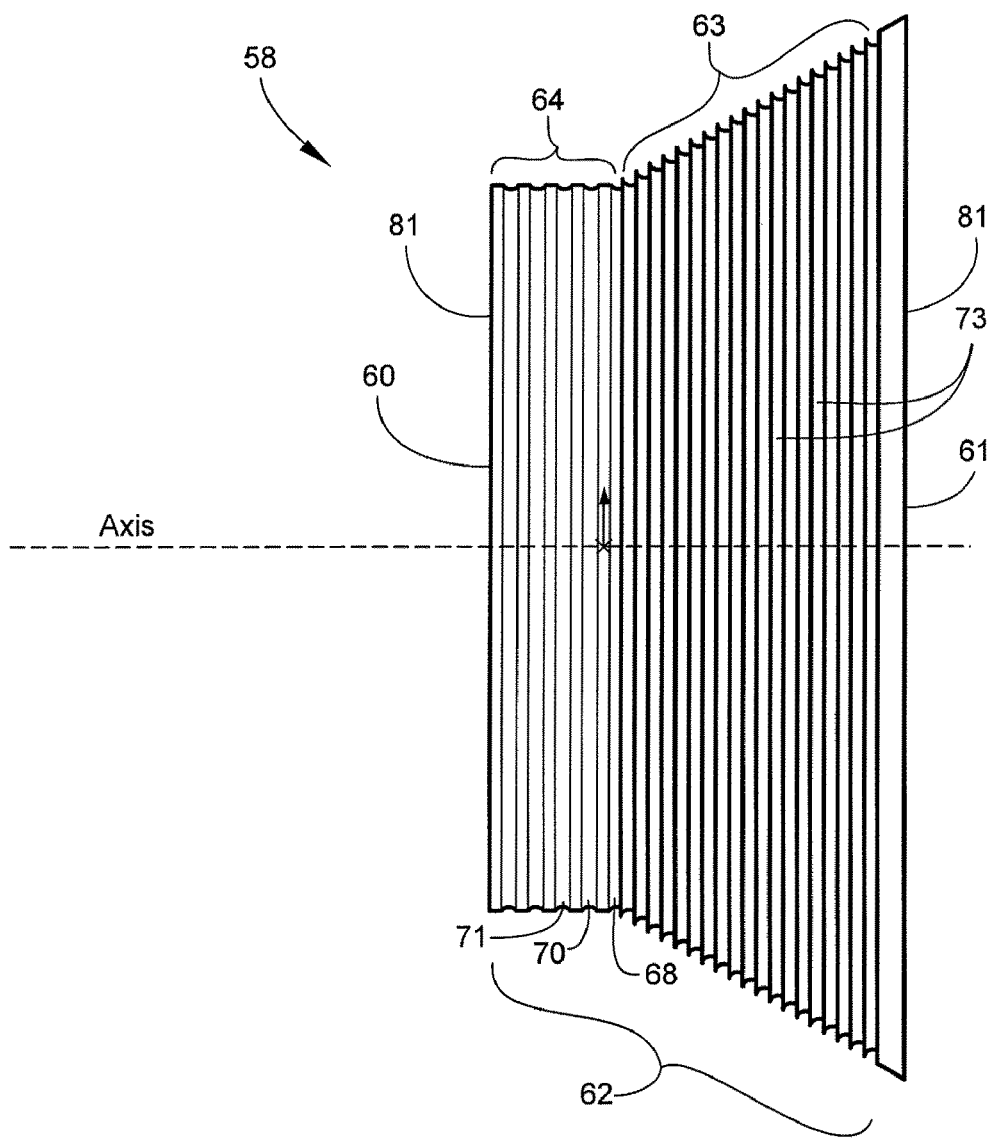
FIG. 9 is a view of the drum in the lift assembly power head shown in the embodiment in FIG. 6, opened along the axis of the drum and flattened to show the channels and the same diameter portion and the increasing diameter portion of the drum.
Figure 10:
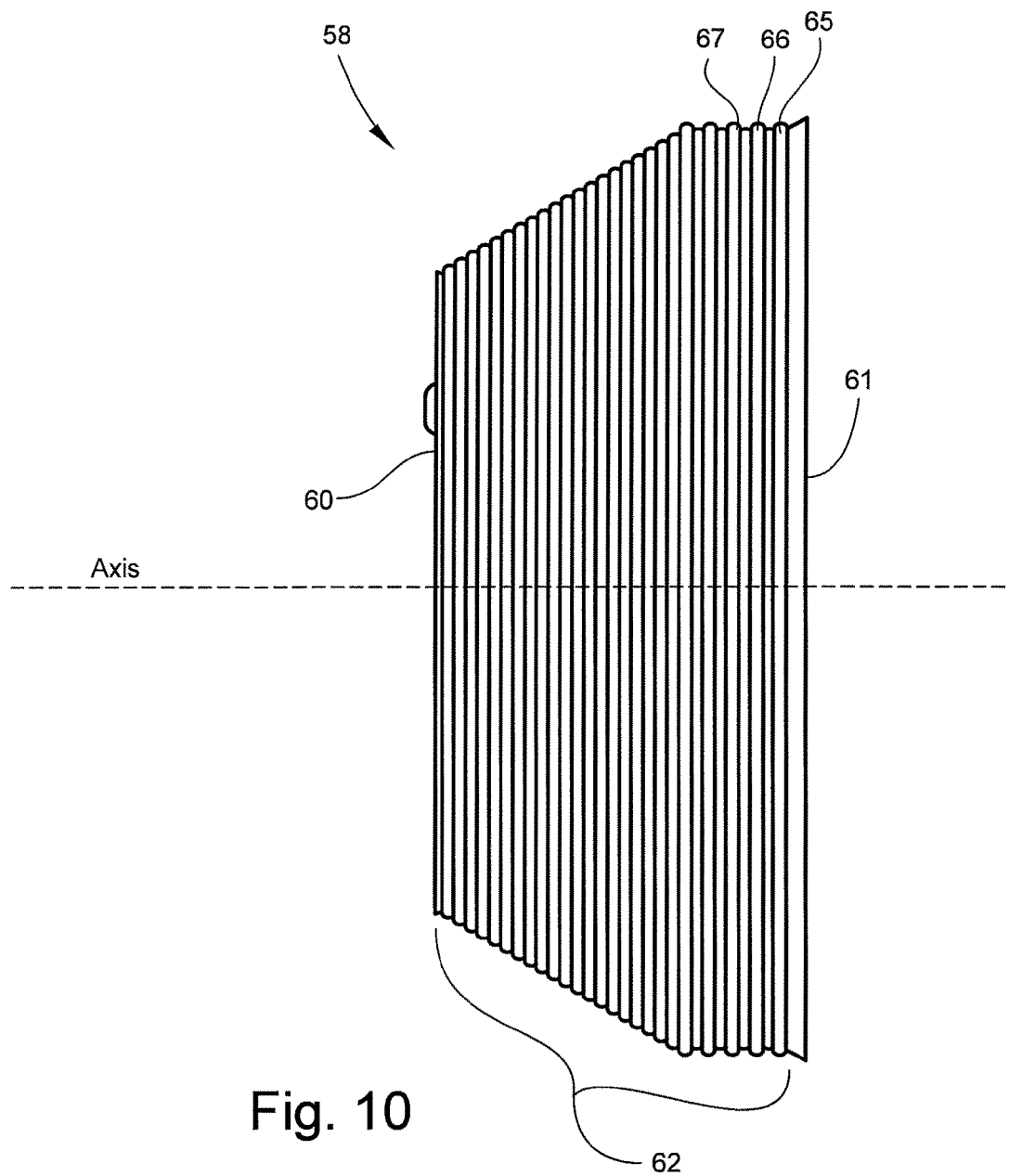
FIG. 10 is a diagrammatic, perspective view of the drum in the lift assembly power head shown in the embodiment in FIG. 6, opened along the axis of the drum and flattened, showing cables wound about the drum in a nested fashion.
Figure 11:
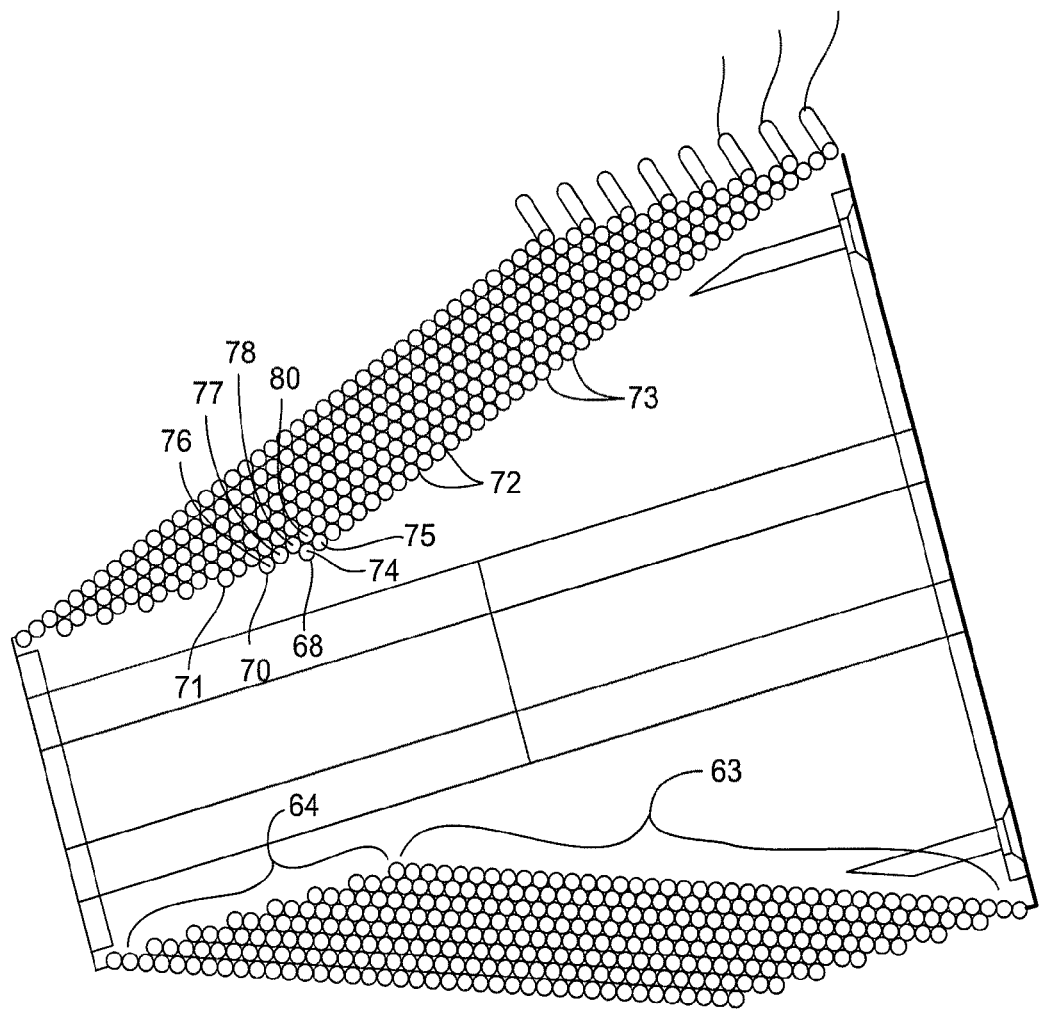
FIG. 11 is a diagrammatic, cross-sectional view of another embodiment of a lift assembly drum, showing cables wound about the same diameter portion and the increasing diameter portion of the drum in a nested fashion.

As shown in FIGS. 8 and 11, each subsequent cable 31 adjacent a preceding cable 31 (which is more distal from the increasing diameter portion 63 of the drum 58) can be wound about the drum 58 in the same manner. That is, a subsequent cable 31 can be wound first about the same diameter portion 64 of the drum 58 in a channel 46 for that cable 31 and in notches 72 between a coil of that cable 31 and a coil of the adjacent, already wound-up cable 31, and then about the drum 58 at points having gradually increasing diameters in notches 72 between a coil of that cable 31 and a coil of the adjacent cable 31. Each subsequent cable 31 can thus be wound about the drum 58 into the notches 72 of the adjacent, already wound-up cable 31 such that each subsequent cable 31 "nests" within the coils of the adjacent, already wound-up cable 31. Generally, each of the cables 31 can be wound about the drum 58 and unwound from the drum 58 substantially simultaneously.

In certain embodiments, the channels 46 in the same diameter portion 64 of the drum 58 may be spaced from each other, and/or the diameters of the cables 31 relative to those spacings may be such, so that more than one or two coils of a cable 31 may be wound about the same diameter portion 64 of the drum 58 before being wound about the increasing diameter portion 63 of the drum 58. For example, as shown in FIGS. 7 and 11, the first three coils 76, 77, 78, respectively, of the second cable 66 can be wound about the same diameter portion 64 of the drum 58. The spacing between the first and second channels 68, 70, respectively, and the diameters of the cables relative to that spacing can allow the first and second coils 76, 77 of the second cable 66 and the second and third coils 77, 78, respectively, of the second cable 66 to "stack" adjacent to each other at substantially the angle of the increasing diameter portion 64 of the drum 58.

Embodiments of the present invention having a "nesting" feature of adjacent cables 31 wound about the funnel-shaped drum 58 have the advantage of winding about the drum 58 and unwinding from the drum 58 in such a manner so as to avoid uneven rubbing against adjacent cables 31. The channels 46 in the surface of the drum 58 can also facilitate the even movement of the cables 31 as they are wound about and unwound from the drum 58. As a result, the cables 31 can be wound and unwound with less friction and with less noise than manners in which cables 31 are wound and unwound in conventional lift or hoist systems. Decreased friction in such lift systems 10 can advantageously decrease requirements for maintenance and prolong the effective life of the drum 58, cables 31, and lift system 10. Decreased noise may be a benefit in certain performance environments in which minimal noise from movement of a lift system may be desired.

In addition, such a "nesting" feature and the increasing diameter of the progressive, funnel-shaped drum 58 allow the cables 31 to be wound about the drum 58 in a smaller space. As a result, the width 62, and overall size, of the drum 58 can be smaller than conventional 4 drums, such as "yo-yo" type drums or "pile" type drums in which cables 31 coil about the drum vertically on top of themselves. In a "yo yo" drum, designed for light loads and infrequent duty cycles (such as lights that need to be moved only periodically to change bulbs), coils of individual cables 31 stack vertically on top of previous coils. In "pile" type drums, after the cable 31 has wound completely across the face of the drum, it is forced up to a second layer at a flange on the side of the drum. The cable 31 then winds back across the drum in the opposite direction. In order to advance across the drum, the cable must cross horizontally over the crown of the cable 31 in each previous coil. Such "cross-over" subjects the cable 31 to abrasion, crushing, and pinching as it is pushed across the cable crown of the first cable layer. Such stress can cause erratic motion of the cables 31 as they are wound up onto the drum and/or unwound from the drum.

Embodiments of the progressively increasing diameter hybrid drum 58 can thus provide the advantage of coiling cables 31 directly into angled notches 72 without having to push a subsequent cable 31 over the crown of the previously coiled cable 31. In addition, embodiments of the progressively increasing diameter hybrid drum 58 can minimize, or significantly reduce, the need for increased torque to wind and unwind cables 31 on conventional drums having vertically stacked coils of cables 31. That is, a smaller and more lightweight drum 58, as provided in embodiments of the present invention, can advantageously decrease the torque needed to move the drum 58 and cables 31, allowing a smaller motor 27 and gearbox 30 than in conventional lift systems. Smaller drum and power head 22 components may be less expensive than conventional components, and their decreased bulk can allow placement of the drum 58 in alternative locations in or about the lift system 10. As an example, some conventional lift system power heads (motor, gearbox, and drum) that accommodate a maximum of seven cables 31 may weigh between 500 and 850 pounds. In some embodiments of the present invention, the power head 22 may accommodate eight cables 31, which may be required in many theater applications, and weigh as little as 180 pounds. In some embodiments, the drum 58 can be oriented perpendicularly to the travel path of the cables 31 (not shown). In this manner, no translating motion is required (as in conventional lift systems) to wind and unwind the cables 31 on the drum 58. As a result, less energy is required to move the cables 31 relative to the drum 58.

The embodiments shown in FIGS. 6, 7, 8, and 10 illustrate the drum 58 having five channels 46 and five cables 31. In other embodiments, the drum 58 can include more or less than five channels 46 and cables 31, depending on the intended use of the lift system 10 of which the drum 58 is a component. For example, one embodiment of the lift system 10 may be used as a fixed speed lift for movement of a bank of lights and that may require a relatively smaller number of cables 31 and thus fewer channels 46. Another embodiment of the lift system 10 may be used for variable speed movement of, for example, theatrical sets, for which a relatively larger number of cables 31 and channels 46 may be desired. As an example, the embodiment in FIG. 11 illustrates the drum 58 having eight channels 46 and cables 31. In certain embodiments, one or more cables 31 in the lift system 10 can have more than one lift line attached to the end of the cable 31 for attaching to a plurality of points along the length of a load, such as a batten, to be raised and lowered. In particular embodiments, one of the cables 31 can be attached to a cable management system 100, such as a sheath of electrical wires, or lines, attached to lights on a batten, for moving the electrical lines up and down with movement of the batten by the other cables 31.

In some embodiments, the end of the drum 58 at its smallest diameter apex 60 can include a flange 81 extending upward from the surface of the drum 58. In some embodiments, the end of the drum 58 at its largest diameter, or base 61, can include a flange 81 extending upward from the surface of the drum 58. Such flanges 81 can serve to maintain the cables 31 on the drum 58 during winding and unwinding. However, in certain embodiments, the cables 31 can be sufficiently maintained in the dedicated channels 46 and/or supported in position by nesting onto each other during winding without apex and/or base flanges 81.

In some embodiments, the power head 22 can be attached directly to the lift assembly structure, such as the compression tube 11. For example, the ends of the drive shaft 28 can extend outwardly from opposite sides of the gear box 30, and each end of the drive shaft 28 can be rotatingly attached to opposite sides of the compression tube 11. Alternatively, as shown in the embodiment in FIG. 6, the power head 22 may include two spaced-apart side plates 82. Each end of the drive shaft 28 can be rotatingly attached to one of the side plates 82. One or more support bars 83 can extend between the side plates 82. A support plate 84 can extend between the two side plates 82 a distance from the motor 27, gear box 30, drum 58, support bars 83, and other power head components so as to at least partially enclose the power head 22 between the side plates 82 and support plate 84. The support bar(s) 83 and support plate 84 can provide structural support to the side plates 82. In this configuration, the side plates 82 can be attached to the compression tube 11 or other assembly of head block(s) 38 and loft blocks 32 in the lift system 10.

The lift system power head 22 may include the braking mechanism 36. For example, as shown in the embodiment in FIG. 6, the braking mechanism 36 can include a brake disk 85 operably connected to the portion of the drive shaft 28 extending outward from the gear box 30 (or motor 27) on the side of the gear box 30 opposite the drum 58. Alternatively, the brake disk 85 can be connected to the drive shaft 28 adjacent the drum 58. The braking mechanism 36 can be configured to help regulate movement of the drive shaft 28, drum 58, and cables 31 and thereby movement of a load attached to the cables 31. Such a braking mechanism 36 can be controllable by mechanical and/or electronic means.

Some embodiments of the lift system 10 can include a cable guide mechanism. The cable guide mechanism can comprise a guide assembly 86 for guiding movement of the cables 31 from the drum 58 to loft blocks 32 as they are unwound from the drum 58 and from the loft blocks 32 to the drum 58 as they are wound about the drum 58. As shown in FIG. 6, the guide assembly 86 can include a guide block 87 having one guide hole 88 for each cable 31 to be wound and unwound from the drum 58. The guide assembly system 86 can further include a guide block travel support arm 90. In some embodiments, the support arm 90 can be fixed to the support plate 84. A portion of the support arm 90 can extend at the end of the support arm 90 substantially perpendicularly to the remainder of the support arm 90. The support arm 90 can include such an extension 91 on one or both ends of the support arm 90. A guide bar 92 can be fixed on one end to the support arm extension 91, and on its opposite end the guide bar 92 can be slidably attached to the guide block 87. The guide block 87 can be slidably attached about the guide bar 92 such that the guide block 87 can move parallel to the drive shaft 28. In another embodiment, the guide block 87 can include a roller (not shown) comprising the same number of roller channels as the channels 46 on the drum 58 and adapted so that one of each of the cables 31 can be guided about one of the roller channels to maintain the cables 31 in position between the drum 58 and the loft blocks 32.

The guide assembly 86 can further include a pulley 93 rotatingly attached to the adjacent side plate 82 or other structure a distance from the drum 58 and within the power head 22. The pulley 93 can be operably attached to the drive shaft 28 with a linking mechanism 94, for example, a belt or chain. In this manner, when the drive shaft 28 rotates in one direction, the pulley 93 rotates in the same direction as the drive shaft 28 and at a constant speed relative to the speed of drive shaft rotation. A pulley shaft 95 can extend outward from the pulley 93. A threaded rod 96 can be operably connected to the pulley shaft 95, for example, with a rotating joint 97. The guide rod joint 97 can be a "universal" type joint that allows the threaded rod 96 to be rotated at an angle relative to the longitudinal axis of the pulley shaft 95. The threaded rod 96 can be rotatingly attached on the end opposite the pulley 93 to the support arm extension 91. The guide block 87 can include a threaded slot 98 that can be matingly engaged with the threaded rod 96, for example, an ACME® rod.

In such a configuration, when the drive shaft 28 rotates in a direction so as to wind the cables 31 about the drum 58, the pulley 93 rotates in the same direction as the drive shaft 28 and drum 58. The rotating pulley 93 causes the threaded rod 96 to rotate in the same, winding direction as, and with a constant speed relative to, the drive shaft 28, thereby causing the guide block 87 to ride upward along the threaded rod 96 and the guide bar 92. In this way, the cables 31 being wound about the drum 58 can be guided from the loft blocks 32 through the guide holes 88 in the guide block 87 along the width of the surface of the drum 58 and parallel to the drive shaft 28. Likewise, when the drive shaft 28 rotates in the opposite direction so as to unwind the cables 31 from the drum 58, the pulley 93 rotates in the same direction as, and with a constant speed relative to, the drive shaft 28 and drum 58. The rotating pulley 93 causes the threaded rod 96 to rotate in the same, unwind direction as the drive shaft 28, thereby causing the guide block 87 to ride downward along the threaded rod 96 and the guide bar 92. In this way, the cables 31 being unwound from the drum 58 can be guided to the loft blocks 32 through the guide holes 88 in the guide block 87 along substantially the same decreasing angle as the angle at which the cables 31 are paid out along the surface of the drum 58. As a result, the guide assembly 86 can help maintain the cables 31 at the same angle (the "fleet" angle) along the route of the cables 31 to and from the loft blocks 32 as the angle at which the cables 31 leave the surface of the drum 58 during unwinding and return to the drum 58 surface during winding.

Maintaining cable fleet angles in this manner can provide the benefit of preventing the cables 31 from unnecessarily rubbing against each other, thereby increasing efficiency of movement, decreasing "wear and tear" on the cables 31 and other lift system components, and decreasing noise. The fleet angle of cables 31 from conventional drums, for example, a "yo-yo" type drum on which cables 31 stack vertically, must be maintained within a narrow fleet angle tolerance, such as one and one-half degrees, in order to prevent the cables 31 from rubbing the sides of the drum and/or from falling off the lock block 32. In embodiments of the present invention, maintaining such a precise fleet angle may not be as critical, since the cables 31 can be wound up in a more horizontal and angled fashion. In some embodiments, the fleet angle can operate smoothly and effectively within a range of plus or minus one and one-half degrees variation as the cables 31 travel between the drum 58 and the loft blocks 32.

Certain embodiments of the lift assembly system 10 comprising the hybrid progressive drum 58 may operate effectively without the guide assembly 86. However, in embodiments comprising such a guide assembly, or system 86, additional safety may be provided by helping maintain the cables 31 in position during winding and unwinding operations.

Some embodiments of the present invention can include a method for raising and lowering the article 21. Embodiments of components of the lift assembly system 10 described herein may be utilized in such a method. Such a method can include, for example, providing a lift system 10 comprising (a) the substantially rectangular tube 11 connectable to the overhead structure 57, (b) the drive mechanism 22 connected externally on one end of the tube 11, (c) the drum 24 or the hybrid drum 58 operably connected to the drive mechanism 22, and (d) the plurality of loft blocks 32 connected to the tube 11 internally. A plurality of the cables 31, each attached on one end to the drum 24, 58, can be routed through a generally horizontal path of travel from the drum 24, 58 to one of the loft blocks 32, and then through a generally vertical path of travel downward from the loft block 32. An opposite end of each cable 31 can be attached to the article 21. The cables 31 can then be wound about the drum 24, 58 to raise the article 21 and unwound from the drum 24, 58 to lower the article 21.

In some embodiments of such a method, the drum can have a funnel-shape, as does the hybrid progressive drum 58, and can include the same diameter portion 64 and the increasing diameter portion 63, each portion having channels 46 in its surface for guiding the cables 31. When the drum 58 is rotated so as to wind the cables 31 about the drum 58, the first cable 65 can be wound in the first channel 68 adjacent the point of the drum 58 that begins to gradually increase in diameter. The first cable 65 can be wound about the drum 58 such that the first coil 74 of the first cable 65 is wound about the drum 58 in the first channel 68 about the same diameter portion 64 of the drum 58. The first cable 65 can then be wound about the drum 58 in an angled channel 73 along the external surface of the increasing diameter portion 63 of the drum 58. Subsequent coils of the first cable 65 can be wound adjacent the preceding coil and about gradually increasing diameters of the drum 58. In some embodiments, the surface of the drum 58 can be smooth.

In such a method, the drum 58 can include the second channel 70 adjacent to the first channel 68 on the opposite side of the first channel 68 from the increasing diameter portion 63 of the drum 58. As the drum 58 is rotated so as to wind the cables 31 about the drum 58, the second cable 66 can be wound in the second channel 70 and about the coils of the first cable 65. The first coil 76 of the second cable 66 can be wound in the second channel 70 about the same diameter portion 64 of the drum 58. The second coil 77 of the second cable 66 can then be wound about the same diameter portion 64 of the drum 58 in the notch 72 between the first coil 76 of the second cable 66 and the first coil 74 of the first cable 65. The third coil 78 of the second cable 66 can then be wound about the drum 58 at a point having a slightly increased diameter between the first and second coils 74, 75, respectively, of the first cable 65. Each subsequent coil of the second cable 66 can be wound adjacent the preceding coil and about gradually increasing diameters of the drum 58. In this manner, coils 76, 77, 78, 80 of the second cable 66 can be wound about the drum 58 into the notches 72 between adjacent coils of the first cable 65 such that the second cable 66 "nests" within the coils 74, 75, 76 of the first cable 65. Subsequent adjacent cables 31 can be wound about the drum 58 in a similar manner such that coils of those cables 31 "nest" in notches 72 of the adjacent, previously wound-up cable 31.

In some embodiments of a method, the cables 31 can be guided by the guide assembly 86 as they are unwound from the drum 58 to loft blocks 32 and as they are wound about the drum 32 from the loft blocks 32. As shown in FIG. 6, the guide assembly 86 can include the guide block 87 having one guide hole 88 for each cable 31 to be wound about and unwound from the drum 58. The guide assembly system 86 can be operably connected to the motor 27 so that the guide block 87 can move at the same rate as the drum 58. The guide block 87 can be configured so as to move along parallel to the drive shaft 28. In this way, the cables 31 being wound about the drum 58 can be guided from the loft blocks 32 through the guide holes 88 in the guide block 87, or about a guide roller attached to the guide block 87, along the width of the drum 58. As a result, the guide assembly 86 can help maintain the cables 31 at the same "fleet" angle along the route of the cables 31 to and from the loft blocks 32 as the angle at which the cables 31 leave the surface of the drum 58 during unwinding and return to the drum 58 surface during winding.

Some embodiments of the lift system 10 of the present invention can include a cable management system 100. The cable management system 100 can include a mechanism for stacking wires, for example, electrical wires from lights, as they are being raised and lowered. In some embodiments of the lift system 10, electrical wires and/or other types of wires can be contained in an outer sheath, which can be referred to as a wire containment cable 101, or wire cable. The wire containment cable 101 may be about four inches wide, for example. The wires at the end of the wire containment cable 101 proximal to the batten or other load can be connected to an output object, for example, electrical outlets or lights, attached to the batten. The end of the wire cable 101 opposite the batten can be connected to an input source, for example, a power source.

In conventional cable management systems, the wires, or wire cable, can fold back and forth periodically on themselves in a "scissoring" or "switchback" fashion, for example, every few feet. One risk of folding wires back onto themselves repeatedly is that they can be undesirably pinched, and can become worn over time. Some embodiments of the cable management system 100 according to the present invention include a system for controlling movement of such electrical wires, and/or other cables, so as to avoid unnecessary pinching or binding.

In some conventional cable management systems, the electrical wire cable is collected in a tray positioned on top of a batten as the batten is raised. Such a tray may be referred to as a "flip flop" tray, since a portion of the electrical wire cable can be "flipped" in one direction and then "flopped" back onto itself in the opposite direction. A disadvantage of allowing such wire cables to collect in a stacked fashion on top of a batten, particularly on one end of the batten, is that the collected cables can cause the batten to be top heavy, which may cause the batten to become unbalanced and undesirably alter the orientation of the batten and/or articles attached to the batten.

Figure 12:
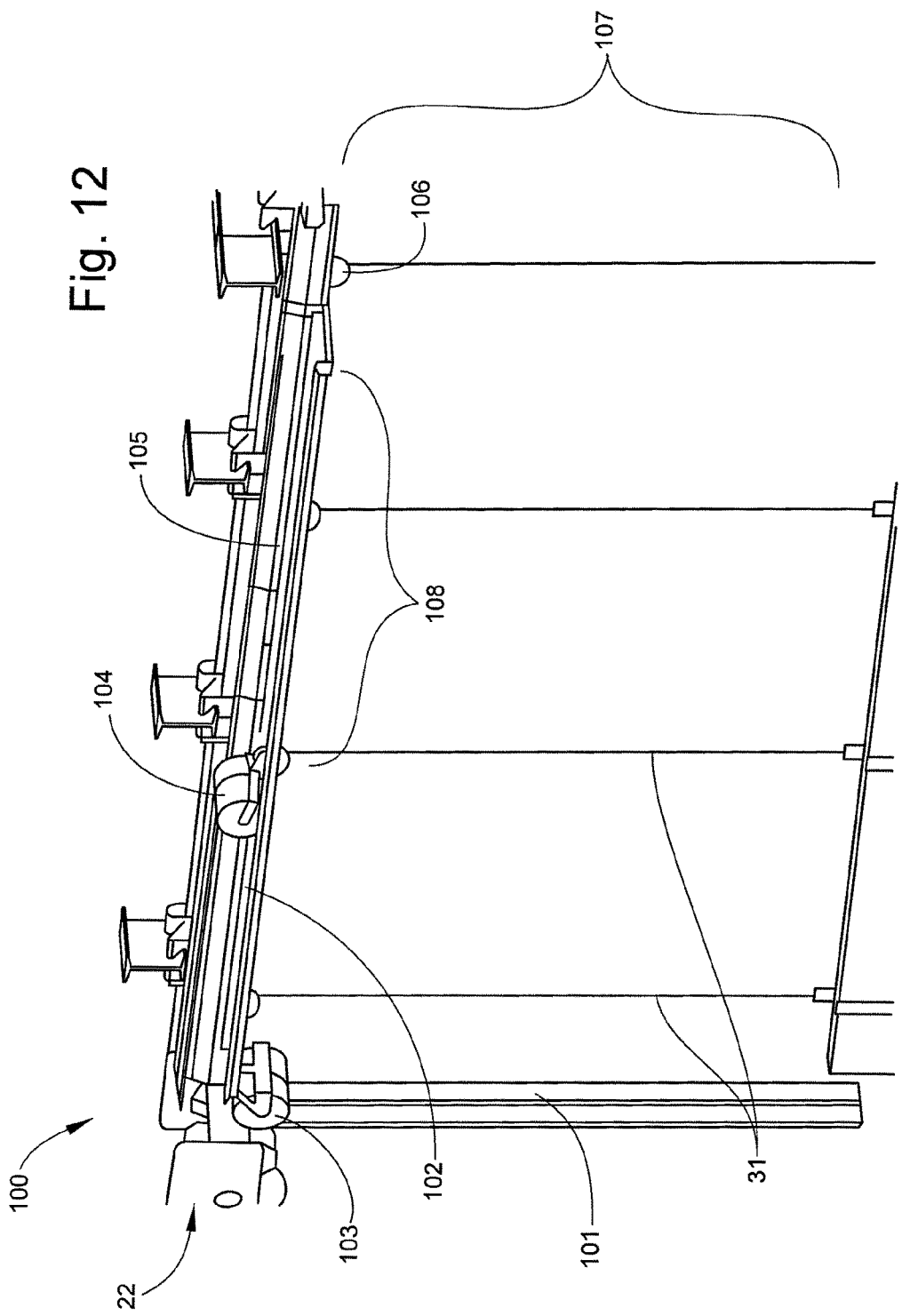
FIG. 12 is a perspective view of a cable management system, showing a tray attached to a compression tube and first and second rollers for guiding an electrical wire containment cable into and out of the tray, in an embodiment of the present invention.

In some embodiments of the present invention, the cable management system 100 can include a housing, or tray 102, attached to the compression tube 11. The tray 102 can have dimensions suitable for containing the wire cable 101. As shown in the embodiment in FIG. 12, the tray 102 can be attached to the exterior of one side of the compression tube 11. The tray 102 can extend along the entire length 16 of the tube 11, or along a portion of the tube 11, for example, the majority of the length 16 of the tube 11. The cable management system 100 can include rollers about which the wire containment cable 101 can be guided into and positioned in the tray 102 and guided out of the tray 102. A first roller 103 can be stationarily attached to one end of the tray 102. In certain embodiments, the first roller 103 can be attached to the end of the tray 102 adjacent the power head 22 of the lift assembly 10. In certain embodiments, the first roller 103 can be geared to correspond with the gearing of the power head motor 27 so that the first roller 103 rotates in the same direction and at the same speed as the drum 58 connected to the motor 27. A second roller 104 can be movably attached to the tray 102 such that the second roller 104 moves a predetermined distance along the length of the tray 102 as the batten is raised and lowered.

The wire containment cable 101 can be connected to one of the load lift cables 31, such as the cables 31 described herein with reference to FIGS. 6-11, that wind about and unwind from the drum 58 in the lift system power head 22. The lift cable 31 to which the wire containment cable 101 can be attached can be a wire cable lift cable 105. The wire cable lift cable 105 can be routed from the drum 58 to a wire cable lift cable loft block 106 near the end of the tube 11 opposite the power head 22, around the loft block 106, and back in the opposite direction toward the power head 22. The wire cable lift cable 105 can be attached at its distal end to the wire cable 101 and to the second roller 104. As a result, the wire containment cable 101 can move in the same direction (vertically) and at the same rate as the lift cables 31 and the load attached to the lift cables 31. As the lift cables 31 are wound onto the drum 58, the second roller 104 moves toward the wire cable loft block 106, and the wire cable lift cable 105 moves around the wire cable loft block 106 and is likewise wound onto the drum 58 the same amount and at the same rate as the lift cables 31 attached to the load, or article 21, are wound. As the lift cables 31 are unwound from the drum 58, the wire cable lift cable 105 is likewise unwound from the drum 58 and moves around the wire cable loft block 106, allowing the second roller 104 to move away from the wire cable loft block 106 and lower the wire cable 101 the same amount and at the same rate as the lift cables 31 attached to the load are lowered.

When the batten is in a lowered position, the wire containment cable 101 can extend downward from the tray 102 around the first roller 103 to the batten or load. As the load attached to the lift cables 31 is raised, the wire cable 101 can be routed from its substantially vertical position, about the top of the first roller 103, and to a substantially horizontal position in the tray 102. The wire cable 101 can be guided about the top of the second roller 104 such that, as the load is raised, the wire cable 101 is positioned so as to lie flat in the tray 102. When the article 21 is fully raised to a position adjacent the tube 11, the wire containment cable 101 can be positioned flat in a single layer along the length of the tray 102.

The wire containment cable 101 may be "single purchased," defined as a one-to-one relationship of the horizontal movement to the vertical movement of the wire cable 101. As the wire cable 101 moves a particular distance 107 vertically while the lift cables 31 (and load) are being moved vertically, the wire cable 101 moves that same distance 108 horizontally about and within the tray 102. In certain embodiments, the wire containment cable 101 can be "double purchased," in that as the lift cables 31 and the wire containment cable 101 move a particular vertical distance 107, the wire cable 101 can be moved about and within the tray 102 a horizontal distance 108, which is less than the vertical distance 107. The horizontal distance 108 may be, for example, about one half the vertical distance 107. That is, as the wire cable 101 is moved upward while the load is being raised, the wire cable 101 may be doubled onto itself within the tray 102. As an example, if the wire cable 101 is raised 60 feet vertically, the wire cable 101 may move in one direction horizontally for 30 feet, for example, and then be folded back onto itself by the second roller 104 into the tray 102 in the opposite direction for 30 feet. In this way, the wire cable 101 can be folded back onto itself once, allowing both layers of the wire cable 101 to lie flat along a substantial distance within the tray 102. In embodiments in which the wire containment cable 101 is "single purchased," the wire lift cable 105 can be "single purchased." In embodiments in which the wire containment cable 101 is "double purchased," the wire lift cable 105 can be "double purchased."

Figure 15:
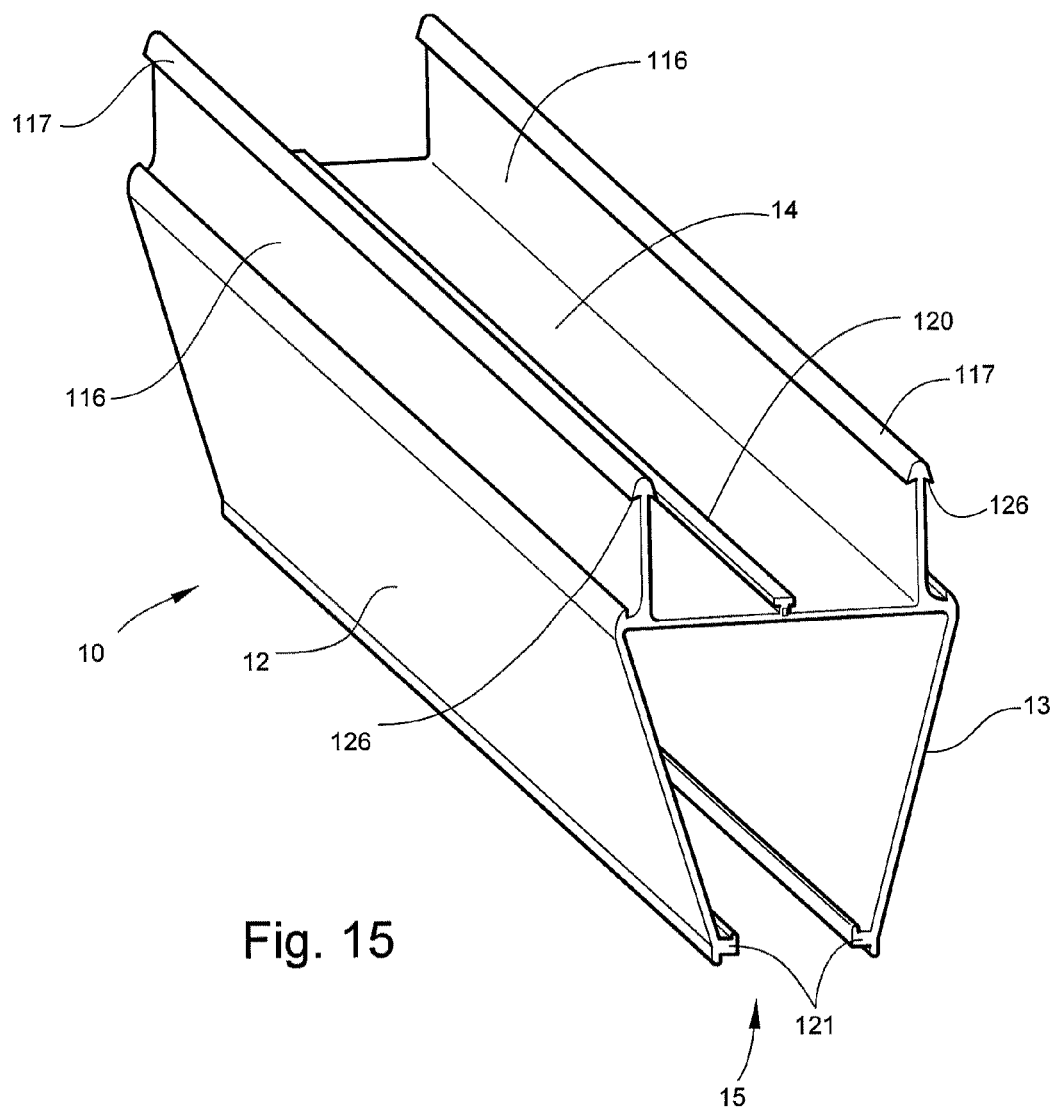
FIG. 15 is a view of a portion of a compression tube showing upward extensions in an embodiment of a lift assembly of the present invention.
Figure 34:
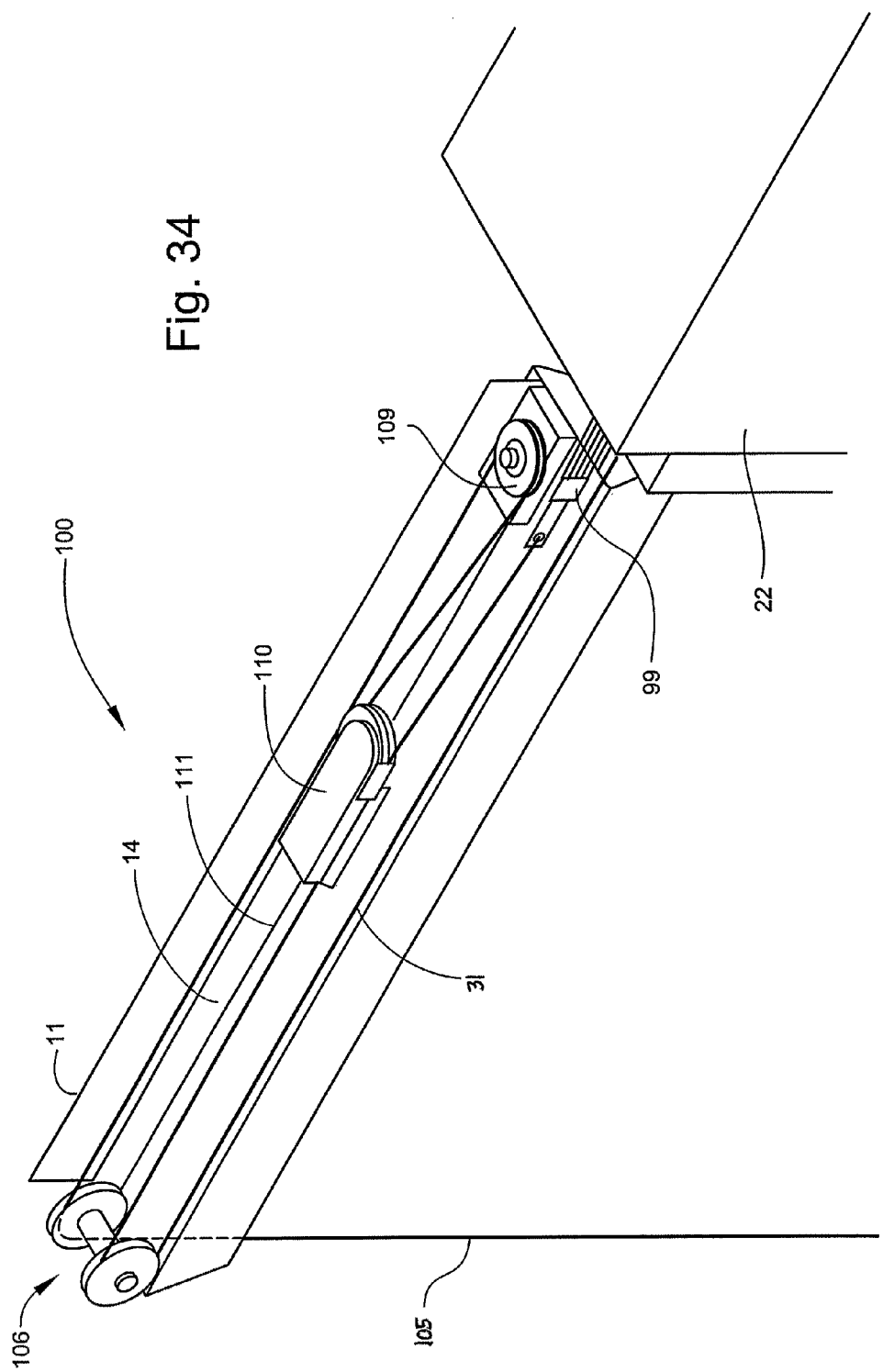
FIG. 34 is a view of a cable management system in a tray on top of a compression tube in an embodiment of the present invention.

FIG. 34 illustrates another embodiment of the cable management system 100 in which the tray 102 is disposed on the compression tube 11. As shown in FIGS. 15 and 34, the tray 102 can comprise the top 14 of the compression tube 11 between upward extensions 116 along the length 16 of the tube 11. Such an embodiment of the cable management system 100 can include the wire cable loft block 106 attached to the end of the tube 11 opposite the power head 22. In some embodiments, the wire cable loft block 106 can comprise a pair of side-by-side pulleys. The cable management system 100 can further include a truck 110 that can slide along the length 16 of the top 14 of the tube 11, that is, along the length 16 of the tray 102, along a guide rail 111. The guide rail 111 can have a "T" shape, for example, as shown as the T-rail 120 in FIG. 15, and the truck 110 can be configured to matingly slide along the T-rail 111. The truck 110 can include a pulley, or sheave, about which the cable 31 can move. A pulley 109 can be fixed in the tray 102 on the power head end 18 of the lift assembly system 10.

The lift cable 31 can be one of the plurality of lift cables 31 attached to the drum 58, and can be routed to the wire cable loft block 106 on the end of the tray 102 opposite the power head 22. The cable 31 can then be routed about a first pulley in the wire cable loft block 106 back in the direction toward the power head 22 and be connected to the truck 110 in the tray 102. The wire cable lift cable 105 can be attached on one end to a fastener 99 adjacent the power head 22, routed about the pulley attached to the truck 110, to the pulley 109 fixed on the power head end 18 of the lift assembly system 10, about the pulley 109, to a second pulley in the wire cable loft block 106, and about the wire cable loft block 106 into a substantially vertical downward direction.

When the drum 58 winds the lift cables 31 about the drum 58, the wire cable lift cable 105 and the attached truck 110 are pulled toward the wire cable loft block 106. This movement causes the truck 110 to pull the cable 31 to raise the wire containment cable 101 attached to the lift cable 31. When the drum 58 unwinds the lift cables 31 from the drum 58, the wire cable lift cable 105 and the attached truck 110 are allowed to move toward the pulley 109 near the power head 22. This movement allows the cable 31 to lower the wire containment cable 101 attached to the lift cable 31.

Figure 35:
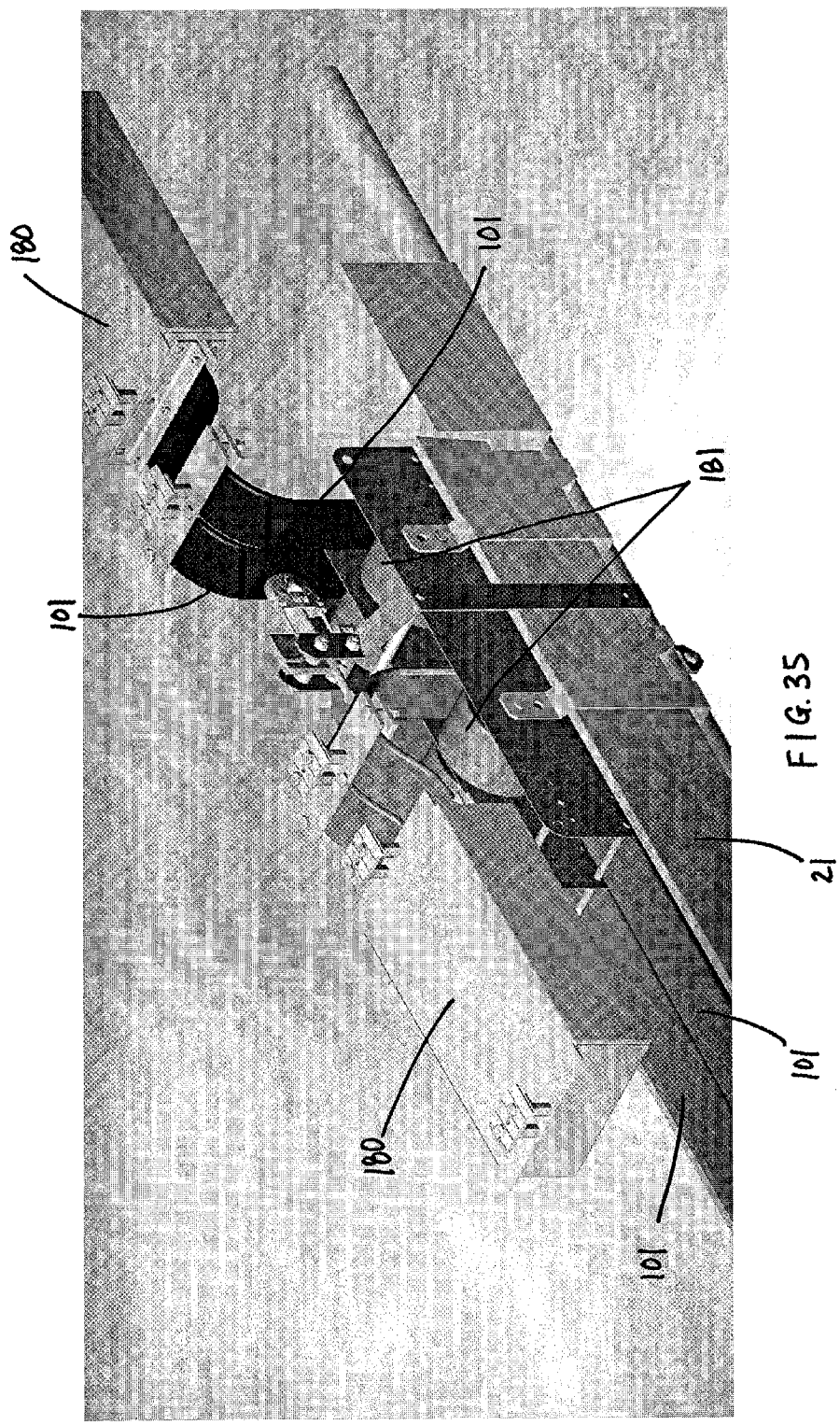
FIG. 35 is a view of components of a cable management system attached to a batten in an embodiment of the present invention.
Figure 36:
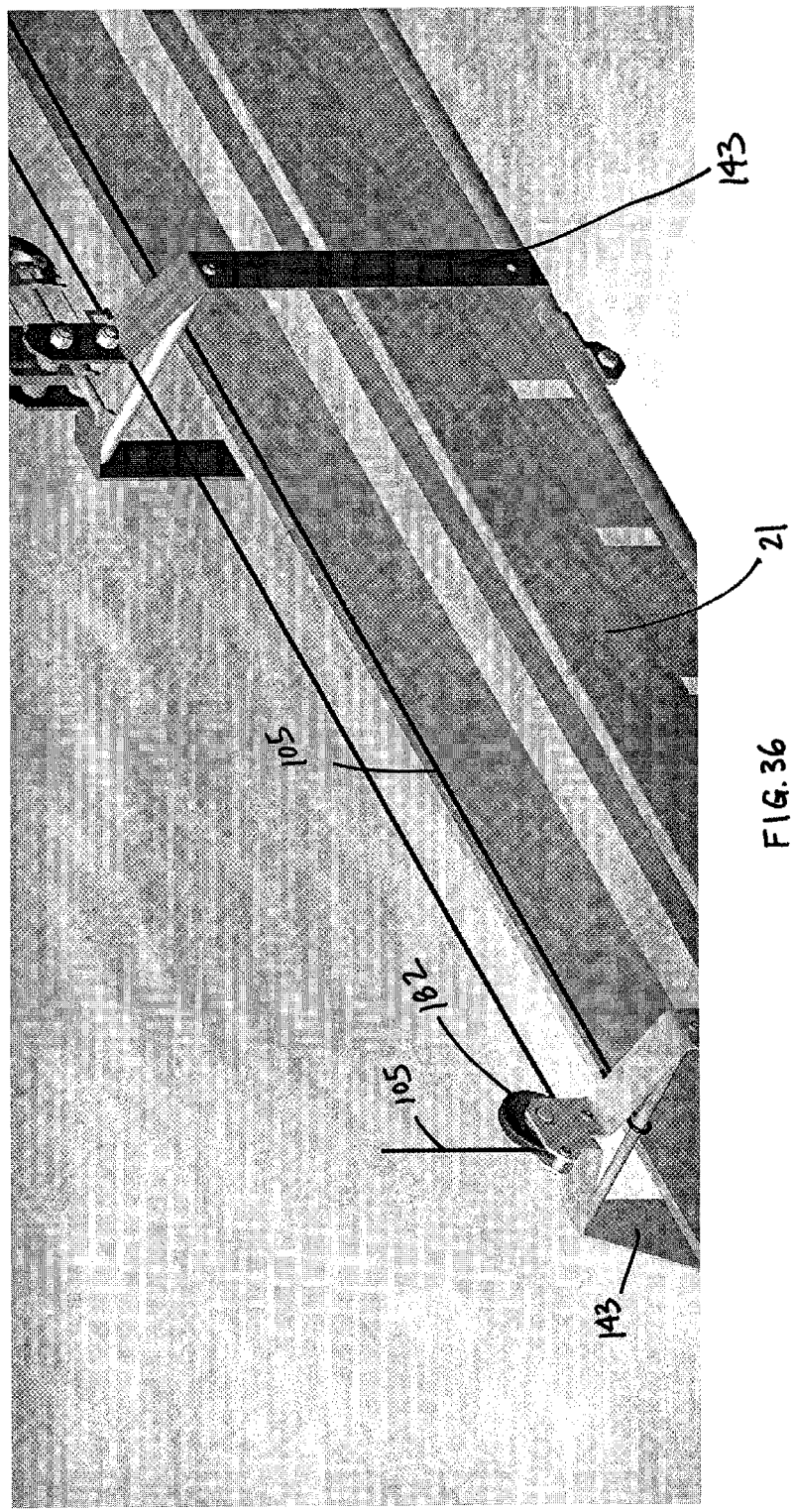
FIG. 36 is a view of components of a cable management system attached to on one end of a batten in an embodiment of the present invention.
Figure 37:
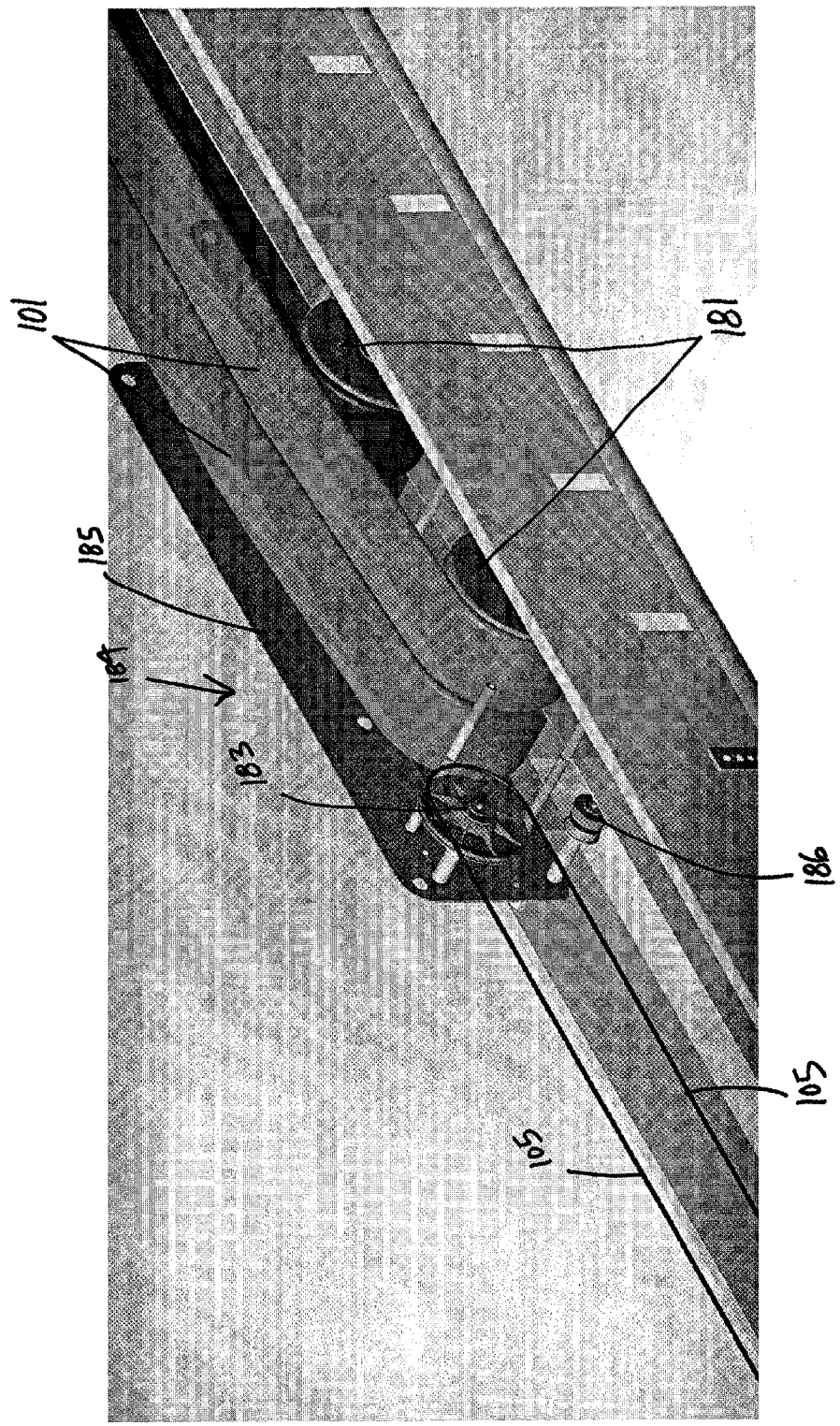
FIG. 37 is a view of components of a cable management system attached to the opposite end of the batten shown in FIG. 36.

FIGS. 35-37 illustrate embodiments of the cable management system 100 having components attached to the batten, or article, 21. As shown in FIG. 35, one or more wire containment cables 101 can be attached on one end to an electrical box input source 180 located near the compression tube 11. FIG. 35 shows a compressed vertical view of the wire containment cables 101 that extend between the tube 11 and the article 21. The wire containment cables 101 can be routed downward from one or more of the electrical box input sources 180 in a substantially vertical direction to the wire containment cable rollers 181 and about the rollers 181 onto the top of the article 21. In some embodiments, one pair of the wire containment cables 101 can be positioned on top of the other pair on top of the batten article 21 when the article 21 is raised.

FIG. 36 shows the wire cable lift cable 105 routed substantially vertically downward from the wire cable loft block 106 and about a pulley 182 fixed to a batten attachment 143 on the end of the batten 21 below the wire cable loft block 106. The wire cable lift cable 105 can then be routed substantially horizontally toward the opposite end of the batten 21 about the pulley 183 attached to a trolley 184. The trolley 184 can ride on roller 186 along the top of the length of the batten 21. The trolley 184 can be at least partially enclosed by trolley walls 185. The top and front walls 185 of the trolley 184 are removed in FIG. 37 to show the internal portions of the trolley 184. The wire cable lift cable 105 can be routed from the pulley 183 back in the opposite direction to a point of attachment on the batten attachment arm 143 below the pulley 182. In this manner, when the lift cables 31 are wound about the drum 58 to raise the batten article 21, the wire cable lift cable 105 and the trolley 184 are pulled toward the pulley 182. This movement causes the trolley 184 to pull the wire containment cable 101 in position along the top of the batten. When the lift cables 31 are unwound from the drum 58, the wire cable lift cable 105 and the attached trolley 184 are allowed to move away from pulley 182. This movement allows the wire cable lift cable 101 to be extended in a substantially vertical direction between the tube 11 and the article 21.

In certain embodiments, the cable management system 100 can include two wire cable lift cables 105 that extend substantially vertically downward from the tube 11 when the article 21 is lowered. In such embodiments, the wire cable lift cable 105 on one end of the article 21 can be pulled by a first trolley 184 toward the center of the article 21, thereby positioning a first wire containment cable 101 on the batten 21. The first trolley 184 can have a cable attached to the first trolley 184 routed about a pulley on the end of the batten article 21 nearest the first trolley 184 and back in the opposite direction to a second, slave trolley 184 (not shown). A second wire cable lift cable 105 can extend downward from the tube 11 to the second, slave trolley, about a pulley on the trolley, and to an attachment point on the end of the batten 21 opposite the first trolley 184. As the first trolley 184 is pulled toward the center of the batten article 21, the second, slave trolley and the second wire cable lift cable are likewise pulled toward the center of the batten 21, thereby positioning the second wire containment cable 101 on the batten 21.

Figure 13:
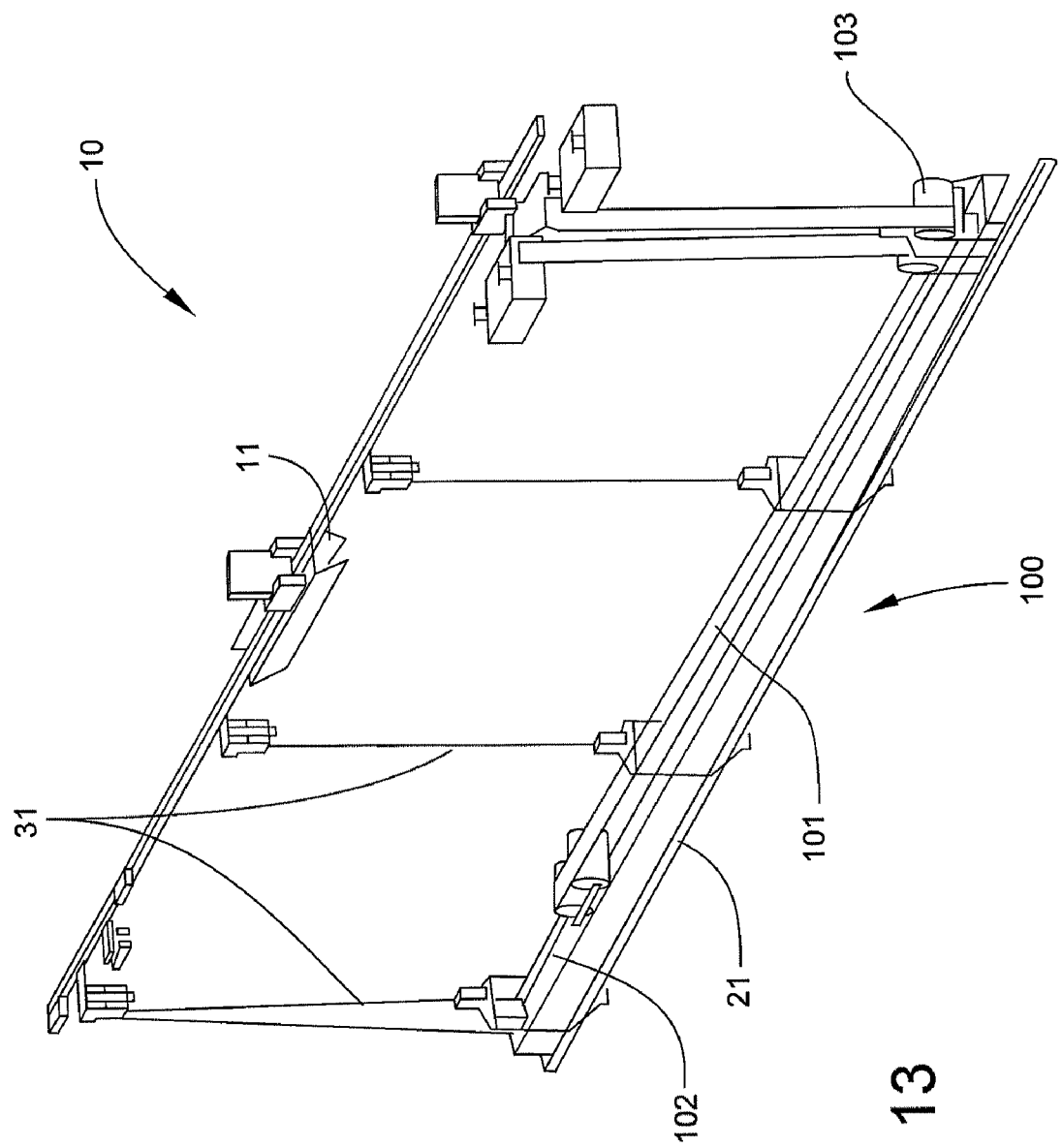
FIG. 13 is a view of a low profile distribution cable management system having a tray attached to the top of a batten in an embodiment of a lift assembly of the present invention.

In certain embodiments of the cable management system 100 of the present invention, the tray 102 can be attached to the top of a batten or other load to be raised and lowered. FIG. 13 is a view of the low profile distribution cable management system 100 in which the tray 102 is attached to the top of the batten, or article 21, from which lights can be attached. The low profile distribution cable management system 100 can include the tray 102 comprising, for example, aluminum. In such an embodiment, the first roller 103 can be rotatingly fixed to the end of the tray 102 below the end of the tube 11 to which the power head 22 is attached. The flat electrical cable 101 may be connected to the power head 22 of the lift assembly 10, which may be located at near the ceiling of a building. The flat wire containment cable 101 can move up and down with the batten, following a path that goes from the power head 22 substantially vertically downward, around the first roller 103 at the end of the tray 102, then horizontally in the tray 102, and around the moveable second roller 103 that travels in the tray 102. The moveable second roller 104 in the tray 102 may be connected by one of the lift cables 31 to the same drum 58 as the other lift cables 31 used to raise and lower the batten. In this way, the flat, electrical wire containment cable 101 may be moved in synchronization with the batten to which it is attached. The wire containment cable 101 that moves with the second roller 104 in the tray 102 may be attached to a truck 110 that can move internally along the length 16 of the tube 11 along a guiding T-shaped rail 111. The truck 110 may be connected to the wire cable lift cable 105 that winds about the power head drum 58 with the other load lift cables 31 that raise and lower the batten. The truck 110 can slide along the T-rail 111 and can serve as an interface between the power head 22 and the cable 105 running down to the tray 102 that is on the batten. The truck 110 may serve as a double- or triple-purchasing device to enable the flat electrical cable 101 to move at appropriate speeds and/or lengths in synchronization with the batten. In certain embodiments, the cable management system 100 can be primarily contained inside the compression tube 11. This can allow the entire lift assembly 10 having cable management to be pre-rigged at the factory.

In such embodiments, the roller system (first and second rollers 103, 104, respectively) can lay the wire containment cable 101 into the tray 102 in a flatter arrangement than in conventional cable management systems. In addition, because the wire cable 101 can be positioned in the tray 102 substantially from one end of the tube 11 to the other (when "single purchased"), or, alternatively, about half of the length of the tray 102 (when "double purchased"), the wire cable 101 does not stack as high as in conventional systems, where the wire cable 101 may stack on top of itself six to eight times or more. In this way, certain embodiments of the present invention can avoid the stacked height of the wire cable 101 on top of the batten as in conventional systems, thereby providing a more stable and balanced positioning of the wire cable 101 on the batten. Because in some embodiments of the present invention the wire cable 101 is stacked in such a flatter arrangement on top of the batten, the batten and attached articles can travel a greater distance (that is, more closely to the overhead tube 11) than in conventional systems in which the wire cable 101 is stacked multiple times on itself at the top of the batten.

Some embodiments of the present invention can include a method for managing the wire containment cable 101 while raising and lowering the article 21. Some embodiments of such a method can include providing the tray 102 attached to the compression tube 11, for example, to the exterior of one side of the tube 11. The tray 102 can extend along the entire length 16 of the tube 11, or along a portion of the length 16 of the tube 11. The method can further include providing rollers 103, 104 about which the wire containment cable 101 can be guided into and out of the tray 102. The first roller 103 can be rotatingly attached to one end of the tray 102. In certain embodiments, the first roller 103 can be attached to the end of the tray 102 adjacent the power head 22 of the lift assembly 10. The first roller 103 can be geared to correspond with the gearing of the power head motor 27 so that the first roller 103 rotates in the same direction and at the same speed as the drum 58 connected to the motor 27. The second roller 104 can be movably attached to the tray 102 such that the second roller 104 moves a predetermined distance along the length of the tray 102 as the batten is raised and lowered.

The wire containment cable 101 can be connected to a lift cable, such as the cables 31 described herein with reference to FIGS. 6-11 that wind about and unwind from the drum 58 in the lift system power head 22. The wire cable lift cable 105 can be routed from the drum 58 to the wire cable lift cable loft block 106 near the end of the tube 11 opposite the power head 22, around that loft block 106, and back in the opposite direction toward the power head 22. The wire cable lift cable 105 can be attached at its distal end to the wire cable 101 and to the second roller 104. As a result, the wire containment cable 101 can move in the same direction and at the same rate as the lift cables 31 and the load attached to the lift cables 31.

As the lift cables 31 are wound onto the drum 58, the second roller 104 moves toward the wire cable loft block 106, and the wire cable lift cable 105 moves around the wire cable loft block 106 and is likewise wound onto the drum 58 the same amount and at the same rate as the lift cables 31 attached to the load, or article 21, are wound. As the lift cables 31 are unwound from the drum 58, the wire cable lift cable 105 is likewise unwound from the drum 58 and moves around the wire cable loft block 106, allowing the second roller 104 to move away from the wire cable loft block 106 and lower the wire cable 101 the same amount and at the same rate as the lift cables 31 attached to the load are lowered.

When the batten is in a lowered position, the wire containment cable 101 can extend downward from the tray 102 around the first roller 103 to the batten or load. In some embodiments of a method, as the load attached to the lift cables 31 is raised, the wire cable 101 can be routed from its substantially vertical position, about the top of the first roller 103, and to a substantially horizontal position in the tray 102. The wire cable 101 can be guided about the top of the second roller 104 such that, as the load is raised, the wire cable 101 is positioned so as to lie flat in the tray 102. The wire containment cable 101 may be "single purchased" so as to be positioned in a single layer along the tray 102, or it may be "double purchased" so that the wire cable 101 is positioned having a second layer lying flat on top of a first layer in the tray 102.

In a particular illustrative embodiment, such a method can include connecting one end of at least one of a plurality of wires to an input source and the opposite end of the at least one of the wires to an output object movable with the article 21 in the lift system 10. The plurality of wires can be contained in the wire containment cable 101. The tray 102 can be connected along at least a portion of the length 16 of the tube 11 and have dimensions for containing the wire containment cable 101. The wire containment cable 101 can be moved between a first, substantially vertical position when the article 21 is fully lowered and a second, substantially horizontal position in the tray 102 when the article 21 is fully raised. The method can further include positioning the wire containment cable 101 in a single layer in the tray 102 when the article 21 is fully raised.

Such an embodiment of the method can further include attaching the rotatable first roller 103 to one end of the tray 102, and attaching the movable second roller 104 to the tray 102 that is movable a predetermined distance along a length of the tray 102 as the article 21 is moved. The wire containment cable 101 can be attached to the second roller 104 and to the wire cable lift cable 105 comprising one of the plurality of cables 31. The wire containment cable 101 can be guided by the second roller 104 about a surface of the first roller 103 between the first and second positions. In certain embodiments, the tube 11 can further include the wire cable loft block 106 located near an end of the tube 11 opposite the drive mechanism 22, and the wire cable lift cable 105 can be routed from the drive mechanism 22 to and around the wire cable loft block 106 and back in the opposite direction to the second and first rollers 104, 103, respectively.

Figure 14:
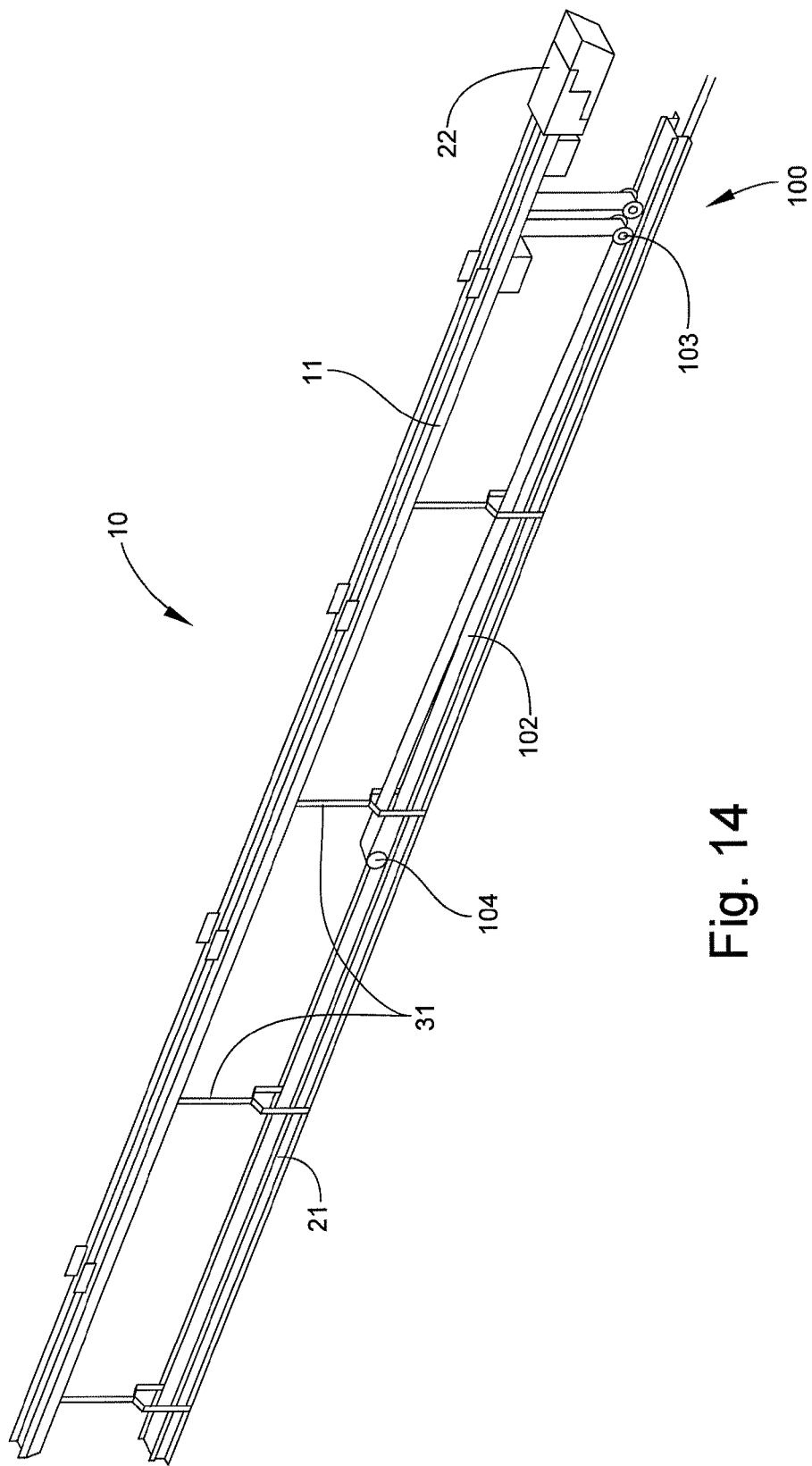
FIG. 14 is a view of a compression tube, power head, and particular load configuration in an embodiment of a lift assembly of the present invention.

FIG. 14 is a view of the compression tube 11, power head 22, particular load configuration, and the cable management system 100 in an embodiment of the lift assembly, or lift assembly system 10.

FIG. 15 is a view of a portion of an embodiment of the compression tube 11. In such an embodiment, the tube 11 can provide a track for adjustable loft blocks 32; snap into and slide in beam clamp tube receivers 118; absorb lateral forces on a building; be pre-rigged at the factory and packaged in a single shippable unit; support terminal boxes; and/or house and track the cable management system 100.

Figure 16:
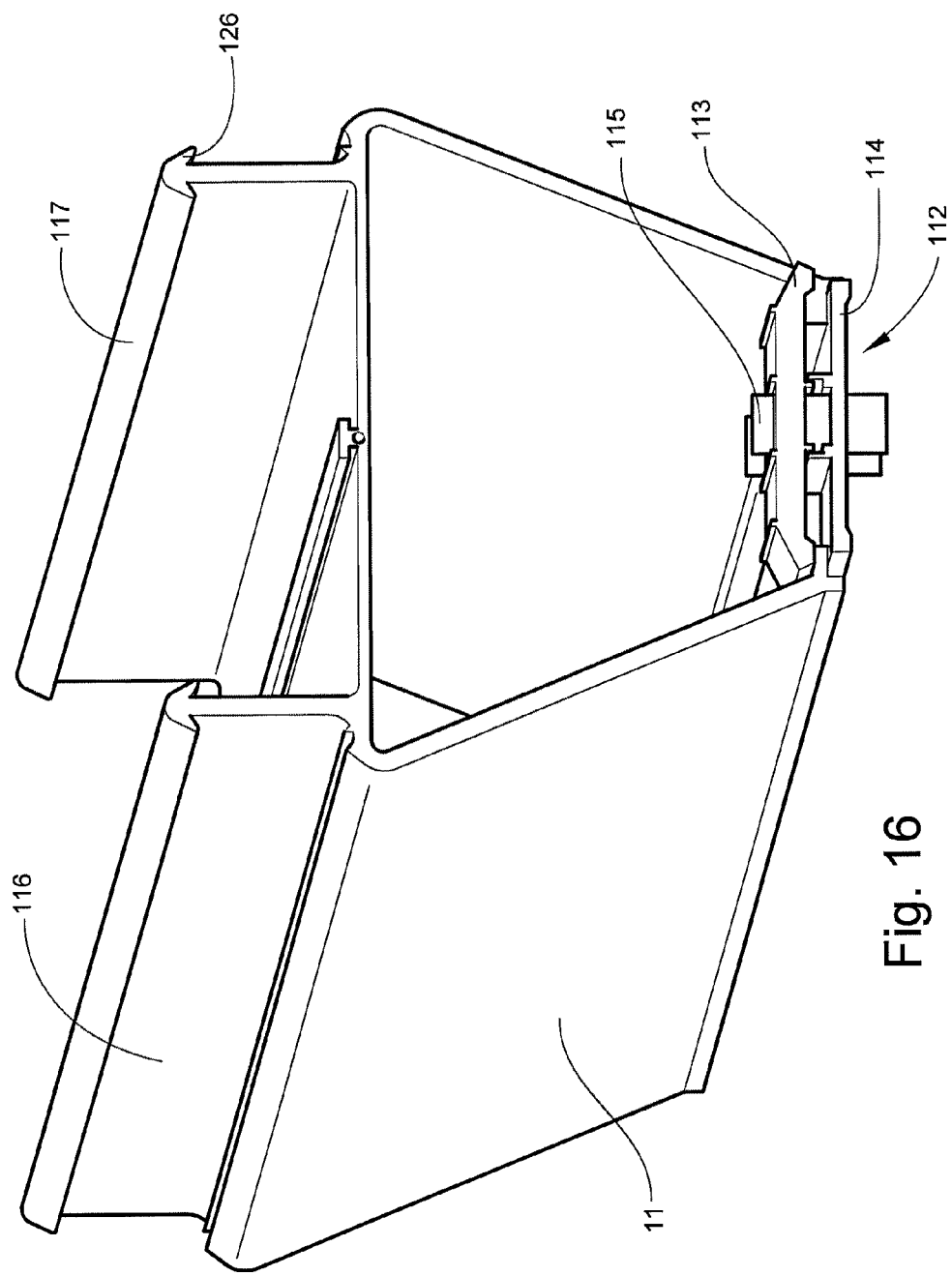
FIG. 16 is a view of a "sandwich" style compression tube splicing clamp for splicing together two abutting ends of tube portions in an embodiment of a lift assembly of the present invention.
Figure 17:
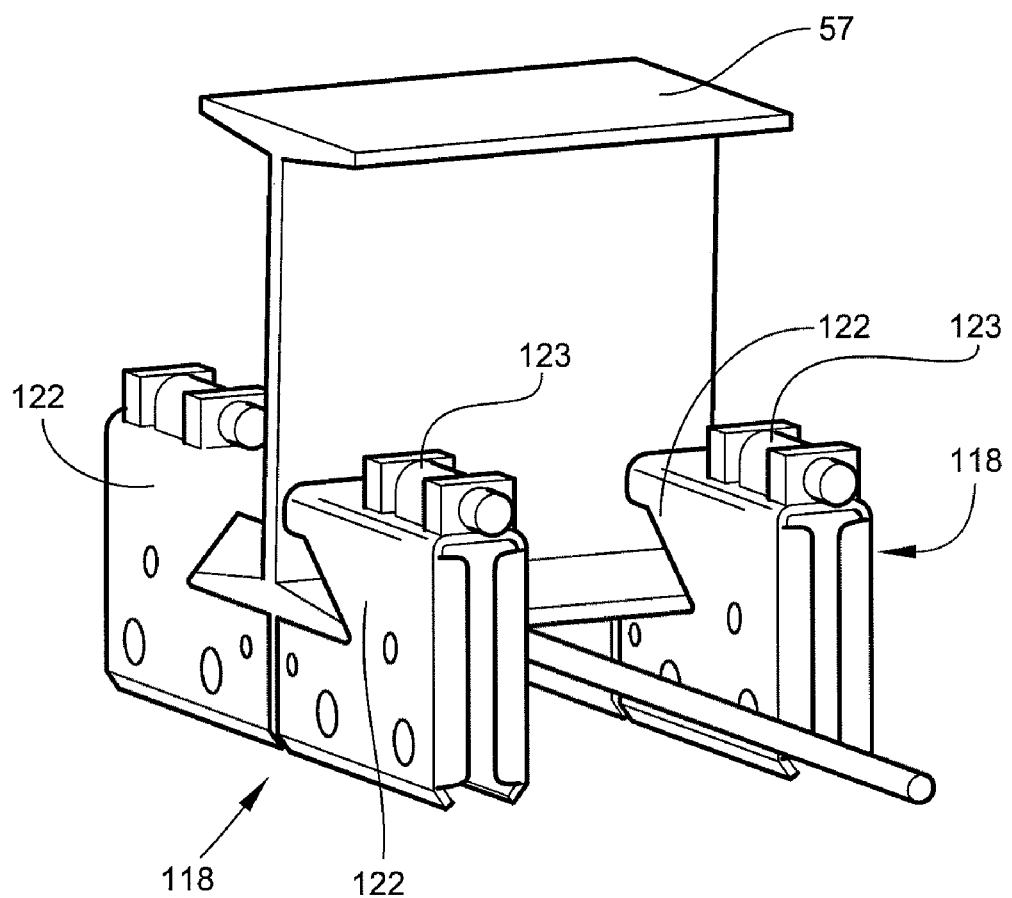
FIG. 17 is a view of a plurality of beam clamp tube receivers attached to an overhead support structure in an embodiment of the present invention.
Figure 18:
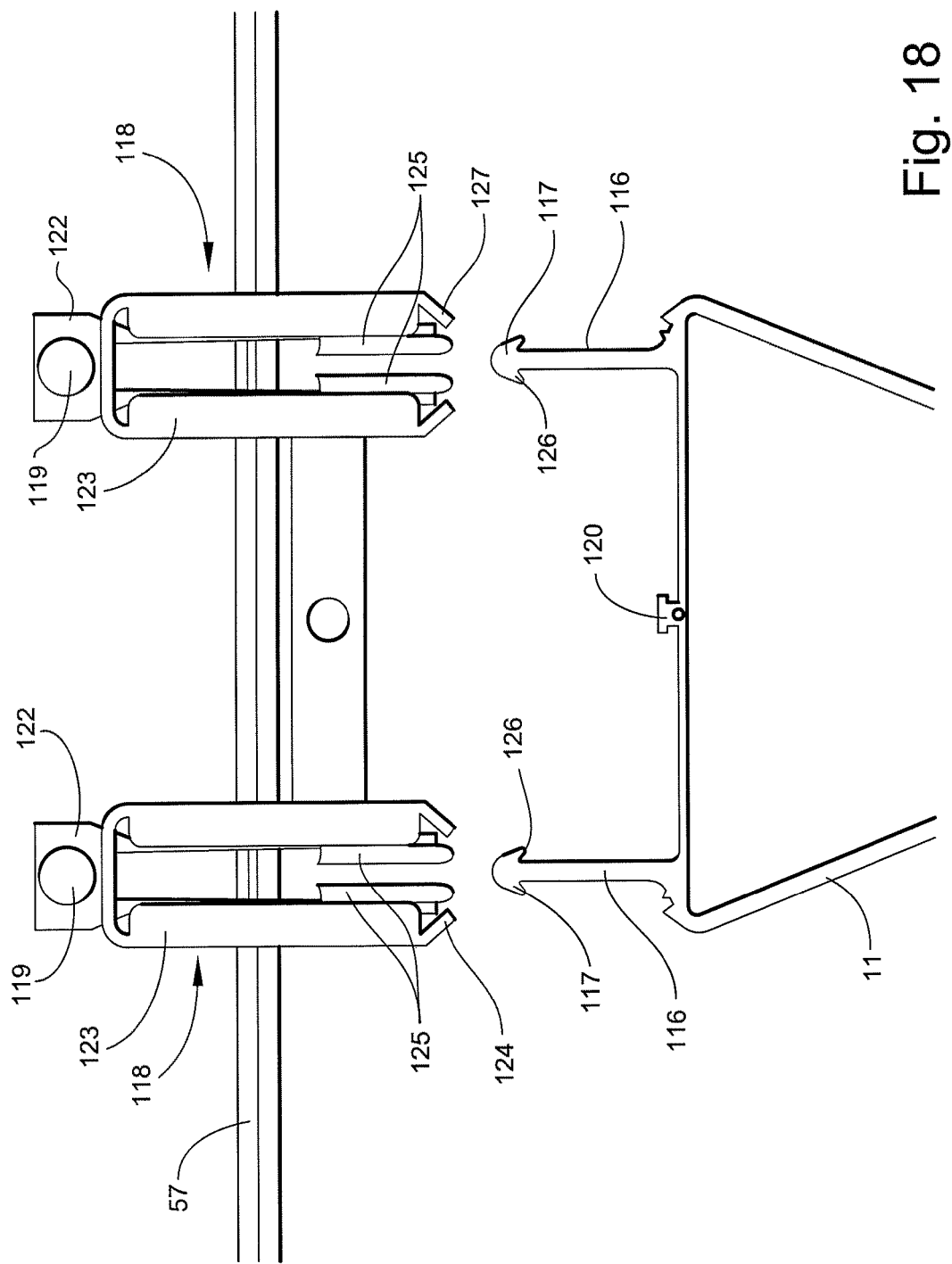
FIG. 18 is a view of a compression tube in position to be inserted into a beam clamp tube receiver in an embodiment of a lift assembly of the present invention.

As shown in FIGS. 14-16, in some embodiments, the compression tube 11 may comprise a single piece of material having one or more upward extensions 116 projecting substantially vertically upwardly from the top 14 of the tube 11. The tube 11 may be extruded, or formed in another manner. The material of the tube 11 and/or the upward extensions 116 can comprise aluminum and/or another material. These upward extensions 116 can have a tapered and flanged tip 117 that enables the tube 11 to be inserted, or snapped into, and locked into the beam clamp tube receiver 118, as shown in FIGS. 17 and 18. In addition, such a configuration having upward structural extensions 116 can give the tube 11 greater durability during shipping. In certain embodiments, the tube 11 may include a T-shaped rail 120 or other configured addition on the horizontal top 14 of the tube 11 that can be used to guide the cable management system 100, as described herein. The compression tube 11 may also have a slotted rail 121 on either or both front 12 and rear 13 side walls that may be used to guide the loft blocks 32.

In some embodiments, the compression tube 11 may be able to slide horizontally, that is longitudinally, in the beam clamp tube receivers 118, and enable infinite positioning points of the tube 11 along the overhead support structure 57. This allows easier installation, as the installer can mount the beam clamp tube receivers 118 first. Then a person can hang a section of the tube 11, for example, by snapping the tube 11 into the beam clamp tube receiver 118, and sliding the tube 11 in either direction perpendicular to the overhead support structure 57, and into other beam clamp tube receivers 118 at both ends of the tube section. In this manner, the compression tube 11 can be mounted by a single person by ascending a ladder or scaffold only once.

FIG. 16 is a view of an embodiment of a "sandwich" style compression tube splicing clamp 112 useful for splicing together two abutting ends of compression tube 11 portions in some embodiments of the present invention. The splicing clamp 112 can comprise an upper plate 113 an a lower plate 114 that can be tightened toward each other and onto the opposing slotted rails 121. Tightening of the plates 113, 114 may be accomplished by a tightening mechanism 115, as shown in FIG. 16, configured to press against the ends of the tube 11 portions and secure the end portions together. The tightening mechanism 115 can be any suitable tightening mechanism, for example, a threaded bolt or a ratcheting collar. A roll pin can be included for aligning a cable management tee guide. In certain embodiments, the clamp 112 can support the cable management system tray 102, and can provide a medium for rigidity and compression of the connected tube 11 portions. The ends of the tube 11 sections can be fastened to each other by tightening the splicing clamp 112, as shown in FIG. 16, onto the slotted rails 121 of two abutting tube 11 sections.

Figure 19:
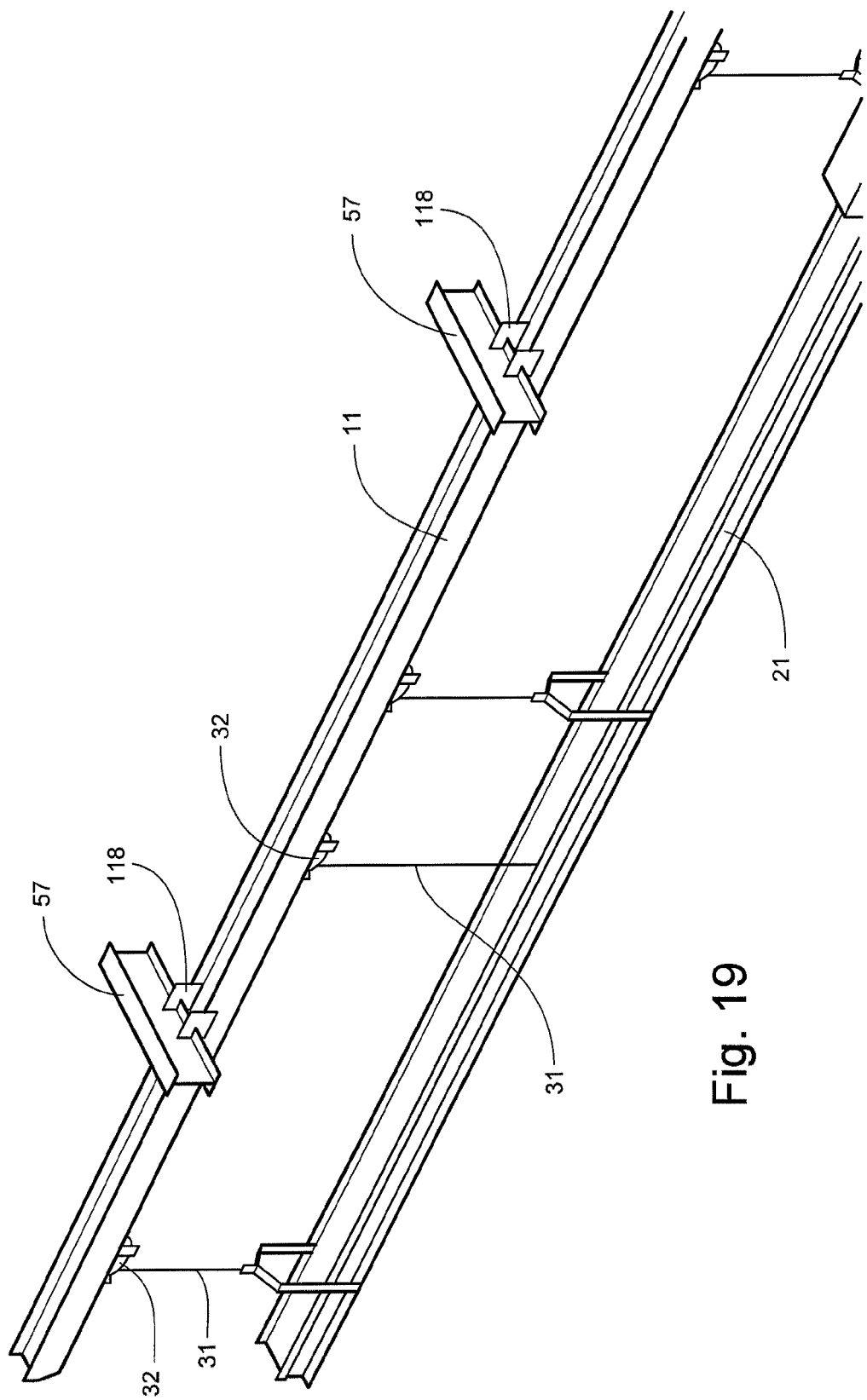
FIG. 19 is a view of a compression tube attached to two overhead support structures, or beams, showing that the tube can be attached to beams at any location along the length of the tube and that loft blocks can be positioned at any of an infinite number of locations along the length of the tube in an embodiment of a lift assembly of the present invention.
Figure 20:
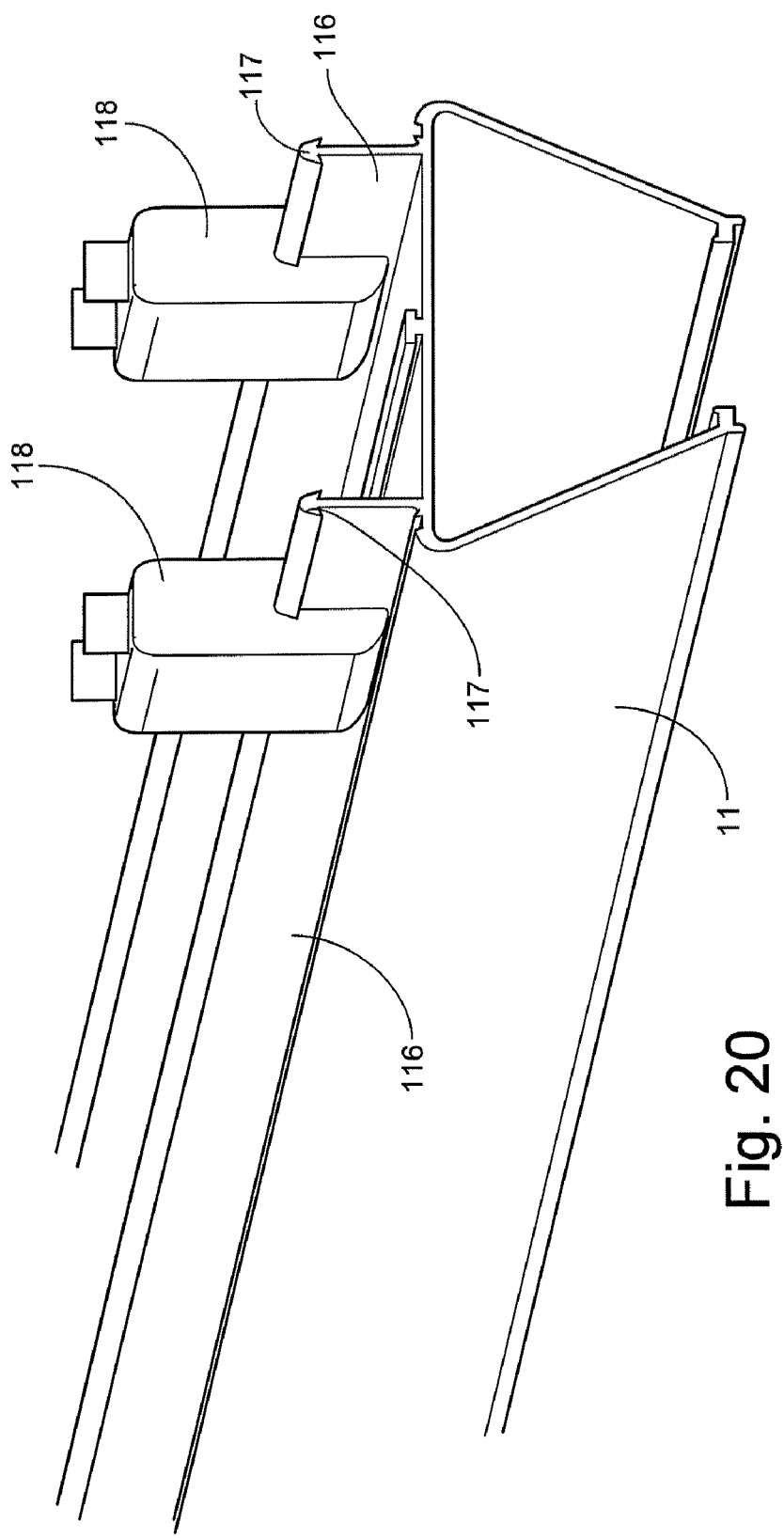
FIG. 20 is a view of a compression tube positioned within a beam clamp tube receiver assembly, illustrating that the tube can easily slide longitudinally within the beam clamp tube receiver assembly in an embodiment of a lift assembly system of the present invention.

FIG. 17 is a view of two beam clamp tube receivers 118 in an embodiment of the present invention. FIG. 18 is a view of the compression tube 11 in position to be snapped into the overhead beam clamp tube receiver 118 in an embodiment of the present invention. Sections of the compression tube 11 can be inserted into the tube receiver 118 and then freely slid in a perpendicular direction relative to the overhead beam 57 and into a desired operating position. FIG. 19 is a view of the compression tube 11 attached to two overhead beams 57 showing that the tube 11 can be attached to beams 57 at any location along the length 16 of the tube 11. The sliding beam clamps 118 can allow the compression tube 11 to absorb all the horizontal loads placed on the building structure by the lift assembly 10. FIG. 20 is a view of the compression tube 11 positioned within the beam clamp assembly 118, showing that the tube 11 can easily slide longitudinally within the beam clamp tube receiver assembly 118. In some embodiments, the beam clamp tube receiver 118 or the power head 22 can be fixed in position so that as the tube 11 compresses, the same beginning position of the lift system 10 on the overhead structure 57 can be maintained.

As shown in FIGS. 17 and 18, in some embodiments, the beam clamp assembly 118 can comprise two or more hooks 122 that can be tightened together to squeeze on either side of a structural steel I-beam, unistrut, flanges, or other surface. Each hook 122 can comprise a U-shaped structure having two spaced-apart plates comprising a strong, rigid material, for example, steel. One beam clamp tube receiver assembly 118 can include four "hooks" 122. Each hook 122 can further include a U-shaped insert 123 having spaced-apart arms and be configured to fit inside the hook 122 such that each arm of the insert 123 fits adjacent to one of the spaced-apart plates of the hook 122. The top portion of the insert 123 can extend upward through an opening in the top of the hook 122 and around a bolt 119 that secures the insert 123 in position relative to the hook 122.

The inserts 123 can be adapted to receive the upward extensions 116 of the tube 11 so as to lock the upward extensions 116 inside the hook 122. This may enable the compression tube 11 to be snapped into the beam clamp 118 from the bottom of the beam clamp 118, while preventing the compression tube 11 from falling from the grasp of the hooks 122. In certain embodiments, the inserts 123 may be lined with a material, for example, plastic, that may allow the compression tube 11 to slide laterally with reduced friction and noise, and prevent galvanic corrosion between dissimilar metals, such as steel comprising the beam clamp 118 and aluminum comprising the compression tube 11. In some embodiments, a clamping mechanism can be utilized to secure the loft blocks 32 to the tube 11.

In certain embodiments, each hook can include a clamp 125. The clamp 125 can comprise two lengths of material shorter than the vertical interior of the hook 122. Each of the two lengths of material can be positioned inside one of the spaced-apart opposing arms of the insert 123, and can be configured to move a short distance up and down inside the hook 122, for example, about one-fourth inch. The clamp 125 can comprise a deformable material, such as a plastic, that can be forced open by the tapered tip 117 of the tube upward extension 116. Once the tube tip 117 is inserted into the hook 122 above the top of the clamp 125, the flange 126 on each side of the tip 117 can rest on top of the two vertical lengths of the clamp 125. The weight of the lift assembly 10 can pull the tube 11 and the clamp 125 in a downward direction. Each hook 122 may have a pair of opposing bottom tapered edges 124 to prevent the clamp 125 from moving downward below the bottom tapered edge 124 under the weight of the inserted tube 11. In this manner, the compression tube 11 can be locked into the clamp 125 and the hook 122 so as to prevent the compression tube 11 falling out of the beam clamp tube receiver 118.

Figure 21:
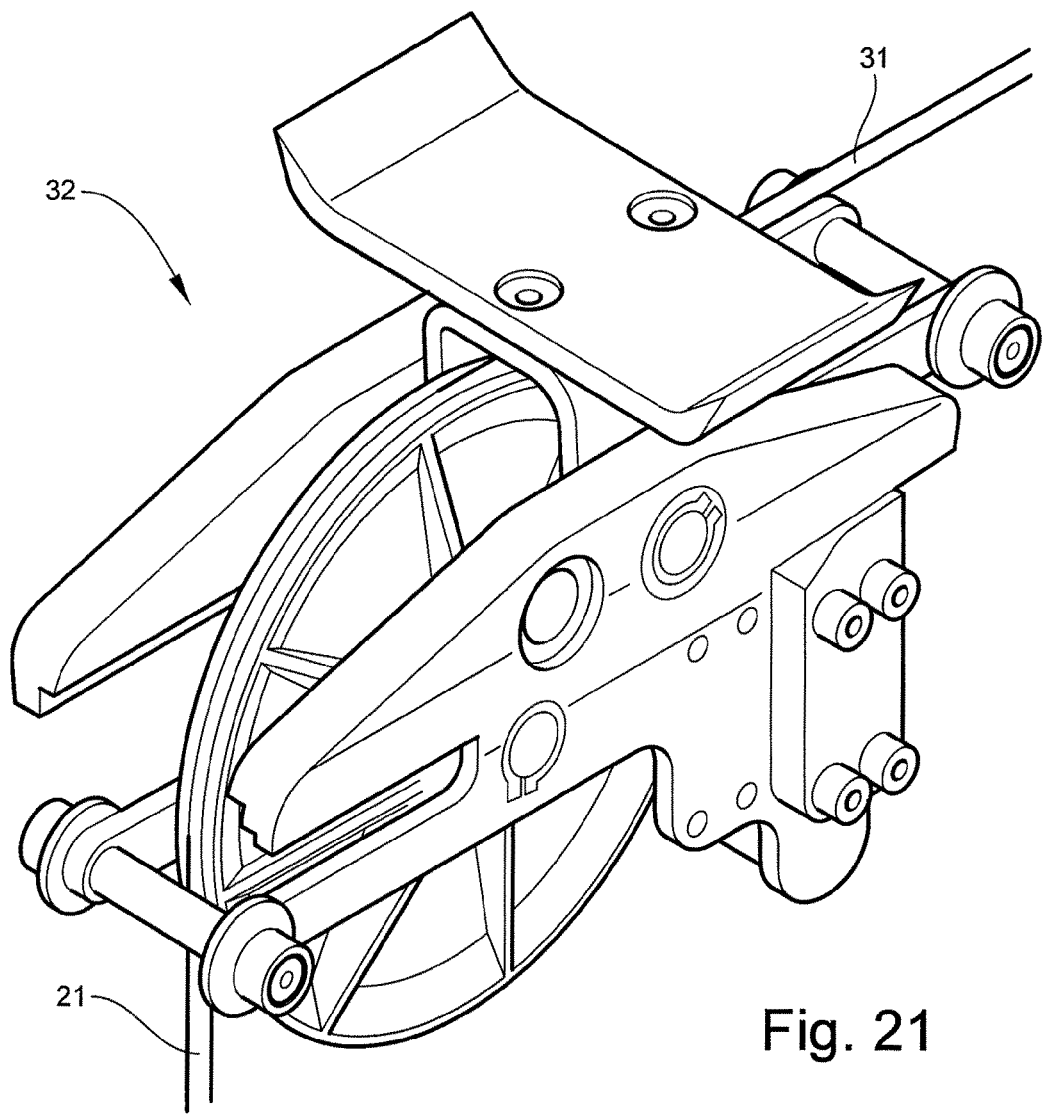
FIG. 21 is a view of a self-locking block useful in an embodiment of a lift assembly system of the present invention.

FIG. 21 is a view of one embodiment of a loft block 32 that is self-locking, useful in the lift assembly system 10 of the present invention. As shown in FIG. 21, in some embodiments, the loft block assembly 32 can comprise a pulley that can slide longitudinally within the tube 11. The loft block assembly 32 may be able to be tilted up out of locked position within the tube 11 in order to allow it to be moved back and forth in the tube 11 by hand. Once the loft block assembly 32 is positioned at a desired point along the length 16 of the tube 11, the assembly 32 can be tilted back down and locked onto, for example, the slotted rails 121, inside the tube 11. The loft block 32 may be locked in place due to gravity, friction, and any other force than may cause it to wedge itself against the compression tube 11, rendering it stationary.

In certain embodiments, the loft block assembly 32 may include wheels or slides 45, 47, as shown in FIG. 5, to facilitate moving the loft block assembly 32 when desired. The wheels or slides 45, 47 may comprise a slidable material such as plastic. The wheels or slides 45, 47 may no longer touch the compression tube 11 once the loft block assembly 32 has been set in position within the tube 11. In such embodiments, the loft block assembly 32 can be easily moved within the tube 11 such that the loft block assembly 32 does not require tight tolerances for providing a locking mechanism.

The loft block assembly 32 can comprise an aluminum surface, which, when in position in contact with the compression tube 11 (also comprising an aluminum surface), the friction coefficient increases as a force is applied to the assembly 32, further locking it in position against the tube 11. In addition, as weight or load is placed on an attached cable 31, the cable 31 tends to force the loft block 32 to pivot through the compression tube, which further secures the loft block assembly 32 in its position in the tube 11.

Figure 22:
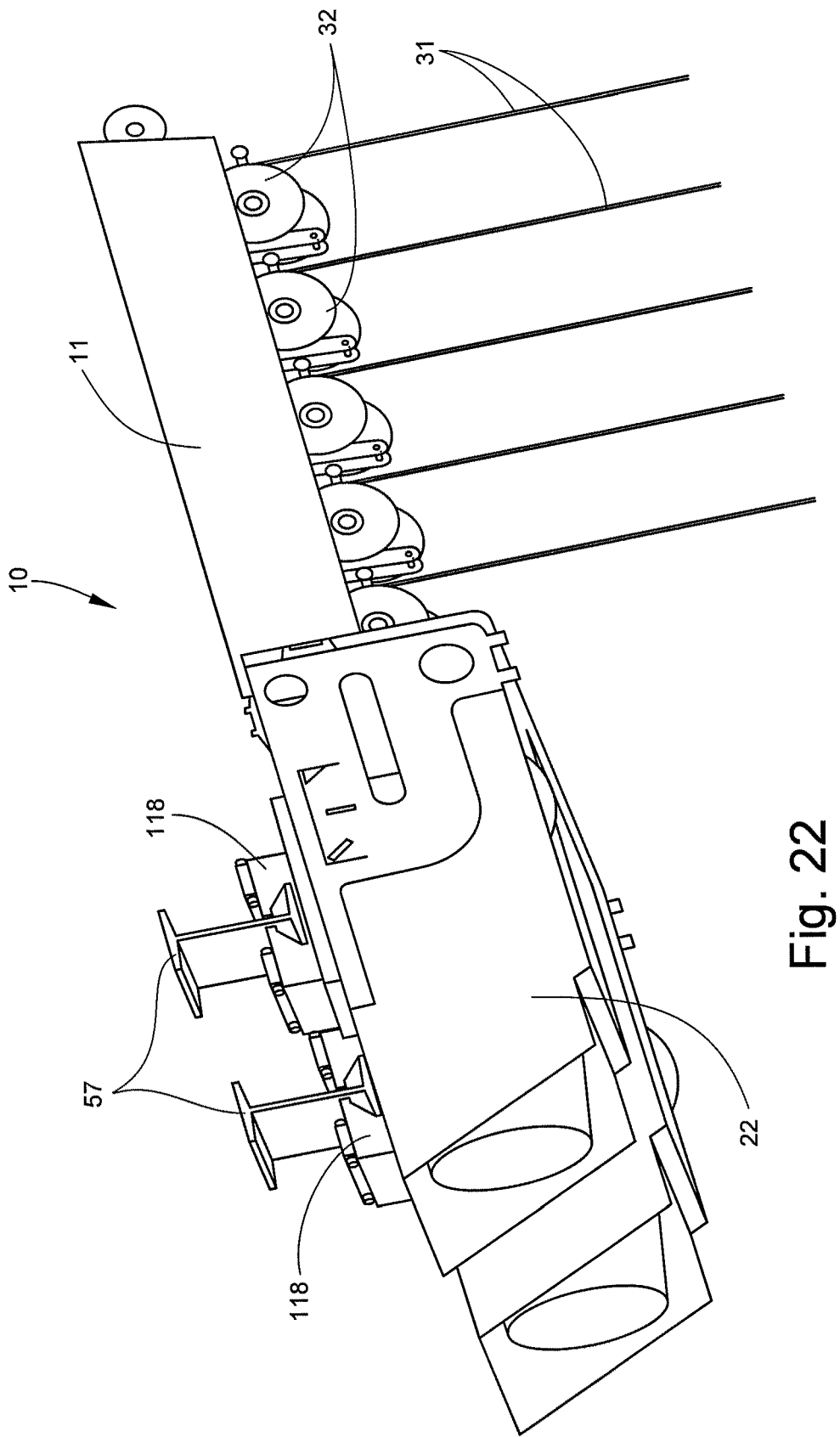
FIG. 22 is a view of a power head attached to a compression tube and loft blocks loaded in the tube in an embodiment of the present invention.

FIG. 22 is a view of the power head 22 attached to the compression tube 11, and loft blocks 32 loaded in the tube 11 in an embodiment of the present invention. FIG. 23 is a view of the progressively sloped drum 58 and the brake disk 85 in an embodiment of the lift assembly system 10 of the present invention.

As shown in FIGS. 22 and 23, in some embodiments, the cables 31, or wire ropes, can wind around the progressively sloped drum 58. Such a progressive drum 58 can allow the cables 31 to wind around each other, saving horizontal travel distance. As the cables 31 wind on the drum 58, they may move up a slope, but can wrap about a horizontal plane for some of the distance. In certain embodiments, a cable keeper 127, for example, a flat piece of material, such as aluminum, can rest on this horizontal portion of the wound cables 31, serving to keep the cables 31 from unraveling from the drum 58 in the event that one might go slack. The cable keeper 127 can include an arm 128 extending outward to contact each cable 31 on the drum 58. The cable keeper arm 128 can be spring-loaded in a biased fashion against the cables 31. One end of the cable keeper 127 can be attached to a guide mechanism 130 that travels laterally at the same rate as the cables 31 wind onto the drum 31. The cable keeper 127 can be attached by a spring that keeps enough pressure on the cables 31 to keep the cables 31 positioned about the drum 58, but without so much force as to affect the natural winding and unwinding of the cables 31 about and from the drum 58. The cable keeper 127 can move along with the guide assembly 86 across the constant diameter portion 64 and the increasing diameter portion 63 of the drum 58.

In certain embodiments, the guide mechanism 130 can be connected to a threaded rod 131, which can be connected to the drive shaft 28 with a chain and sprockets. The chain and sprockets can be geared so as to make the guide mechanism 130 move laterally at the same rate as the cables 31 wind laterally about the progressively sloped drum 58.

Figure 24:
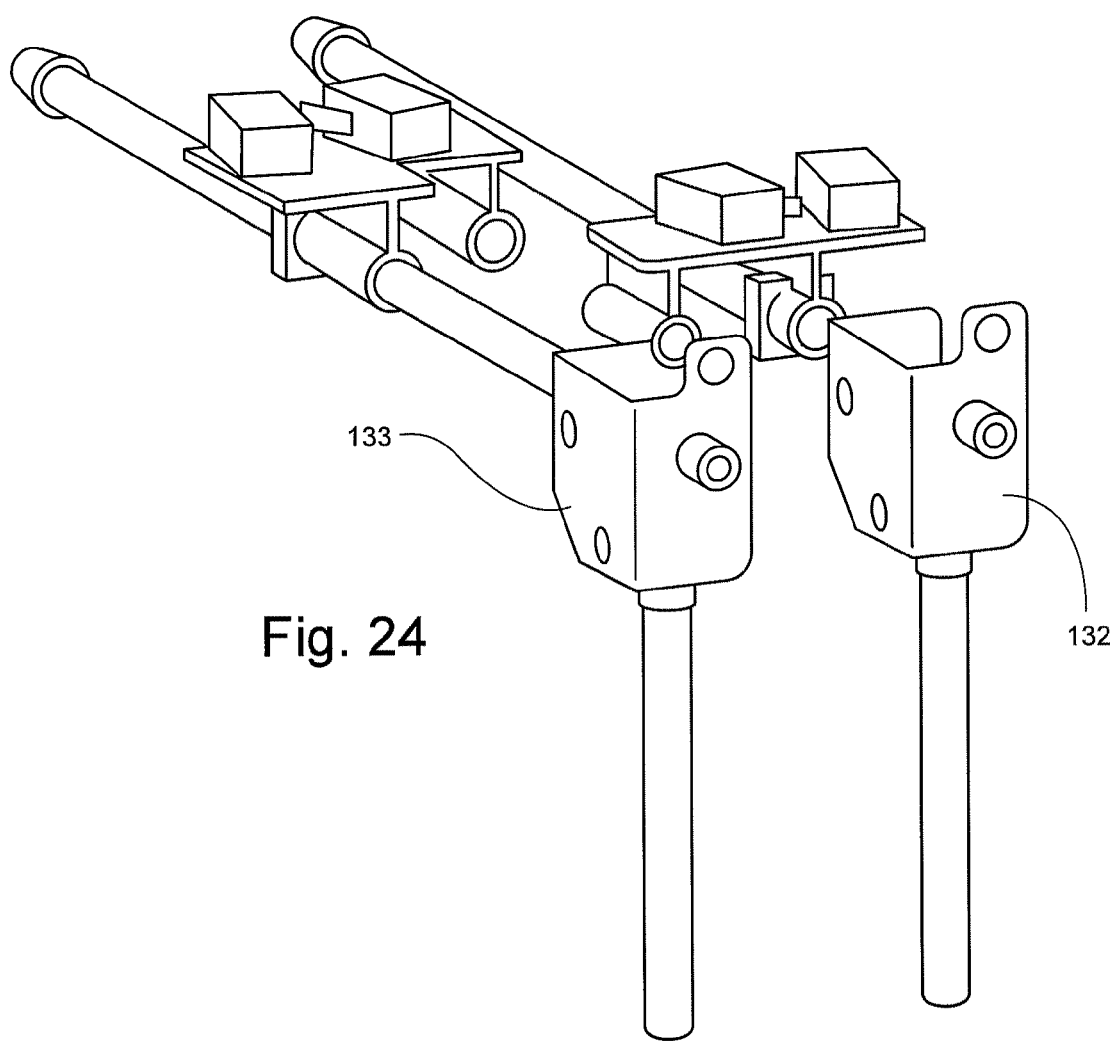
FIG. 24 is a view of a pair of low and high limit miter-geared limit switches useful in an embodiment of a lift assembly of the present invention.

In certain embodiments, as the guide mechanism 130 moves laterally along the threaded rod 131, switches can be positioned at fixed points on the threaded rod 131. FIG. 24 is a view of a low limit switch 132 and a high limit switch 133 useful in embodiments of the present invention. These limit switches 132, 133 can be miter-geared switches. These switches 132, 133 can be tripped to send a signal to the controls of the lift system 10 that the load such as a batten, has reached its upper, or fully raised limit, or it fully lowered limit. These limit switches 132, 133 can be easily adjusted by turning a miter-geared threaded rod. The limit switches 132, 133 can be oriented such that they are angled and off-set from the cables 31 and drum 58. For example, the most extreme travel of the drum 58 can be set by one adjuster that moves the relative position of two switches to a striker. The first switch 132, 133 engaged by the striker can send a stop signal to the controls. If that switch fails, a second, or back up, switch can be struck and send a signal, preventing single-mode failure of the guide mechanism 130.

Figure 25:
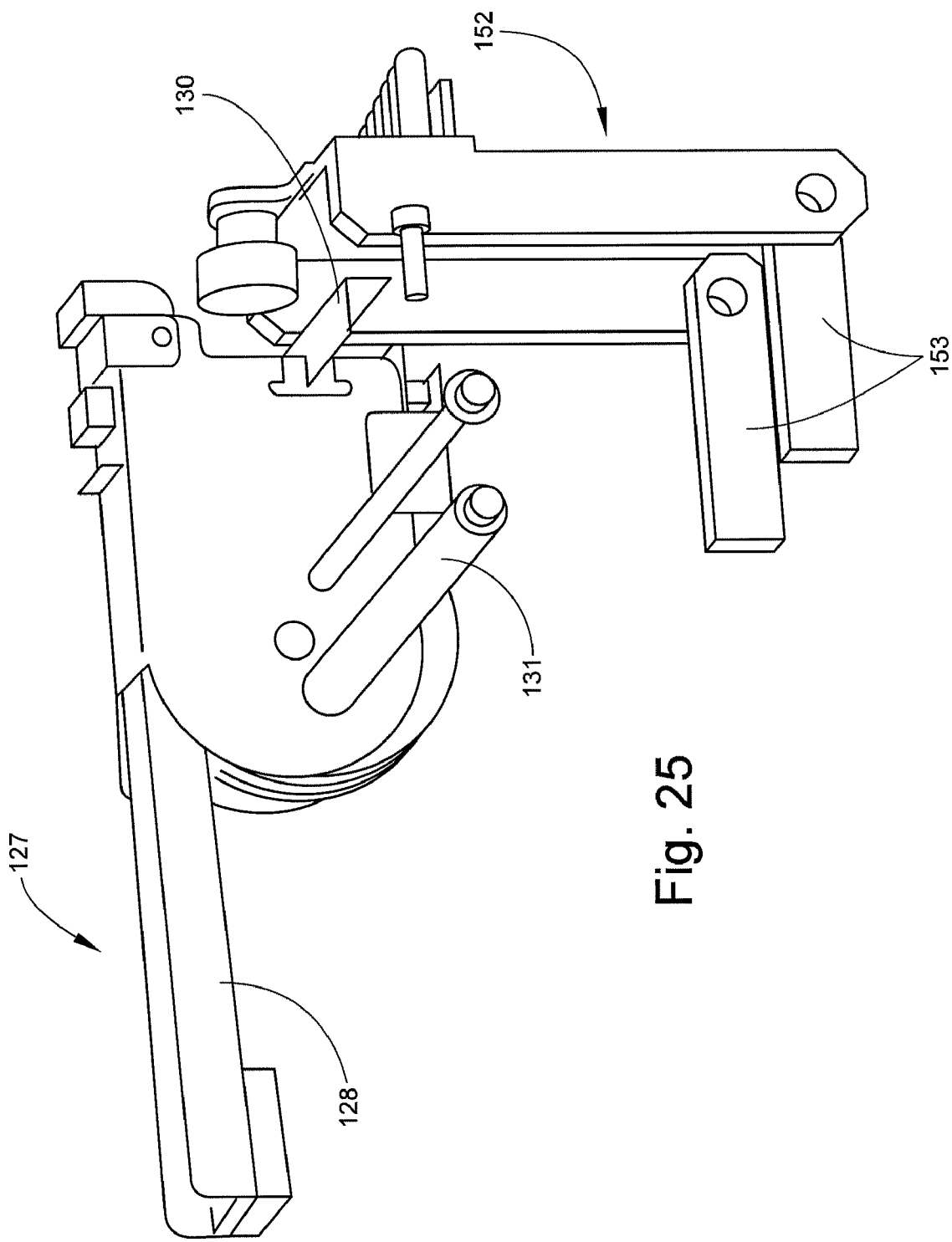
FIG. 25 is a view of a cable minder and a slack line detector in an embodiment of a lift assembly system of the present invention.

FIG. 25 is a view of the cable keeper 127, a slack line detector 152, and a dynamic load transducer in an embodiment of the present invention. As shown in FIG. 25, the slack line detector 152 can include sensors that may be used to monitor a slack line condition. A slack line condition can occur if one or more of the cables 31 lose tension. This could happen if the batten is accidentally lowered onto an object on the stage floor. Each cable 31 may pass off the drum 58, through the guide mechanism 130, under the slack line detector 152, and then out into the tube 11. The slack line detector 152 can include a slack line sensor arm 153, for example, a plastic slat, for each cable. The slat 153 may be have an off-centered pivot point, with an adjustable spring holding one end of the slat 153 down. The other end of the arm 153 may be positioned next to a switch, so that if the end near the switch is raised, it will trip the switch, which can relay a message to the controls of the lift system 10 to stop the batten until the slack line problem is resolved. If one of the cables 31 becomes slack, the lack of tension may cause the cable 31 to try to rise out of the guide mechanism 130. The cable 31 can then touch the plastic arm 153, causing the arm 153 to pivot, thereby tripping the switch. In this manner, each cable 31 can have a dedicated sensor arm 153 that is pivotable for actuating a limit switch to manage a slack cable. In certain embodiments, the pivotable arms 153 can be positioned in locations other than near the drum 58.

In some lift assemblies 10, the wire cable lengths may be slightly different and/or the batten or load may be uneven across its horizontal length. In some conventional lift assemblies, the cable lengths can be trimmed with a turnbuckle positioned between each cable 31 and the batten. Turnbuckles are typically vertically oriented along the drop of the cable 31 from the loft block 32 to the batten. Turnbuckles can often have a length of at least 6 inches and up to 14 inches or more at their maximum spread. Thus, vertically oriented turnbuckles can require added vertical distance, or height, between the overhead point at which loft blocks 32 are secured to a building and the lowest point at which the batten can be lowered. Every inch of additional height required by a lift assembly can be important, as it can mean a higher roof in a building, which can add significant costs to construction.

Figure 26:
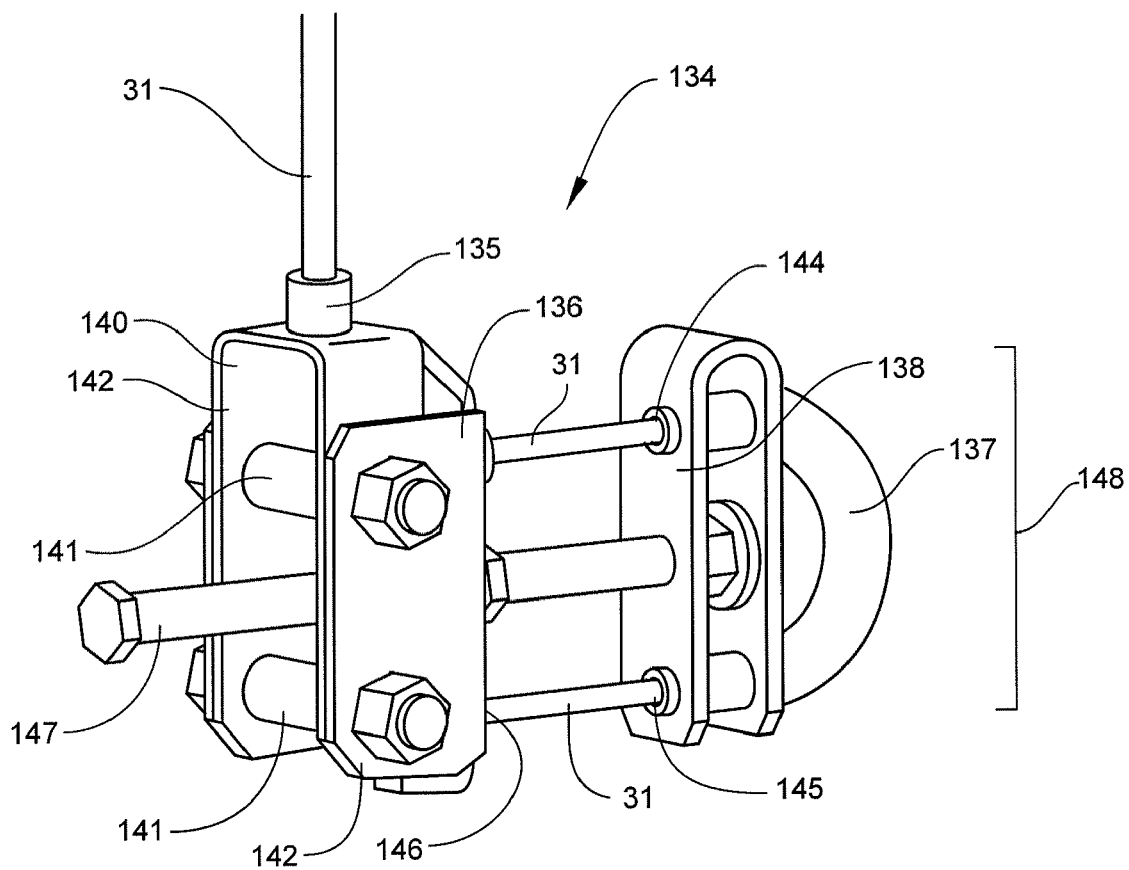
FIG. 26 is a view of a low profile, horizontally oriented cable adjuster in an embodiment of a lift assembly of the present invention.
Figure 27:
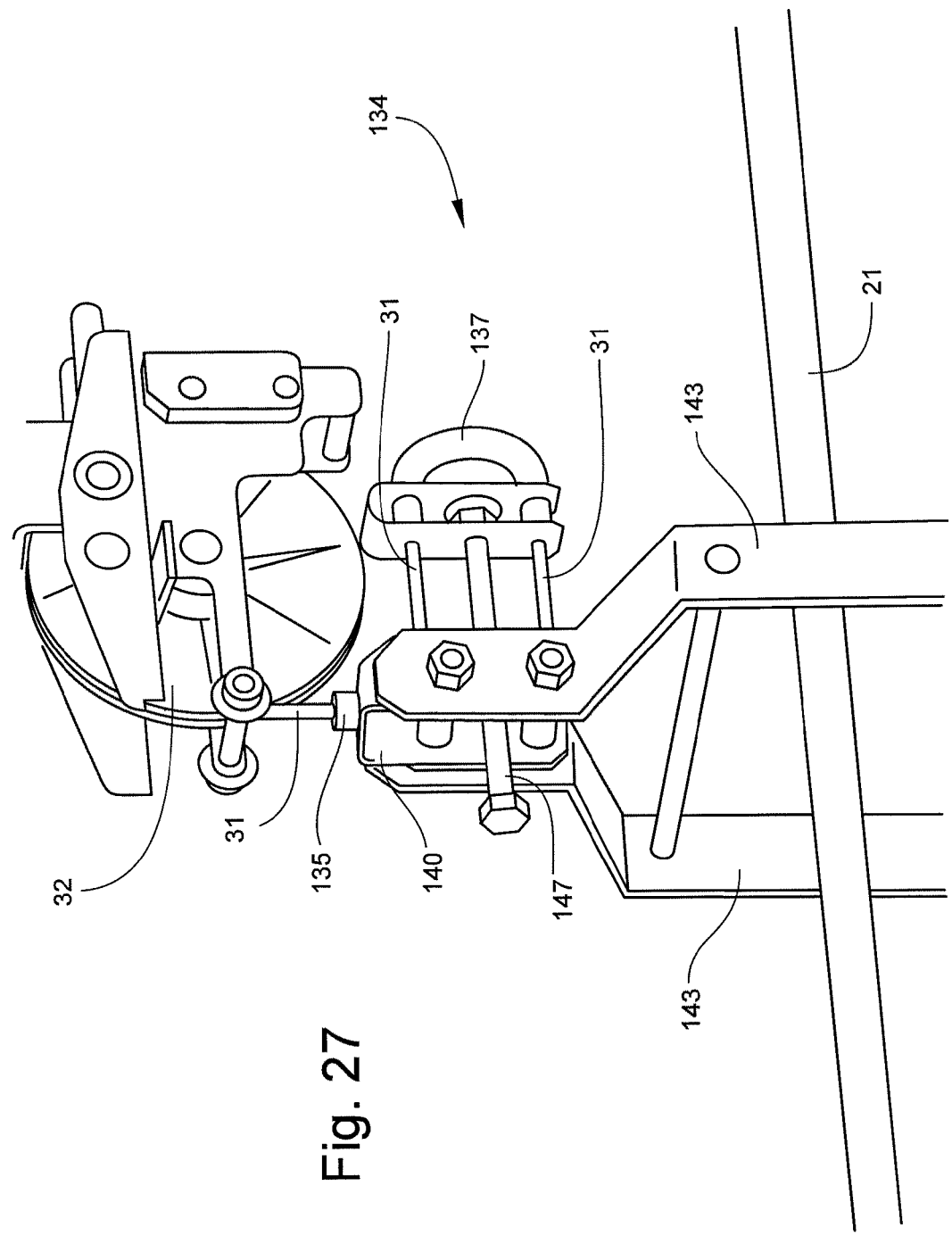
FIG. 27 is a view of the low profile cable adjuster shown in FIG. 26, in which the wire cable is shown movably attached to a loft block.
Figure 28:
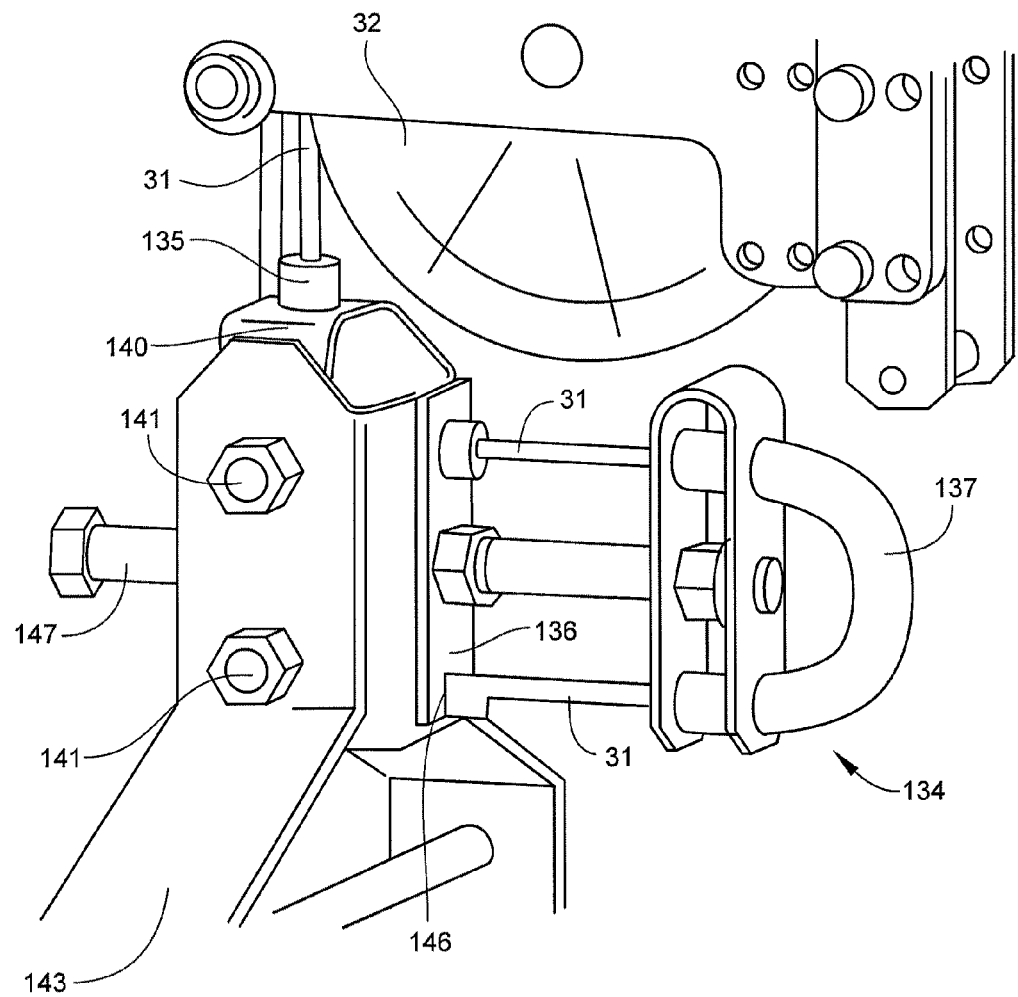
FIG. 28 is a view of the low profile cable adjuster shown in FIG. 26, showing the cable adjuster assembly attached to a pair of batten attachment arms.

Some embodiments of the present invention can include a low profile, horizontally oriented cable adjuster 134 as an interface between the cables 31 and the batten. FIGS. 26-29 illustrate various embodiments of such a low profile, horizontal cable adjuster 134. For example, as shown in FIGS. 26-29, the cable adjuster 134 can include a pair of cable guide mechanisms 135, 137. A first one of the cable guide mechanisms 135 can be attached to a first rigid plate 136 and include a cable pathway having an angle, for example, a 90 degree angle. A second one of the cable guide mechanisms 135 can be attached to a second rigid plate 138 spaced apart along a horizontal axis from the first plate 136 and include a cable pathway angle, for example, a 180 degree angle. In some embodiments, for example, as shown in FIGS. 26-28, the cable guide mechanisms 135, 137 having 90 degree angle and 180 degree angle cable pathways, respectively, can comprise a tubular material such as steel bent at those angles.

In some embodiments, the first plate 136 can be attached to a U-shaped support 140. The 90 degree cable guide tube 135 may be further attached to the U-shaped support 140, such that the U-shaped support 140 can be moved vertically along with the cable 31. One or more securing bolts 141 can pass through holes in each of the arms 142 of the U-shaped support 140. In certain embodiments, a batten attachment arm 143 can be secured to the U-shaped support 140 with the securing bolts 141. The second plate 138 can have various shapes and dimensions configured to provide support to the 180 degree cable guide mechanism 137. For example, as shown in the embodiments in FIGS. 26-28, the second plate 138 can be U-shaped and attached to the ends of the 180 degree cable guide tube 137. The cable adjuster assembly 134 can be strong enough to support a batten and/or a load attached to the cable 31.

As shown in FIGS. 26-29, the cable 31 can be routed vertically from the power head 22, through the 90 degree cable guide mechanism 135, horizontally into a cable entry point 144 in one end of the 180 degree cable guide mechanism 137 in a first horizontal direction, out of the 180 degree cable guide mechanism 137 in the opposite horizontal direction, and dead end at a cable attachment point 146 on the first plate 136 attached to the 90 degree cable guide mechanism 135. The cable 31 can be securely attached to the first plate 136 in a variety of ways. For example, the cable 31 can be attached to the first plate 136 using a "nico" fitting or a "swage" fitting.

In some embodiments, the cable adjuster assembly 134 can further include a horizontal adjustment bolt 147, or threaded rod, or other mechanism configured to maintain a desired distance between the first and second plates. The adjustment bolt 147 can help hold the assembly together. One end of the bolt or threaded rod 147 can be secured to the 180 degree cable guide mechanism 137. As shown in FIGS. 26-29, the horizontal adjustment bolt 147 can be attached to the second plate 138 attached to the 180 degree cable guide mechanism 137. The bolt 147 can be rotated to move the 180 degree cable guide mechanism 137 horizontally, thereby moving the cable 31 horizontally and moving the entire cable adjuster assembly 134 vertically on the cable 31. In this manner, the length of the cable 31 between the loft block 32 and the attached article 21 can be adjusted, that is lengthened or shortened. In some embodiments, the horizontal adjustment mechanism can comprise distance adjustment structures other than a bolt or rod.

The cable pathway through the guide mechanisms 135, 137 can be dimensioned for a particular cable diameter, or range of cable diameters, with sufficient clearance between the cable 31 and the inside wall of the guide mechanisms 135, 137 such the cable 31 can move smoothly through the guide mechanisms 135, 137 without undesirable friction, or drag. For example, the inside diameter of the cable pathway through the guide mechanisms 135, 137 can be large enough for a 3/16 inch and/or a 1/4 inch cable 31. In some embodiments, the inside diameter of the cable pathway through the guide mechanisms 135, 137 can be larger or smaller, depending on the diameter of the cable 31 to be guided through the guide mechanisms 135, 137. That is, for a cable 31 having a diameter smaller than 3/16 inch, or for a cable 31 having a diameter larger than 1/4 inch, the diameter of the cable pathway can be just large enough to accommodate that particular size cable 31.

The 180 degree guide mechanism 137 can have a spread 148 between the cable entry point 144 and the cable exit point 145 that provides a cable path that is sufficiently rounded, or arched, to reduce friction between the cable 31 and the guide mechanism 137. In certain embodiments, for example, the spread 148 of the cable path in the 180 degree guide mechanism 137 can be about two inches. That is, as shown in FIGS. 26-29, the distance between the cable entry point 144 into the 180 degree guide mechanism 137 and the cable exit point 145 from the 180 degree guide mechanism 137 can be about two inches. In some embodiments, the distance, or spread 148, between the cable entry point 144 into and the cable exit point 145 from the 180 degree guide mechanism 137 can be more or less than two inches, depending on various factors, including, for example, the differential between the diameter of the cable 31 and the inside diameter of the guide mechanism cable pathway, the materials from which each of the cable 31 and the inside walls of the guide mechanism cable pathway are made, and other factors. The relative sizes of the cable 31 and the cable pathway in the guide mechanisms 135, 137 and the spread of the cable 148 entering and exiting the 180 degree guide mechanism 137 can be dimensioned so as to maintain the structural integrity of the cable 31 and the cable pathway during repeated use.

The cable adjuster assembly 134 may be only a few inches tall, for example, two to four inches tall, which could save six or more inches of vertical distance, as compared to conventional lift assembly cable adjusters using vertically oriented turnbuckles. The cable adjuster 134 may be used to trim the cables 31 that hold the batten, effectively leveling the batten if one or more cables 31 are longer than another, or if the batten is loaded unevenly such that one end is heavier than the other. In this manner, the low profile, horizontally oriented design of the cable adjuster 134 of the present invention can eliminate the significant cost for building a foot or more of vertical space required in a building by other lift assembly systems.

Figure 29:
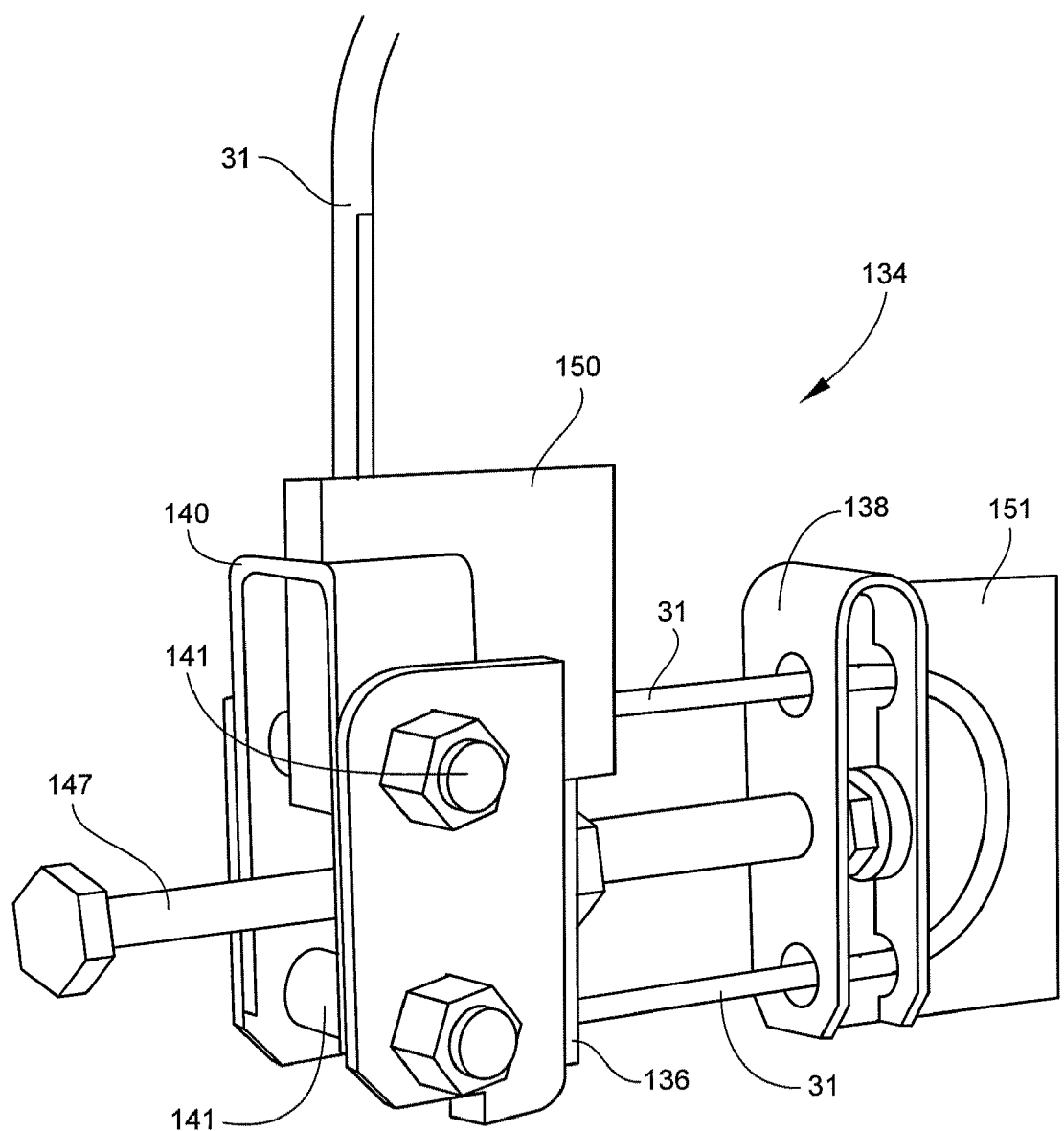
FIG. 29 is a view of another embodiment of a low profile, horizontally oriented cable adjuster having a 90-degree cable guide block and a 180-degree cable guide block for guiding the wire cable from the loft block in a horizontal direction.

In another embodiment of the low profile, horizontally oriented cable adjuster 134, the cable guide mechanisms 135, 137 can comprise a pair of guide blocks 150, 151 instead of angled tubes. FIG. 29 illustrates one embodiment of such a cable adjuster 134 having guide blocks 150, 151. In this embodiment, the first guide block 150 includes a 90 degree angle cable pathway, and the second guide block 151 includes a 180 degree angle cable pathway. In such a configuration, the guide blocks 150, 151 can guide the cable 31 from a vertical direction from the loft block 32 into a first horizontal direction and then into a second, opposite horizontal direction. In this manner, the cable adjuster 134 can provide a low profile mechanism for adjusting the cable 31 in the vertical direction so as to trim the cable 31.

In some embodiments, the cable guide blocks 150, 151 can comprise various materials. Such materials can be advantageously lightweight, strong, and inexpensive. One such material is plastic. In other embodiments, the guide blocks 150, 151 can comprise aluminum, steel, or other suitable load-bearing materials. The guide blocks 150, 151 can be made in various ways. For example, the guide blocks 150, 151 can be molded, or cast. As the guide blocks 150, 151 are made, the cable pathways can be formed within the guide blocks 150, 151.

The guide blocks 150, 151 can be securely attached to the first and second plates 136, 138, respectively. In certain embodiments, the guide blocks 150, 151 can be securely bolted or welded to the plates 136, 138 and/or supports. For example, as shown in FIG. 29, at least one of the securing bolts 141 can be inserted through the 90 degree angle cable guide block 150 to securely attached the guide block 150 to the U-shaped support 140 to which the first plate 136 is attached.

In other embodiments (not shown), the 180 degree guide mechanism 137 can include a pulley mechanism.

Figure 30:
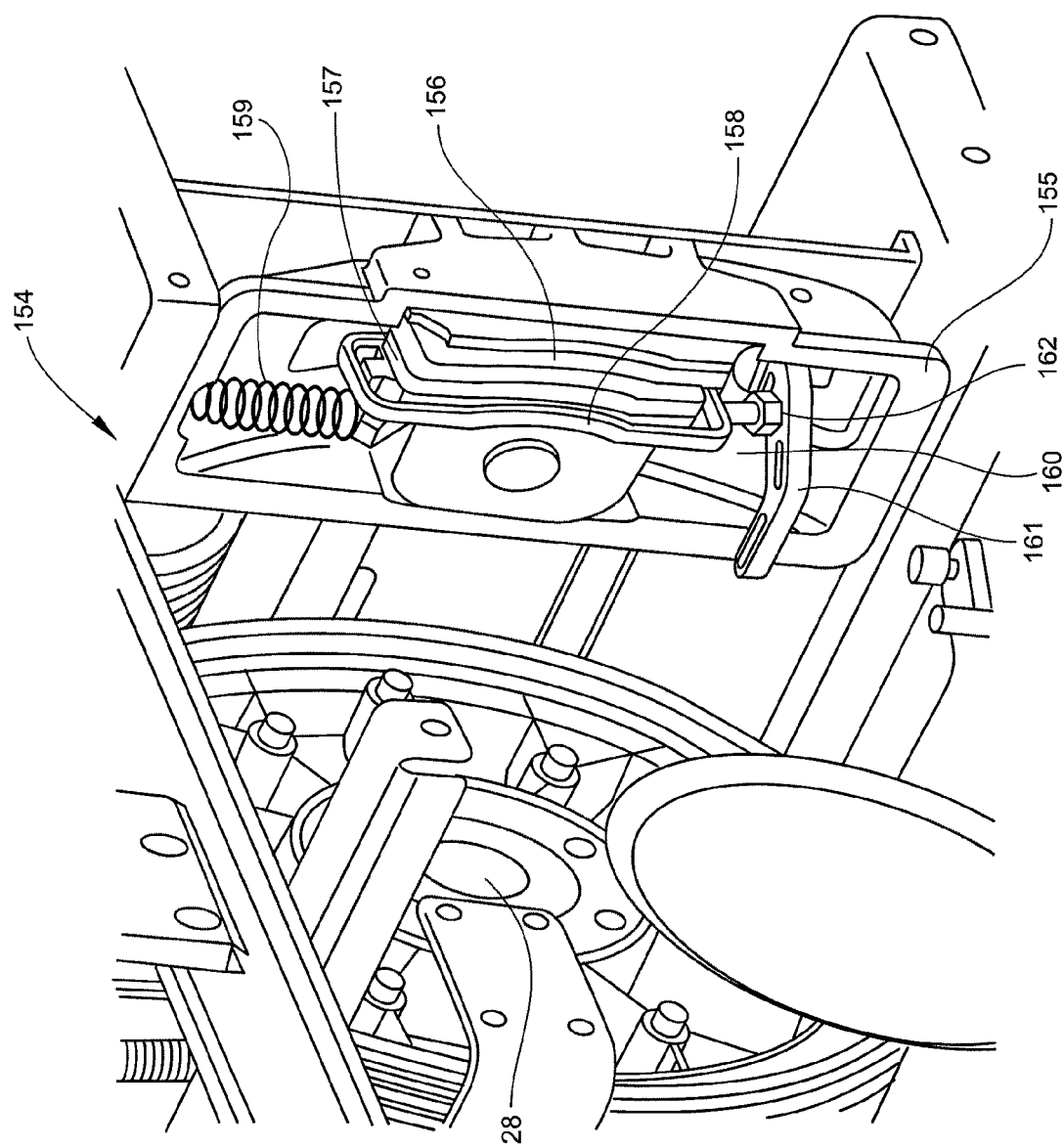
FIG. 30 is a view of a overspeed braking mechanism having the brake pad housing partially removed to show the brake pads and brake shoe inside the brake pad housing in an embodiment of the present invention.
Figure 31:
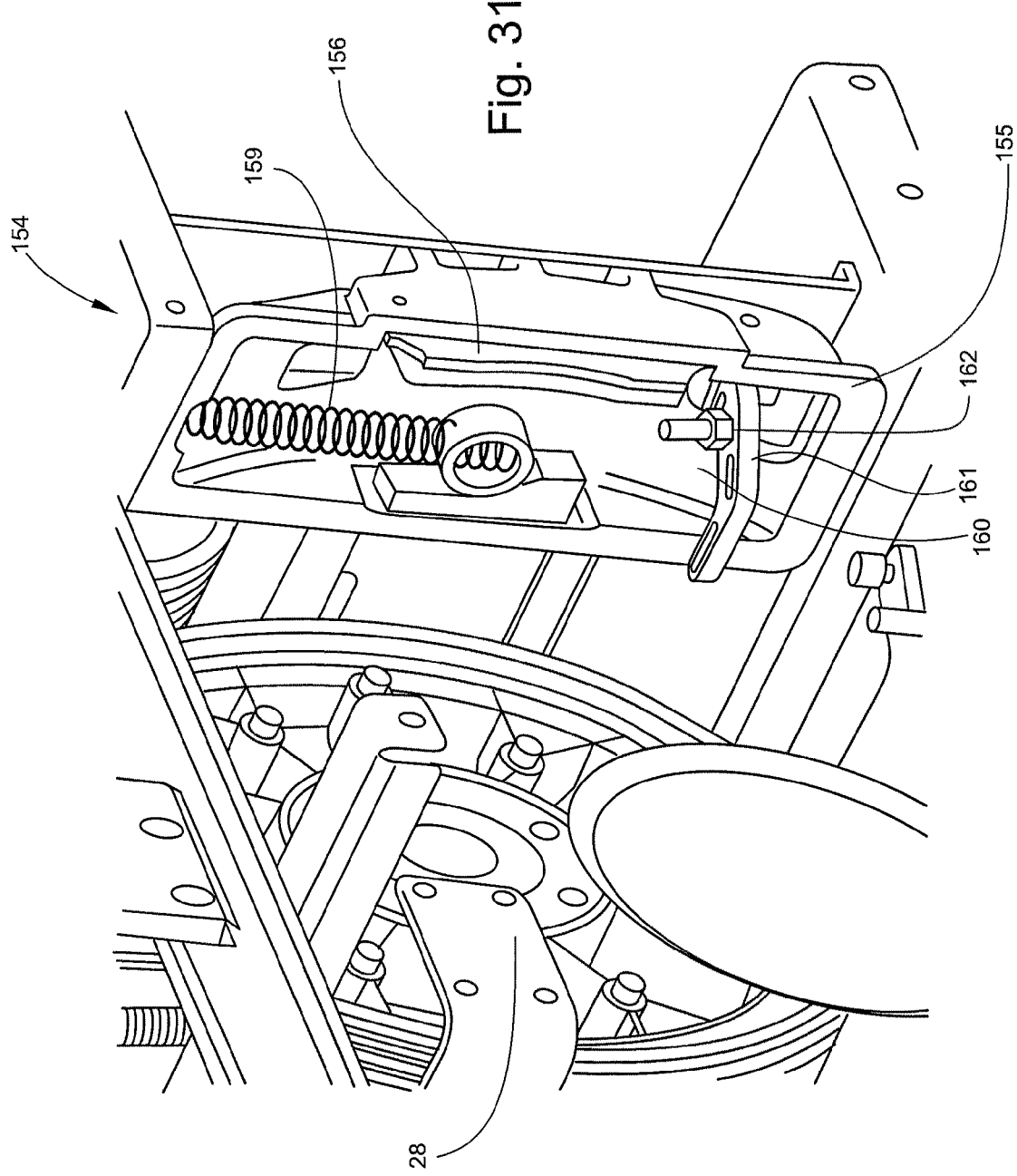
FIG. 31 is a view of the overspeed braking mechanism shown in FIG. 30, having the brake shoe removed to show the ramp.

Some embodiments of the lift assembly system 10 and method can include an "overspeed" braking mechanism 154 on the load side of the system 10. Such a load-side, overspeed braking mechanism 154 can serve as a back-up braking mechanism for the brake 36. The overspeed braking mechanism 154 can comprise a brake rotor, or disk 85, positioned on the drive shaft 28 of the motor 27. In the embodiment shown in FIGS. 30 and 31, the brake disk 85 has been removed to show other portions of the braking mechanism 154. In certain embodiments, the braking mechanism 154 can include a caliper-type brake. Such a caliper-type brake can include a brake pad housing 155 having a fixed brake pad 156 and a moveable brake pad 157. The moveable brake pad 157 can move toward the fixed brake pad 156 so as to compress against the brake disk 85 to slow and/or stop rotation of the drive shaft 28 and the attached cable drum 58.

The overspeed braking mechanism 154 can further include a brake shoe 158 adapted to move up and down on a ramp 160. When the article 21, or other load, is being raised in the lift system 10, the brake disk 85 moves in the counterclockwise direction to a more narrow portion of the ramp 160 and away from the surface of the ramp 160. This movement allows the brake shoe 158 to remain free from compressing the moveable brake pad 157, thereby allowing the brake disk 85 and the load to move freely under the power of the motor 27. The overspeed braking mechanism 154 can further include a spring 159 connected between the top of the brake shoe 158 and the top of the brake pad housing 155. In this configuration, the spring 159 can provide a bias against the brake shoe 158. While the article 21 is being raised, the spring 159 is biased against the brake shoe 158 so as to provide a "pre-load" on the brake shoe 158. In this manner, if power of the motor 27 is lost and the cables 31 and attached article 21 began to free fall, the spring 158 can push the brake shoe 158 to compress the moveable brake pad 157 toward the fixed brake pad 156 and exert friction against the brake disk 85 between the brake pads 156, 157, thereby slowing and/or stopping fall of the article 21.

When the article 21, or other load, attached to the cables 31 is being lowered in the lift system 10, gravity on the load causes the brake disk 85 moving in a clockwise direction to move to a wider portion of the ramp 160 and press against the ramp 160. This movement of the brake shoe 158 causes it to compress the moveable brake pad 157 onto the brake disk 85 and against the fixed brake pad 156 into a position capable of slowing and/or stopping movement of the cables 31. Thus, when the cables 31 and attached article 21 are being lowered, the brake disk 85 is frictionally engaged between the moveable brake pad 157 compressed toward the fixed brake pad 156. However, the power of the motor 27 can be greater than the coefficient of friction of the brake disk 85 between the compressed moveable brake pad 157 and the fixed brake pad 156 so that the article 21 can continue to be lowered. If power of the motor 27 is lost and the cables 31 and attached article 21 began to free fall, the spring 158 can push the brake shoe 158 to compress the moveable brake pad 157 toward the fixed brake pad 156 and maintain friction of the brake pads 156, 157 against the brake disk 85, thereby slowing and/or stopping fall of the article 21. The "pre-load" push provided by the spring 159 may provide the additional friction on the brake disk 85 to cause the article 21 to be completely stopped, rather than only slowing, in the event of a loss of motor power.

The overspeed braking mechanism 154 can include a brake release arm 161. The brake release arm 161 can be pivotable about a pivot 162. The pivoting end of the brake release arm 161 extends outward so that a plate (not shown) on the motor 27 can push downward on the arm 161 when the motor 27 tilts slightly downward with the drive shaft 28 after the motor 27 stops rotating but before the gravitational force of the causes the drive shaft 28 to begin rotating again. This decreases the suddenness, or "shock" to the system, of having to release the brake 154 quickly.

In certain embodiments, the brake disk 85 can comprise a surface material having a high friction coefficient. For example, the brake disk surface material can comprise steel or cast iron such that the friction between the brake pads 156, 157 and the disk 85 is enhanced. The frictional interface between the brake disk 85 and the brake pads 156, 157 can help the brake disk 85 (and the motor 27) slow to a stop, rather than stopping undesirably abruptly. This can allow the overspeed braking mechanism 154 to be released more gradually and the article 21 being lowered by the lift system 10 to be stopped more gradually in the last few feet of descent in the event that the overspeed brake 154 is activated.

Figure 32:
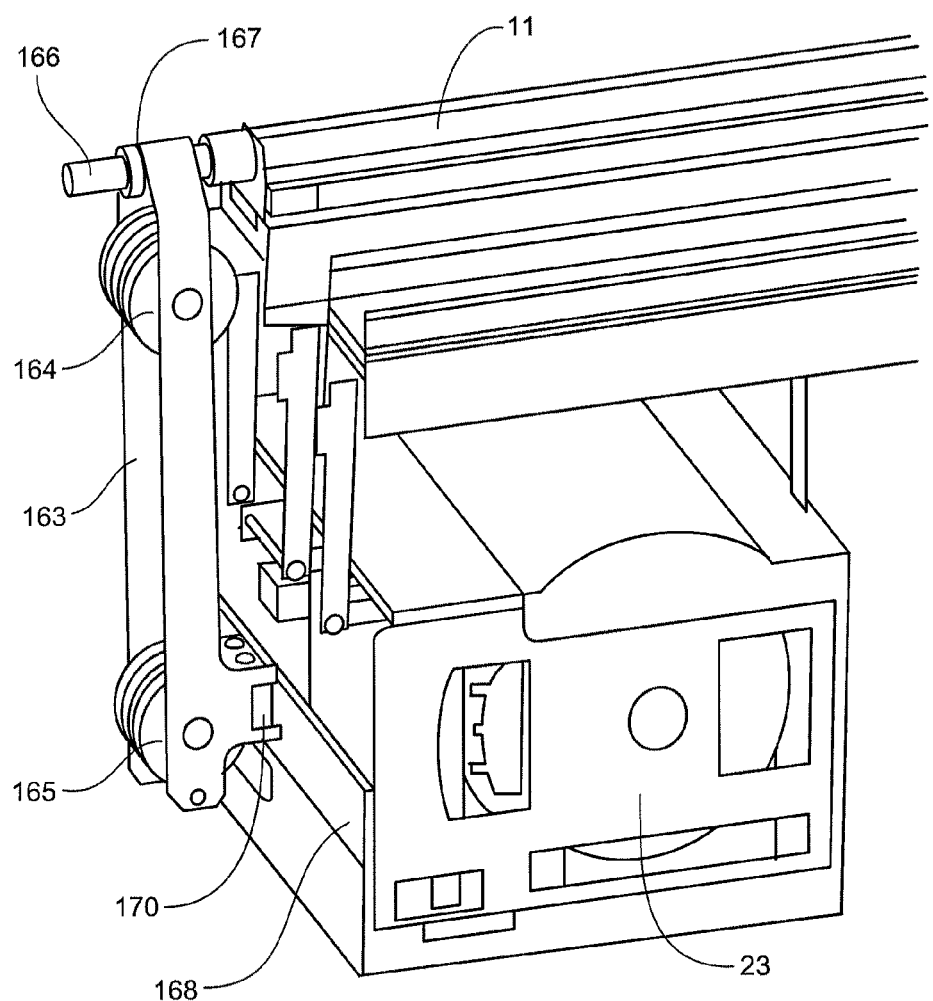
FIG. 32 is a view of a fleet pivot arm pivotably attached to a tube in an embodiment of the present invention.

Some embodiments of the lift assembly system 10 and method can further include a fleet pivot arm 163. As shown in FIG. 32, the fleet pivot arm 163 can be pivotably attached to the tube 11 and drive mechanism, or power head, housing 23. The fleet pivot arm 163 can comprise a U-shaped arm having an upper pulley, or block 164, adjacent the tube 11 and a lower pulley, or block 165, adjacent the power head 22. A pivot rod 166 can extend outward from the tube 11 in axial alignment with the longitudinal axis of the tube 11. The upper U-shaped portion of the fleet pivot arm 163 can be pivotably attached about a pivot point 167 on the pivot rod 166 such that the lower portion of the fleet pivot arm 163 can pivot in a direction substantially perpendicular to the longitudinal axis of the tube 11. The upper U-shaped portion of the fleet pivot arm 163 can include bearings that provide a pivotable interface with the pivot rod 166.

A pivot plate 168 can be attached to the end of the drive mechanism housing 23 to provide a rigid surface on which the fleet pivot arm 163 can contact as it pivots. The fleet pivot arm 163 can include a roller 170 on the inside of the arm 163 opposite the lower block 165 and adjacent the pivot plate 168. As the fleet pivot arm 163 pivots, the roller 170 can roll against the pivot plate 168 to provide a smooth movement of the pivot arm 163 back and forth. In certain embodiments, the fleet pivot arm 163 can include two or more rollers 170 that can roll against the pivot plate 168 as the pivot arm 163 pivots. In some embodiments, the roller 170 can have a cylindrical shape. In other embodiments, the roller 170 can have a conical shape that can accommodate movement of the fleet pivot arm 163 in an arc as it pivots about the pivot rod 166.

In operation, the cables 31 can be routed from the drum 58 around the lower block 165, then upward to the upper block 164, and finally into the tube 11 to the respective loft blocks 32. The upper and lower blocks 164, 165, respectively, on the fleet pivot arm 163 can rotate freely. As the cables 31 are unwound from the drum 58, the fleet pivot arm 163 can pivot in response to the angle at which the cables 31 are paying out from the drum 31. In this manner, the pivoting of the fleet pivot arm 163 can help guide the cables 31 along a desired fleet angle as the cables 31 are unwound from and wound onto the drum 58. Embodiments of the fleet pivot arm 163 may be particularly advantageous in a lift system in which the drum 58 is a funnel-shaped, or progressive diameter, drum as shown in FIGS. 6-11 and 23. Since the fleet angle of the cables 31 at the point at which they travel into and out of the tube 11 odes not change, the upper block 164 near the pivot point 167 does not need to move except minimally.

Some embodiments of the lift assembly system 10 and method can further include a load sensor mechanism 171. In some embodiments, the load sensor mechanism 171 can comprise a compression load cell sensor (not shown) positioned between the tube 11 and the power head 22. The compression load sensor mechanism 171 can be used to measure the load on the batten by sensing the forces trying to move the power head 22 and compression tube 11 toward each other. This can be useful to monitor changes in the load on the batten, such as if the batten were to become caught on a curtain or other obstruction. If the load sensor mechanism 171 senses a change in the load, it can relay a message to the lift system control system to slow and/or stop operation of the lift system 10 until the problem has been resolved. In certain embodiments, the load sensor mechanism 171 can be mounted between the tube 11 and the drive mechanism housing 23. The load sensor mechanism 171 can be configured as a button that is actuated by compressing when the tube 11 and the power head 22 move closer to each other due to load forces exerted by movement of the article 21 attached to the cables 31.

In another embodiment, the interface between the tube 11 and the drive mechanism housing 23 can comprise a slide plate 174 configured to slide on a set of rails 173 between the tube 11 and the drive mechanism housing 23. The load sensor mechanism 171 can be operably attached to the slide plate 174 such that increased load forces due to movement of the article 21 can cause the slide plate 174 to slide on the rails 173 and compress a button sensor to actuate the sensor and adjust movement of the load as needed. In another embodiment, the interface between the tube and the drive mechanism housing 23 can comprise a moveable hinge to which the load sensor mechanism 171 is operably attached. The hinge can allow the tube 11 and the power head 22 to move toward each other, thereby compressing the load sensor mechanism 171 and adjusting movement of the load as needed.

Figure 33:
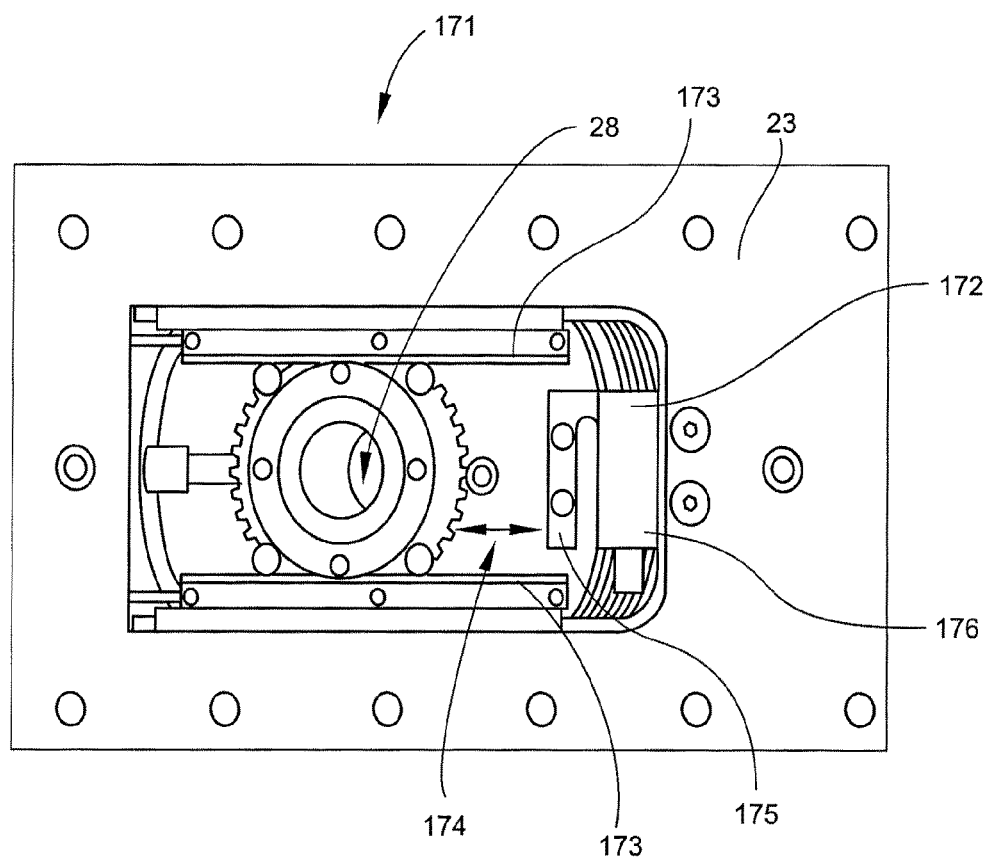
FIG. 33 is a view of a pull-type load sensor inside a drive mechanism housing having a portion of the housing removed to show the load sensor, slide rails, and slide plate in an embodiment of the present invention.

In other embodiments of the lift assembly system 10 and method, monitoring and controlling movement of the load can be accomplished by the load sensor mechanism 171 comprising a pull-type load sensor (also referred to as an S-type load sensor), as shown in FIG. 33. The pull-type load sensor can be used to measure changes in the load on the batten by sensing the forces attempting to pull the tube 11 away from the drum 58. As shown in FIG. 33, such a load sensor mechanism 171 can include a load sensor 172 mounted between the tube 11 and the drum 58 comprising a first portion 175 and a second portion 176, each portion 175, 176 adapted to be pulled against the other, thereby sensing changes in a load force on the article 21 attempting to pull the tube 11 away from the drum 58. In this manner, the sensor 172 can sense changes in the load force and signal controls in the lift assembly system 10 to adjust movement of the article 21.

In some embodiments, the load sensor mechanism 171 can further include a set of slide rails 173 attached between the drive shaft 28 and drum 28 in the drive mechanism housing 23 and the tube 11. A load cell slide plate 174 can be slidably mounted on the slide rails 173. The pull-type load cell sensor 172 can be operably attached between the slide plate 174 and the drive shaft 28 and drum 58. Increased load forces due to movement of the article 21 can cause the slide plate 174 to slide on the rails 173 away from the drive shaft 28 and drum 58 and pull the load sensor 172 to actuate the sensor 172 and adjust movement of the load as needed. In particular embodiments, the lift assembly system 10 can include the slide rails 173, slide plate 174, and pull-type load sensor 172 on the drive shaft 28 on each side of the drum 58.

Embodiments of components of the lift assembly system 10 and methods may be advantageously utilized in other lift systems and methods. For example, the hybrid funnel-shaped, progressive diameter drum 58, the cable management system 100, the splicing clamp 112, the beam clamp tube receiver 118, the self-locking loft block 32, the cable keeper 127, the slack line detector 152, the low profile cable adjuster 134, the overspeed braking mechanism 154, the fleet pivot arm 163, and/or the pull-type load sensor 172 may be utilized alone or in combination in other lift systems.

Some embodiments of the present invention include a lift system, comprising: a substantially rectangular tube having an opening in a bottom along at least a portion of a length of the tube, and connectable to an overhead structure; a drive mechanism connected externally on one end of the tube; a funnel-shaped drum operably connected to the drive mechanism and adapted to wind and unwind a plurality of cables about the drum to raise and lower an article attached to the cables; and a plurality of loft blocks connected to the tube internally so as to redirect the cables from a generally horizontal path from the drum to a generally vertical path through the bottom opening in the tube to the attached article.

In such embodiments, the drum can further comprise: an apex having a first diameter and a base having a second diameter larger than the first diameter; a constant diameter portion having the first diameter and extending from the apex; a gradually increasing diameter portion extending from the constant diameter portion to the base; a plurality of discrete circumferential channels in the constant diameter portion, each channel adapted to route and maintain one of the cables in a predetermined position about the drum; and a first one of the channels adjacent the gradually increasing diameter portion extending in a circumferential pattern about the gradually increasing diameter portion, wherein a first one of the cables is windable in the first channel about the constant diameter portion and the gradually increasing diameter portion to the base.

In some such embodiments, when the first cable is wound about the drum, notches are formed between adjacent coils of the first cable, wherein a second cable is windable in a second channel adjacent the first channel and into succeeding notches in the coils of the first cable, and wherein succeeding cables are windable in succeeding adjacent channels in the constant diameter portion and into succeeding adjacent notches in coils of an adjacent wound cable.

In some such embodiments, each of the cables is windable about the drum substantially simultaneously.

Some such embodiments can further comprise a cable guide assembly comprising a movable guide block having a guide hole for each of the cables and operably connected to the drum such that the guide block can move at substantially the same angle as the drum to guide the cables as they are wound onto and unwound from the drum.

Some embodiments of the present invention include a lift system, comprising: a plurality of wires, one end of at least one of the wires connectable to an input source associated with the drive mechanism and the opposite end of the at least one of the wires connectable to an output object movable with the article; a wire containment cable for containing the plurality of wires; and a tray connected along at least a portion of a length of the tube and having dimensions for containing the wire containment cable, wherein the wire containment cable is movable between a first, substantially vertical position when the article is fully lowered and a second, substantially horizontal position in the tray when the article is fully raised.

In some such embodiments, when the article is fully raised, the wire containment cable comprises a single layer in the tray.

In some such embodiments, the tray is connected to the top of the article.

In some such embodiments, the lift system can further comprise: a first roller rotatingly attached to one end of the tray; and a second roller movably attached to the tray and movable a predetermined distance along a length of the tray as the article is moved, wherein one of the plurality of cables comprises a wire cable lift cable, wherein the wire containment cable is attached to the second roller and to the wire cable lift cable, and wherein the wire containment cable is guided by the second roller about a surface of the first roller between the first and second positions.

In some such embodiments, the lift system can further comprise a wire cable loft block located near the end of the tube opposite the drive mechanism, wherein the wire cable lift cable is routed from the drum to and around the wire cable loft block and back in the opposite direction to the second and first rollers.

Some embodiments of the present invention include a lift system, comprising: the tube further comprising a plurality of lengthwise portions connectable to each other end to end; and a splicing clamp comprising an upper plate and a lower plate adapted to receive and tighten about two abutting ends of the tube portions.

Some embodiments of the present invention include a lift system, comprising: a beam clamp tube receiver comprising a pair of opposing hooks adapted to be tightened together securely onto opposite sides of the overhead structure, and at least two opposing inserts movable vertically inside each hook and spreadable so as to receive the tube and lock together after the tube is received.

In some such embodiments, the tube can further comprise an upward extension comprising a tapered tip having a flange adapted to securely engage the beam clamp tube receiver; wherein each hook further comprises a pair of opposing clamps movable vertically inside the hook; and wherein when the upward extension is inserted into the hook, the clamps are moved up and forced open by the tapered end of the tip and the tip flange rests on top of the clamps to lock the tube into the beam clamp tube receiver.

In some such embodiments, the tube is slidable in the beam clamp tube receiver in a direction perpendicular to the overhead structure to which the beam clamp tube receiver is attached.

In some such embodiments, the inserts further comprise a friction-reducing plastic material.

Some embodiments of the present invention include a lift system, wherein at least one of the loft blocks further comprises a self-locking loft block, tiltable out of locked position so that the loft block can be repositioned along the length of the tube and tiltable back into locked position.

In some such embodiments, the lift system can further comprise a slotted rail on the inside of at least one of a front and a back of the tube adapted to guide a loft block.

Some embodiments of the present invention include a lift system, comprising: a cable keeper comprising an arm extending across the constant diameter portion and the increasing diameter portion of the drum along an axis of the cables and biased against the drum so as to maintain the cables in position about the constant diameter portion in the event of loss of tension in one or more of the cables.

In some such embodiments, an end of the cable keeper is attached to a guide mechanism movable across the constant diameter portion of the drum at the same rate as the cables wind onto and unwind from the drum.

In some such embodiments, the guide mechanism further comprises: a low limit switch adapted to sense a degree of unwinding of the cables as an indicator of when the article has been fully lowered; and an upper limit switch adapted to sense a degree of winding of the cables as an indicator of when the article has been fully raised.

Some embodiments of the present invention include a lift system, comprising: a slack line detector comprising a slack line sensor arm biased against one of the cables and movable in response to a loss of tension on the cable; and a switch responsive to movement of the sensor arm and adapted to adjust movement of the cables.

Some embodiments of the present invention include a lift system, comprising: a low profile cable adjuster comprising a first cable guide attached to a first plate and having a 90 degree angle cable path; a second cable guide attached to a second plate horizontally spaced from the first cable guide and having a 180 degree angle cable path; and a horizontal adjustment mechanism attached to the first and second plates configured to maintain an adjustable distance between the first and second plates, wherein the cable can be routed vertically from the loft block into the first cable guide, out of the first cable guide in a first horizontal direction into one end of the second cable guide, and out of the second cable guide in a second, opposite horizontal direction to an attachment point on the first plate, and wherein the horizontal adjustment mechanism is adjustable to change a length of the cable between the loft block and the article.

Some embodiments of the present invention include a lift system, in which the drive mechanism further comprises a drive shaft rotatingly connected to a motor, and the lift system further comprises: an overspeed braking mechanism having a brake disk attached to the drive shaft rotatingly positioned between a moveable brake pad moveable toward a fixed brake pad; and a brake shoe attached to the moveable brake pad and configured to move up on a ramp when the article is being lowered to compress against and stop rotation of the brake disk and drive shaft and to move down on the ramp when the article is being raised to allow rotation of the brake disk and drive shaft.

In some such embodiments, the drive shaft and the motor are configured to tilt downward after the overspeed braking mechanism causes the drive shaft to stop, the overspeed braking mechanism further comprising a pivotable brake release arm configured for actuation by the motor when the motor tilts downward so as to gradually release the overspeed braking mechanism.

Some embodiments of the present invention include a lift system, comprising: a fleet pivot arm pivotably attached to an end of the tube above the drive mechanism having an upper block adjacent the tube and a lower block adjacent the drive mechanism such that the lower block can pivot in a direction substantially perpendicular to a longitudinal axis of the tube, wherein the fleet pivot arm is pivotable so as to guide the cables along a desired fleet angle as the cables are unwound from and wound onto the drum.

In some such embodiments, the lift system further comprises: a pivot plate attached to a drive mechanism housing; and a roller on an inside of the fleet pivot arm adjacent the lower block configured to roll against the pivot plate as the fleet pivot arm pivots.

Some embodiments of the present invention include a lift system, comprising: a load sensor connected between the drive mechanism and the drive mechanism housing and comprising a first portion and a second portion, each portion adapted to be pulled against the other, thereby sensing changes in a load force on the article attempting to pull the drive mechanism away from the drive mechanism housing, wherein the sensor is adapted to adjust movement of the article when changes in the load force are sensed.

In some such embodiments, the lift system further comprises: a set of slide rails attached between the tube and the drive shaft; and a load sensor slide plate slidably mounted on the slide rails, wherein the load sensor is operably attached to the load sensor slide plate, and wherein an increased load force on the article causes the slide plate to be pulled away from the drive shaft and drum, and the first and second portions of the load sensor to be pulled against each other.

Some embodiments of the present invention include a lift system drum, comprising: a funnel-shaped drum comprising an apex having a first diameter and a base having a second diameter larger than the first diameter; a constant diameter portion having the first diameter and extending from the apex; and a gradually increasing diameter portion extending from the constant diameter portion to the base, wherein the drum is adapted to wind and unwind a plurality of cables about the drum to raise and lower an article attached to the cables.

In some such embodiments, the lift system drum can further comprise: a plurality of discrete circumferential channels in the constant diameter portion, each channel adapted to route and maintain one of the cables in a predetermined position about the drum; and a first one of the channels adjacent the gradually increasing diameter portion extending in a circumferential pattern about the gradually increasing diameter portion, wherein a first one of the cables is windable in the first channel about the constant diameter portion and the gradually increasing diameter portion to the base.

In some such embodiments of the lift system drum, when the first cable is wound about the drum, notches are formed between adjacent coils of the first cable, wherein a second cable is windable in a second channel adjacent the first channel and into succeeding notches in the coils of the first cable, and wherein succeeding cables are windable in succeeding adjacent channels in the constant diameter portion and into succeeding adjacent notches in coils of an adjacent wound cable.

In some such embodiments of the lift system drum, each of the cables is windable about the drum substantially simultaneously.

Some embodiments of the present invention include a lift system cable management system, comprising: a plurality of wires, one end of at least one of the wires connectable to an input source and the opposite end of the at least one of the wires connectable to an output object movable with an article; a wire containment cable for containing the plurality of wires; and a tray connected along at least a portion of a length of a substantially rectangular tube connectable to an overhead structure, the tray having dimensions for containing the wire containment cable; wherein the wire containment cable is movable between a first, substantially vertical position when the article is fully lowered and a second, substantially horizontal position in the tray when the article is fully raised.

In some such embodiments of the lift system cable management system, when the article is fully raised, the wire containment cable comprises a single layer in the tray.

In some such embodiments of the lift system cable management system, the tray is connected to a top of the article.

Some such embodiments of the lift system cable management system can further comprise: a first roller rotatingly attached to one end of the tray; and a second roller movably attached to the tray and movable a predetermined distance along a length of the tray as the article is moved, wherein one of the plurality of cables comprises a wire cable lift cable, wherein the wire containment cable is attached to the second roller and to the wire cable lift cable, and wherein the wire containment cable is guided by the second roller about a surface of the first roller between the first and second positions.

Some such embodiments of the lift system cable management system can further comprise a wire cable loft block located near the end of the tube opposite the drive mechanism, wherein the wire cable lift cable is routed from the drum to and around the wire cable loft block and back in the opposite direction to the second and first rollers.

Some embodiments of the present invention include a beam clamp tube receiver, comprising: a pair of opposing hooks adapted to be tightened together securely onto opposite sides of an overhead structure; and at least two opposing inserts movable vertically inside each hook and spreadable so as to receive a substantially rectangular tube and lock together after the tube is received.

In some such embodiments of the beam clamp tube receiver, the tube is slidable in the beam clamp tube receiver in a direction perpendicular to the overhead structure to which the beam clamp tube receiver is attached.

Some embodiments of the present invention include a low profile cable adjuster, comprising: a first cable guide attached to a first plate and having a 90 degree angle cable path; a second cable guide attached to a second plate horizontally spaced from the first cable guide and having a 180 degree angle cable path; and a horizontal adjustment mechanism attached to the first and second plates configured to maintain an adjustable distance between the first and second plates, wherein the cable can be routed vertically from the loft block into the first cable guide, out of the first cable guide in a first horizontal direction into one end of the second cable guide, and out of the second cable guide in a second, opposite horizontal direction to an attachment point on the first plate, and wherein the horizontal adjustment mechanism is adjustable to change a length of the cable between a loft block in a lift system and an article to which the cable is attached.

Some embodiments of the present invention include an overspeed brake mechanism, comprising: a brake disk attached to a drive shaft operably connected to a motor and rotatingly positioned between a moveable brake pad moveable toward a fixed brake pad; and a brake shoe attached to the moveable brake pad and configured to move up on a ramp when the motor is unwinding cables to move a load downward to compress against and stop rotation of the brake disk and drive shaft and to move down on the ramp when the motor is winding the cables to move the load upward to allow rotation of the brake disk and drive shaft.

Some embodiments of the present invention include a fleet pivot arm, comprising: a U-shaped arm pivotably attachable to an end of a tube above a drive mechanism in a lift system; the arm having an upper block adjacent the tube and a lower block adjacent the drive mechanism, the lower block pivotable in a direction substantially perpendicular to a longitudinal axis of the tube, wherein when the arm pivots, a plurality of cables attached to a drum are routed along a desired fleet angle as the cables are unwound from and wound onto the drum.

Some such embodiments of the fleet pivot arm can further comprise a roller on an inside of the fleet pivot arm adjacent the lower block and configured to roll against a pivot plate attached to a drive mechanism housing as the fleet pivot arm pivots.

Some embodiments of the present invention include a lift system load sensor, comprising: a first portion connected to a drive mechanism having a drum adapted to wind and unwind a plurality of cables about the drum to raise and lower an article attached to the cables; and a second portion connected to a drive mechanism housing, wherein each portion is adapted to be pulled against the other, thereby sensing changes in a load force on the article attempting to pull the drive mechanism away from the drive mechanism housing, and wherein the load sensor is adapted to adjust movement of the article when changes in the load force are sensed.

Some such embodiments of the lift system load sensor can further comprise: a set of slide rails attached between the drive mechanism housing and a drive mechanism operably connected to the drum; and a load sensor slide plate slidably mounted on the slide rails, wherein the load sensor is operably attached to the load sensor slide plate, and wherein an increased load force on the article causes the slide plate to be pulled away from the drive mechanism housing, and the first and second portions of the load sensor to be pulled against each other.

Some embodiments of the present invention include a method, comprising: providing a lift system comprising (a) a substantially rectangular tube connectable to an overhead structure, (b) a drive mechanism connected externally on one end of the tube, (c) a funnel-shaped drum operably connected to the drive mechanism, (d) a plurality of loft blocks connected to the tube internally; routing a plurality of cables each attached on one end to the drum through a generally horizontal path of travel from the drum to one of the loft blocks, and then through a generally vertical path of travel downward from the loft block; attaching an opposite end of each cable to an article; winding the cables about the drum to raise the article; and unwinding the cables from the drum to lower the article.

In some such embodiments of the method, the drum can further comprise: an apex having a first diameter and a base having a second diameter larger than the first diameter; a constant diameter portion having the first diameter and extending from the apex; a gradually increasing diameter portion extending from the constant diameter portion to the base; a plurality of discrete circumferential channels in the constant diameter portion, each channel adapted to route and maintain one of the cables in a predetermined position about the drum; and a first one of the channels adjacent the gradually increasing diameter portion extending in a circumferential pattern about the gradually increasing diameter portion; and the method can further comprise: winding a first one of the cables in the first channel about the constant diameter portion and the gradually increasing diameter portion to the base, whereby notches are formed between adjacent coils of the first cable; winding a second cable in a second channel adjacent the first channel and into succeeding notches in the coils of the first cable; and winding succeeding cables in succeeding adjacent channels in the constant diameter portion and into succeeding adjacent notches in coils of an adjacent wound cable.

Some such embodiments of the method can further comprise winding each of the cables about the drum substantially simultaneously.

Some such embodiments of the method can further comprise: routing each of the cables through a guide hole in a guide block of a cable guide assembly that is operably connected to the drum; and moving the guide block at substantially the same angle as the drum to guide and maintain the cables at the same fleet angle along the route to and from the loft blocks as the angle at which the cables are wound on the drum.

Some embodiments of the present invention include a method, comprising: connecting one end of at least one of a plurality of wires to an input source and the opposite end of the at least one of the wires to an output object movable with an article in a lift system; containing the plurality of wires in a wire containment cable; connecting a tray along at least a portion of a length of a substantially rectangular tube connectable to an overhead structure, the tray having dimensions for containing the wire containment cable; moving the wire containment cable between a first, substantially vertical position when the article is fully lowered and a second, substantially horizontal position in the tray when the article is fully raised.

Some such embodiments of the method can further comprise positioning the wire containment cable in a single layer in the tray when the article is fully raised.

In some such embodiments of the method, the tray is connected to a top of the article.

Some such embodiments of the method can further comprise: attaching a rotatable first roller to one end of the tray; attaching a movable second roller to the tray that is movable a predetermined distance along a length of the tray as the article is moved; attaching the wire containment cable to the second roller and to a wire cable lift cable comprising one of the plurality of cables; and guiding the wire containment cable by the second roller about a surface of the first roller between the first and second positions.

Some such embodiments of the method can further comprise: a wire cable loft block located near an end of the tube opposite a drive mechanism, the method further comprising routing the wire cable lift cable from the drive mechanism to and around the wire cable loft block and back in the opposite direction to the second and first rollers.

Some embodiments of the present invention include a method, comprising: providing a plurality of lengthwise portions of a substantially rectangular tube adapted for raising and lowering an article; connecting at least two of the plurality of tube portions to an overhead structure; abutting the at least two tube portions end to end; fastening together the abutting ends of the tube portions using a splicing clamp comprising an upper plate and a lower plate.

Some embodiments of the present invention include a method, comprising: providing a beam clamp tube receiver comprising a pair of opposing hooks and at least two opposing inserts movable vertically and spreadable inside each hook; tightening together the pair of hooks securely onto opposite sides of an overhead structure; inserting a substantially rectangular tube adapted for raising and lowering an article into the beam clamp tube receiver; and locking the tube in the beam clamp tube receiver.

Some such embodiments of the method can further comprise sliding the tube in the beam clamp tube receiver in a direction perpendicular to the overhead structure to which the beam clamp tube receiver is attached.

Some embodiments of the present invention include a method, comprising: providing a drum having a constant diameter portion; winding and unwinding a plurality of cables about the drum to raise and lower an article attached to the cables; maintaining the cables in position about the constant diameter portion of the drum with a cable keeper comprising an arm extending across the constant diameter portion along an axis of the cables and biased against the drum.

Some such embodiments of the method can further comprise guiding the cable keeper arm across the constant diameter portion of the drum at the same rate as the cables wind onto and unwind from the drum.

Some such embodiments of the method can further comprise: monitoring tension on each of the cables with a slack line detector comprising a slack line sensor arm biased against each of the cables and movable in response to a loss of tension on the cables; signaling a cable control with a switch responsive to movement of the sensor arm; and adjusting movement of the cables in response to a loss of tension on the cables.

Some embodiments of the present invention include a method, comprising: routing a cable in a lift system about a loft block and through a generally vertical path of travel downward; routing the cable from the loft block vertically into a first cable guide having a 90 degree angle cable path, out of the first cable guide in a first horizontal direction into one end of a second cable guide having a 180 degree angle cable path, and out of the second cable guide in a second, opposite horizontal direction to the cable guide; attaching the cable to an article to be raised and lowered; adjusting a horizontal adjustment mechanism positioned between the first and second cable guides to change a length of the cable between the loft block and the article.

Some embodiments of the present invention include a method, comprising: providing a brake disk attached to a drive shaft operably connected to a motor and rotatingly positioned between a moveable brake pad moveable toward a fixed brake pad; moving the moveable brake pad away from a ramp to allow rotation of the brake disk and drive shaft so that the motor can wind cables to move a load upward; and compressing the moveable brake pad against the ramp to stop rotation of the brake disk and drive shaft when the motor is unwinding cables to move a load downward.

Some such embodiments of the method can further comprise: providing a pivotable brake release arm adjacent the ramp; and gradually releasing the brake disk after stopping rotation of the brake disk and drive shaft by tilting the drive shaft and the motor downward to actuate the brake release arm.

Some embodiments of the present invention include a method, comprising: providing a lift system comprising (a) a substantially rectangular tube, (b) a drive mechanism connected below one end of the tube, (c) a funnel-shaped drum operably connected to the drive mechanism, and (d) a fleet pivot arm pivotably attached to an end of the tube above the drive mechanism and having at least one block; routing a plurality of cables attached on one end to the drum through the at least one block; and pivoting the fleet pivot arm in a direction substantially perpendicular to a longitudinal axis of the tube as the cables are unwound from and wound onto the drum, thereby guiding the cables along a desired fleet angle.

Some embodiments of the present invention include a method, comprising: providing a lift system load sensor comprising a first portion connected to a drum adapted to wind and unwind a plurality of cables about the drum to raise and lower an article attached to the cables, and a second portion connected to a substantially rectangular tube connectable to an overhead structure, each portion of the load sensor adapted to be pulled against the other; sensing the load sensor portions pulling against each other due to changes in a load force on the article; and adjusting movement of the article in response to the sensed changes.

Features of lift assembly systems and methods of the present invention may be accomplished singularly, or in combination, in one or more of the embodiments of the present invention. Although particular embodiments have been described, it should be recognized that these embodiments are merely illustrative of the principles of the present invention. Those of ordinary skill in the art will appreciate that lift systems and method of the present invention may be constructed and implemented in other ways and embodiments. Accordingly, the description herein should not be read as limiting the present invention, as other embodiments also fall within the scope of the present invention.

What is claimed is:

1. A lift system, comprising:
a tube having an opening in a bottom along at least a portion of a length of the tube, and connectable to an overhead structure;
a drive mechanism connected on one end of the tube;
a drum operably connected to the drive mechanism and adapted to wind and unwind a plurality of cables about the drum to raise and lower an article attached to the cables; and
a plurality of loft blocks connected to the tube so as to redirect the cables from a generally horizontal path from the drum to a generally vertical path to the attached article.

2. The lift system of claim 1, wherein the drum further comprises:
an apex having a first diameter and a base having a second diameter larger than the first diameter;
a constant diameter portion having the first diameter and extending from the apex;
a gradually increasing diameter portion extending from the constant diameter portion to the base; and
a plurality of discrete circumferential channels in the constant diameter portion, each channel adapted to route and maintain one of the cables in a predetermined position about the drum,
wherein a first one of the cables is windable in the first channel about the constant diameter portion and the gradually increasing diameter portion to the base.

3. The lift system of claim 2,
wherein when the first cable is wound about the drum, notches are formed between adjacent coils of the first cable,
wherein a second cable is windable in a second channel adjacent the first channel and into succeeding notches in the coils of the first cable, and
wherein succeeding cables are windable in succeeding adjacent channels in the constant diameter portion and into succeeding adjacent notches in coils of an adjacent wound cable.

4. The lift system of claim 3, wherein each of the cables is windable about the drum substantially simultaneously.

5. The lift system of claim 2, further comprising a cable guide assembly comprising a movable guide block having a roller comprising a plurality of channels and operably connected to the drum such that the guide block can move along the width of the drum to guide each cable in one of the plurality of roller channels as the cables are wound onto and unwound from the drum.

6. The lift system of claim 2, further comprising a cable keeper comprising an arm extending across the constant diameter portion and the increasing diameter portion of the drum along an axis of the cables and biased against the drum so as to maintain the cables in position about the constant diameter portion in the event of loss of tension in one or more of the cables.

7. The lift system of claim 6, wherein an end of the cable keeper is attached to a guide mechanism movable across the constant diameter portion and the increasing diameter portion of the drum at the same rate as the cables wind onto and unwind from the drum.

8. The lift system of claim 7, wherein the guide mechanism further comprises:
a low limit switch adapted to sense a degree of unwinding of the cables as an indicator of when the article has been fully lowered; and
an upper limit switch adapted to sense a degree of winding of the cables as an indicator of when the article has been fully raised.

9. The lift system of claim 1, further comprising:
a plurality of wires, one end of at least one of the wires connectable to an input source associated with the drive mechanism and the opposite end of the at least one of the wires connectable to an output object movable with the article;
a wire containment cable for containing the plurality of wires; and
a tray connected along at least a portion of a length of the article,
wherein the wire containment cable is movable between a first, substantially vertical position when the article is fully lowered and a second, substantially horizontal position in the tray when the article is fully raised.

10. The lift system of claim 9, wherein when the article is fully raised, the wire containment cable comprises a double layer in the tray.

11. The lift system of claim 9, wherein the tray is connected to the top of the tube.

12. The lift system of claim 9, further comprising:
a first pulley attached to an end of the tube opposite the drum;
a second pulley attached to an end of the tube adjacent the drum; and
a truck having a truck pulley and adapted to slide along the tray between the first and second pulleys,
wherein one of the plurality of cables is routed from the drum about the first pulley to the truck,
wherein a wire cable lift cable is attached to the end of the tray adjacent the drum and is routed in a substantially horizontal direction about the truck pulley, to and about the second pulley, to the first pulley, and then about the first pulley in a substantially vertical downward direction, and
wherein the wire containment cable is attached to the wire cable lift cable.

13. The lift system of claim 12, further comprising a trolley slidable along the length of the tray, the wire containment cable attached to the trolley, wherein the wire cable lift cable is adapted to move the trolley along the length of the tray to position the wire containment cable in the tray.

14. The lift system of claim 1, further comprising:
the tube further comprising a plurality of lengthwise portions connectable to each other end to end; and
a splicing clamp comprising an upper plate and a lower plate adapted to receive and tighten about two abutting ends of the tube portions.

15. The lift system of claim 1, further comprising:
a beam clamp tube receiver comprising
a pair of opposing hooks adapted to be tightened together securely onto opposite sides of the overhead structure, and
a clamp comprising two opposing lengths of material moveable vertically inside each hook and adapted to spread apart to receive the tube and lock the tube in the hook.

16. The lift system of claim 15,
wherein the tube further comprises an upward extension comprising a tapered tip having a flange, and wherein when the upward extension is inserted into the hook, the lengths of the clamp are moved up and spread apart by the tapered end of the tip and the tip flange rests on top of the clamp to lock the tube into the beam clamp tube receiver.

17. The lift system of claim 15, wherein the tube is slidable in the beam clamp tube receiver in a direction perpendicular to the overhead structure to which the beam clamp tube receiver is attached.

18. The lift system of claim 15, wherein the beam clamp tube receiver comprises a friction-reducing plastic material in each hook.

19. The lift system of claim 1, wherein at least one of the loft blocks further comprises a self-locking loft block, tiltable out of locked position so that the loft block can be repositioned along the length of the tube and tiltable back into locked position.

20. The lift system of claim 1, further comprising a rail on the inside of at least one of a front and a back of the tube adapted to guide a loft block.

21. The lift system of claim 1, further comprising:
a slack line detector comprising a slack line sensor arm biased against one of the cables and movable in response to a loss of tension on the cable; and
a switch responsive to movement of the sensor arm and adapted to adjust movement of the cables.

22. The lift system of claim 1, further comprising:
a low profile cable adjuster comprising
a first cable guide attached to a first plate and having a rounded 90 degree angle cable path;
a second cable guide attached to a second plate horizontally spaced from the first cable guide and having a 180 degree angle cable path; and
a horizontal adjustment mechanism attached to the first and second plates configured to maintain an adjustable distance between the first and second plates,
wherein the cable can be routed vertically from the loft block into the first cable guide, out of the first cable guide in a first horizontal direction into one end of the second cable guide, and out of the second cable guide in a second, opposite horizontal direction to an attachment point on the first plate, and
wherein the horizontal adjustment mechanism is adjustable to change a length of the cable between the loft block and the article.

23. The lift system of claim 1, the drive mechanism further comprising a drive shaft rotatingly connected to a motor, the lift system further comprising:
an overspeed braking mechanism having a brake disk attached to the drive shaft rotatingly positioned between a moveable brake pad moveable toward a fixed brake pad;
a brake shoe attached to the moveable brake pad and configured to move along a ramp when the article is being raised or lowered to compress the brake disk between the moveable brake pad and the fixed brake pad so as to stop rotation of the brake disk and the drive shaft in the event the motor loses power; and
a spring biased against the brake shoe configured to urge the brake shoe along the ramp to compress the brake disk in the event the motor loses power.

24. The lift system of claim 23, wherein the drive shaft and the motor are configured to tilt downward after the overspeed braking mechanism causes the drive shaft to stop, the overspeed braking mechanism further comprising a pivotable brake release arm configured for actuation by the motor when the motor tilts downward so as to gradually release the overspeed braking mechanism.

25. The lift system of claim 1, further comprising:
a fleet pivot arm pivotably attached to an end of the tube above the drive mechanism having an upper block adjacent the tube and a lower block adjacent the drive mechanism such that the lower block can pivot in a direction substantially perpendicular to a longitudinal axis of the tube,
wherein the fleet pivot arm is pivotable so as to guide the cables along a desired fleet angle as the cables are unwound from and wound onto the drum.

26. The lift system of claim 25, further comprising:
a pivot plate attached to a drive mechanism housing; and
a roller on an inside of the fleet pivot arm adjacent the lower block configured to roll against the pivot plate as the fleet pivot arm pivots.

27. The lift system of claim 1, further comprising:
a load sensor connected between the drive mechanism and a drive mechanism housing and comprising a first portion and a second portion, each portion adapted to be pulled against the other, thereby sensing changes in a load force on the article attempting to pull the drive mechanism away from the drive mechanism housing,
wherein the sensor is adapted to adjust movement of the article when changes in the load force are sensed.

28. The lift system of claim 27, further comprising:
a set of slide rails attached between the drive mechanism and the drive mechanism housing; and
a load sensor slide plate attached to the drive mechanism in a non-rotating manner and slidably mounted on the slide rails,
wherein the load sensor is operably attached to the load sensor slide plate, and
wherein an increased load force on the article causes the slide plate to be pulled away from the drive mechanism housing, and the first and second portions of the load sensor to be pulled against each other.

29. A method, comprising:
providing a lift system comprising (a) a tube connectable to an overhead structure, (b) a drive mechanism connected on one end of the tube, (c) a funnel-shaped drum operably connected to the drive mechanism, (d) a plurality of loft blocks connected to the tube;
routing a plurality of cables each attached on one end to the drum through a generally horizontal path of travel from the drum to one of the loft blocks, and then through a generally vertical path of travel downward from the loft block;
attaching an opposite end of each cable to an article;
winding the cables about the drum to raise the article; and
unwinding the cables from the drum to lower the article.

30. The method of claim 29, the drum further comprising: an apex having a first diameter and a base having a second diameter larger than the first diameter; a constant diameter portion having the first diameter and extending from the apex; a gradually increasing diameter portion extending from the constant diameter portion to the base; and a plurality of discrete circumferential channels in the constant diameter portion, each channel adapted to route and maintain one of the cables in a predetermined position about the drum;

the method further comprising winding a first one of the cables in the first channel about the constant diameter portion and the gradually increasing diameter portion to the base, whereby notches are formed between adjacent coils of the first cable;

winding a second cable in a second channel adjacent the first channel and into succeeding notches in the coils of the first cable; and winding succeeding cables in succeeding adjacent channels in the constant diameter portion and into succeeding adjacent notches in coils of an adjacent wound cable.

31. The method of claim 30, further comprising winding each of the cables about the drum substantially simultaneously.

32. A method, comprising:

providing a plurality of lengthwise portions of a tube adapted for raising and lowering an article;

connecting at least two of the plurality of tube portions to an overhead structure;

abutting the at least two tube portions end to end;

fastening together the abutting ends of the tube portions using a splicing clamp comprising an upper plate and a lower plate.

\* \* \* \* \*